(12) United States Patent
Uono et al.

(10) Patent No.: US 7,930,080 B2
(45) Date of Patent: Apr. 19, 2011

(54) PASSENGER PROTECTING APPARATUS AND METHOD FOR PROTECTING PASSENGER

(75) Inventors: Yutaka Uono, Kuwana (JP); Yoshiteru Inoue, Anjo (JP); Yukiyasu Ueno, Nishio (JP)

(73) Assignee: Denso Corporation, Kariya (JP)

( * ) Notice: Subject to any disclaimer, the term of this patent is extended or adjusted under 35 U.S.C. 154(b) by 1323 days.

(21) Appl. No.: 11/447,759

(22) Filed: Jun. 6, 2006

(65) Prior Publication Data

US 2006/0273559 A1 Dec. 7, 2006

(30) Foreign Application Priority Data

Jun. 7, 2005 (JP) ................................. 2005-167060
Jun. 24, 2005 (JP) ................................. 2005-185165
Aug. 17, 2005 (JP) ................................. 2005-236687

(51) Int. Cl.
*B60R 22/00* (2006.01)
*E05F 15/00* (2006.01)
*G05D 3/00* (2006.01)

(52) U.S. Cl. ................ 701/45; 701/29; 701/31; 701/34; 701/36

(58) Field of Classification Search ........................ None
See application file for complete search history.

(56) References Cited

U.S. PATENT DOCUMENTS

| | | | | |
|---|---|---|---|---|
| 3,851,305 A | * | 11/1974 | Baba et al. | 180/274 |
| 4,087,782 A | * | 5/1978 | Oishi et al. | 180/271 |
| 4,693,493 A | * | 9/1987 | Ikemoto et al. | 280/5.51 |
| 4,958,851 A | * | 9/1990 | Behr et al. | 280/735 |
| 5,085,464 A | * | 2/1992 | Behr et al. | 280/735 |
| 5,261,694 A | * | 11/1993 | White et al. | 280/735 |
| 5,283,472 A |   | 2/1994 | Takeuchi et al. | |
| 5,317,512 A |   | 5/1994 | Ota et al. | |
| 5,359,515 A | * | 10/1994 | Weller et al. | 701/45 |
| 5,363,303 A | * | 11/1994 | Kaneko et al. | 701/45 |
| 5,482,314 A | * | 1/1996 | Corrado et al. | 280/735 |

(Continued)

FOREIGN PATENT DOCUMENTS

JP 2557792 8/1997

(Continued)

OTHER PUBLICATIONS

Office Action issued in corresponding German patent application No. 10 2006 026 239.5 dated Mar. 19, 2007 with English translation.

(Continued)

*Primary Examiner* — Khoi Tran
*Assistant Examiner* — Bhavesh V Amin
(74) *Attorney, Agent, or Firm* — Harness, Dickey & Pierce, PLC

(57) ABSTRACT

A first control signal generating unit and a second control signal generating unit output a first control signal and a second control signal when magnitude of an impact corresponding to first and second sensor signals are greater than a first and second threshold. A third control signal generating unit outputs a third control signal when detecting disruption of the second sensor signal. An activating signal generating unit activates a protecting device when the first control signal is output, and when one of the second control signal and the third control signal is output. A fourth control signal generating unit outputs a fourth control signal when detecting an abnormality other than disruption of the second sensor signal. The third control signal generating unit restricts outputting the third control signal when the fourth control signal is output.

11 Claims, 34 Drawing Sheets

U.S. PATENT DOCUMENTS

| | | | | |
|---|---|---|---|---|
| 5,483,449 | A * | 1/1996 | Caruso et al. | 701/46 |
| 5,510,988 | A * | 4/1996 | Majeed et al. | 701/37 |
| 5,546,307 | A * | 8/1996 | Mazur et al. | 701/46 |
| 5,825,098 | A * | 10/1998 | Darby et al. | 307/10.1 |
| 5,835,873 | A * | 11/1998 | Darby et al. | 701/45 |
| 5,863,067 | A * | 1/1999 | Blumenthal et al. | 280/741 |
| 5,890,084 | A * | 3/1999 | Halasz et al. | 701/45 |
| 5,967,548 | A * | 10/1999 | Kozyreff | 280/735 |
| 5,969,599 | A * | 10/1999 | Wessels et al. | 340/436 |
| 6,002,974 | A * | 12/1999 | Schiffmann | 701/36 |
| 6,002,975 | A * | 12/1999 | Schiffmann et al. | 701/36 |
| 6,070,113 | A * | 5/2000 | White et al. | 701/45 |
| 6,157,881 | A * | 12/2000 | Wessels | 701/45 |
| 6,167,335 | A | 12/2000 | Ide et al. | |
| 6,185,489 | B1 * | 2/2001 | Strickler | 701/29 |
| 6,186,539 | B1 * | 2/2001 | Foo et al. | 280/735 |
| 6,212,457 | B1 * | 4/2001 | Miciuda et al. | 701/45 |
| 6,249,730 | B1 * | 6/2001 | Khairallah et al. | 701/45 |
| 6,324,454 | B1 | 11/2001 | Obata et al. | |
| 6,330,500 | B1 * | 12/2001 | Moriyama et al. | 701/45 |
| 6,587,048 | B1 * | 7/2003 | Bomya | 340/573.1 |
| 6,777,927 | B1 * | 8/2004 | Bomya | 324/207.17 |
| 7,625,006 | B2 * | 12/2009 | Foo et al. | 280/735 |
| 2002/0169535 | A1 * | 11/2002 | Imai et al. | 701/45 |
| 2004/0002802 | A1 | 1/2004 | Ide et al. | |
| 2004/0056652 | A1 * | 3/2004 | Bomya | 324/207.17 |
| 2004/0204810 | A1 | 10/2004 | Ide et al. | |
| 2004/0243294 | A1 | 12/2004 | Miyata et al. | |
| 2005/0006886 | A1 * | 1/2005 | Foo et al. | 280/735 |
| 2006/0273559 | A1 * | 12/2006 | Uono et al. | 280/735 |

FOREIGN PATENT DOCUMENTS

| | | |
|---|---|---|
| JP | 2003-127822 | 5/2003 |
| WO | WO 03/011652 | 2/2003 |

OTHER PUBLICATIONS

Combined Search and Examination Report dated Apr. 10, 2008 in Gt. Britain Patent Application No. 0803087.6 (divisional of GB No. 0611247.8).

$2^{nd}$ Search Report dated Jun. 29, 2007 in Gt. Britain Patent Application No. 0611247.8.

Examination Report of Jul. 2, 2007 in Gt. Britain Patent Application No. 0611247.8.

Office Action dated Oct. 29, 2009 from the Japanese Patent Office in the corresponding patent application No. 2005-167060 (with English translation).

* cited by examiner

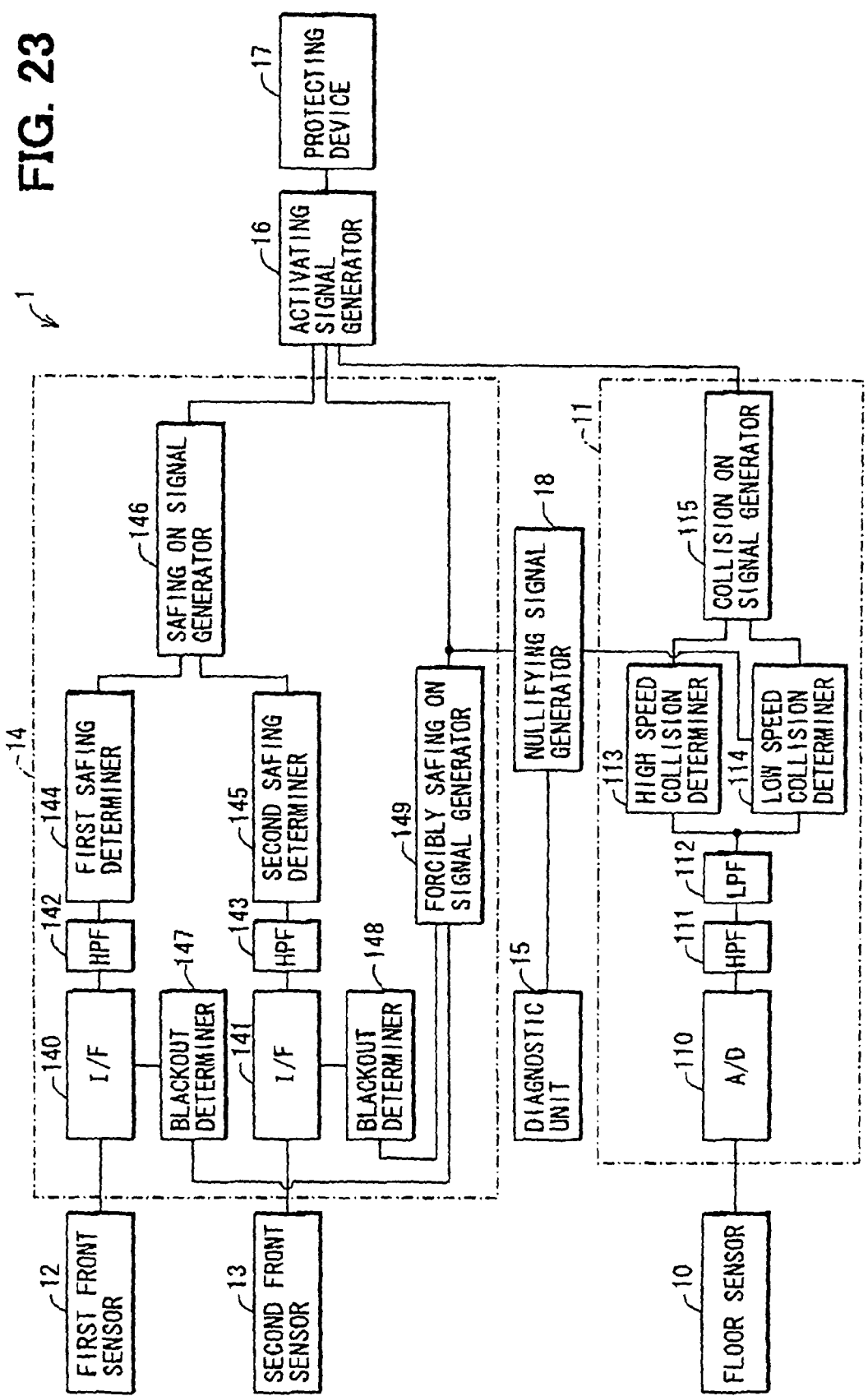

PASSENGER PROTECTING APPARATUS AND METHOD FOR PROTECTING PASSENGER

CROSS REFERENCE TO RELATED APPLICATIONS

This application is based on and incorporates herein by reference Japanese Patent Applications No. 2005-167060 filed on Jun. 7, 2005, No. 2005-185165 filed on Jun. 24, 2005, and No. 2005-236687 filed on Aug. 17, 2005.

FIELD OF THE INVENTION

The present invention relates to a passenger protecting apparatus. The present invention further relates to a method for protecting a passenger.

BACKGROUND OF THE INVENTION

In general, a passenger protecting apparatus such as an air bag apparatus is used for protecting a passenger when a vehicle causes a collision. According to US 2004/0243294 A1 (JP-A-2003-54359), an air bag apparatus is constructed of front sensors, a floor sensor, and an electronic control unit. The front sensors are respectively provided to the front right side and the front left side of a side member of the vehicle. The floor sensor is provided to the vicinity of the floor tunnel in the center of the vehicle. The front sensor and the floor sensor respectively detect magnitude of deceleration of the vehicle at each location thereof with respect to backward and forward direction of the vehicle. The electronic control unit activates an airbag in accordance with the magnitude of the deceleration detected using the front sensor and the floor sensor. The electronic control unit stores a determination map for determining activation of the air bag in accordance with the magnitude of the deceleration. The determination map includes a high map, a low map, and a front map.

When floor deceleration, which is detected using the floor sensor, becomes greater than a threshold defined by the high map, the electronic control unit activates the air bag. When the floor deceleration becomes greater than a threshold defined by the low map, and front deceleration, which is detected using the front sensor, becomes greater than a threshold defined by the front map, the electronic control unit activates the air bag. Thus, the air bag is expanded to protect a passenger.

The front sensor is arranged in the front side of the vehicle. Therefore, when the vehicle causes collision, the front sensor may be broken and a wire harness, which connects the front sensor with the electronic control unit, may be disconnected due to the collision. It is impossible to completely protect the front sensor and the wire harness when the vehicle causes collision. Accordingly, when blackout, i.e., disruption arises in a signal transmitted from the front sensor, the front sensor may be determined to be broken, or the wire harness may be determined to be disconnected, due to collision of the vehicle. In this condition, determination in accordance with the front map may be forcibly made, so that the air bag can be activated in accordance with the determinations, which is forcibly made, and the determination based on the low map, even when the front sensor is broken or the wire harness is disconnected due to collision of the vehicle.

However, blackout of the signal transmitted from the front sensor is not necessarily caused by collision of the vehicle. The signal may cause blackout due to malfunctions of the front sensor and an input device of the electronic control unit. For example, when water intrudes into the vehicle, and components of the air bag apparatus are excessively exposed to water, each of the front sensor and the input device of the electronic control unit may cause a malfunction. In addition, the floor deceleration may gradually vary due to leakage caused by intruding water.

When each of the front sensor and the input device of the electronic control unit causes a malfunction, and blackout arises in the transmittance of the signal, determination in accordance with the front map may be forcibly made. In this case, when the floor deceleration gradually varies and becomes greater than the threshold defined by the low map, the air bag may be activated even the vehicle does not cause collision.

Another structure may be constructed by combining a safing determination in accordance with the front deceleration and low and high speed collision determination in accordance with the floor deceleration. In this structure, when the front deceleration becomes greater than a safing threshold, and the floor deceleration becomes greater than a low speed collision threshold, the electronic control unit may activate the air bag. Alternatively, when the front deceleration becomes greater than a safing threshold, and the floor deceleration becomes greater than a high speed collision threshold, the electronic control unit may activate the air bag.

The floor deceleration when the vehicle cause low speed collision is less than the floor deceleration when the vehicle cause high speed collision. However, the floor deceleration of the low speed collision may gradually vary during a long period. When each of the front sensor and the input device of the electronic control unit causes a malfunction, and blackout arises in the transmittance of the signal, the sating determination may be forcibly made. In this condition, when the signal output from the floor sensor causes a drift, the floor deceleration effected by the drift becomes similar to the floor deceleration of the low speed collision. Accordingly, the floor deceleration may become greater than the low speed collision threshold, and the air bag may be activated even the vehicle does not cause a collision.

SUMMARY OF THE INVENTION

In view of the foregoing and other problems, it is an object of the present invention to produce a passenger protecting apparatus that is improved in reliability. It is another object of the present invention to produce a method for protecting a passenger.

According to one aspect of the present invention, a protection apparatus for a vehicle includes a protecting device that protects a passenger of the vehicle. The protection apparatus further includes a first sensor that outputs a first sensor signal corresponding to magnitude of an impact applied to the vehicle. The protection apparatus further includes a first control signal generating unit that outputs a first control signal when the magnitude of the impact corresponding to the first sensor signal is greater than a first threshold. The protection apparatus further includes a second sensor that outputs a second sensor signal corresponding to the magnitude of the impact applied to the vehicle. The protection apparatus further includes a second control signal generating unit that outputs a second control signal when the magnitude of the impact corresponding to the second sensor signal is greater than a second threshold. The protection apparatus further includes a third control signal generating unit that outputs a third control signal when the third control signal generating unit detects disruption of the second sensor signal. The protection apparatus further includes an activating signal generating unit that outputs an activating signal for activating the protecting device when the first control signal is output and when one of the second control signal and the third control signal is output. The protection apparatus further includes a fourth control signal generating unit that outputs a fourth control signal when the fourth control signal generating unit detects an abnormality other than disruption of the second sensor signal. The third control signal generating unit restricts outputting the third control signal when the fourth control signal is output.

Alternatively, a protection apparatus for a vehicle includes a protecting device that protects a passenger of the vehicle. The protection apparatus further includes a first sensor that outputs a first sensor signal corresponding to magnitude of an impact applied to the vehicle. The protection apparatus further includes a first control signal generating unit that outputs a first control signal when the magnitude of the impact corresponding to the first sensor signal is equal to or greater than a first threshold. The protection apparatus further includes a second control signal generating unit that outputs a second control signal when the magnitude of the impact corresponding to the first sensor signal is equal to or greater than a second threshold, which is greater than the first threshold. The protection apparatus further includes a third control signal generating unit that outputs a third control signal when at least one of the first control signal and the second control signal is output. The protection apparatus further includes a second sensor that outputs a second sensor signal corresponding to the magnitude of the impact applied to the vehicle. The protection apparatus further includes a fourth control signal generating unit that outputs a fourth control signal when the magnitude of the impact corresponding to the second sensor signal is equal to or greater than a third threshold. The protection apparatus further includes a fifth control signal generating unit that outputs a fifth control signal when the fifth control signal generating unit detects disruption of the second sensor signal. The protection apparatus further includes an activating signal generating unit that outputs an activating signal for activating the protecting device when the third control signal is output and when one of the fourth control signal and the fifth control signal is output. The protection apparatus further includes a sixth control signal generating unit that outputs a sixth control signal when the fifth control signal is output. The first control signal generating unit restricts outputting the first control signal when the sixth control signal is output.

Alternatively, a protection apparatus for a vehicle includes a protecting device that protects a passenger of the vehicle. The protection apparatus further includes a first sensor that outputs a first sensor signal corresponding to magnitude of an impact applied to the vehicle. The protection apparatus further includes a first control signal generating unit that outputs a first control signal when the magnitude of the impact corresponding to the first sensor signal is equal to or greater than a first threshold. The protection apparatus further includes a second sensor that is located on a front side with respect to the first sensor in the vehicle, the second sensor outputting a second sensor signal corresponding to the magnitude of the impact applied to the vehicle. The protection apparatus further includes a second control signal generating unit that outputs a second control signal when the magnitude of the impact corresponding to the second sensor signal is equal to or greater than a second threshold. The protection apparatus further includes a third sensor that is located on a front side with respect to the first sensor in the vehicle, the third sensor outputting a third sensor signal corresponding to the magnitude of the impact applied to the vehicle. The protection apparatus further includes a third control signal generating unit that outputs a third control signal when the magnitude of the impact corresponding to the third sensor signal is equal to or greater than a third threshold. The protection apparatus further includes a fourth control signal generating unit that outputs a fourth control signal when the fourth control signal generating unit detects disruption of either of the second sensor signal or the third sensor signal. The protection apparatus further includes an activating signal generating unit that outputs an activating signal for activating the protecting device when the first control signal is output and when at least one of the second control signal, the third control signal, and the fourth control signal is output. The fourth control signal generating unit restricts outputting the fourth control signal when the fourth control signal generating unit detects disruption of both the second sensor signal and the third sensor signal.

Alternatively, a method for protecting a passenger of a vehicle includes detecting an impact applied to the vehicle to produce a first sensor signal corresponding to the magnitude of the impact. The method further includes detecting the impact applied to the vehicle to produce a second sensor signal corresponding to the magnitude of the impact. The method further includes diagnosing whether at least one component is normal. The method further includes outputting a first control signal when the first sensor signal is greater than a first threshold. The method further includes outputting a second control signal when the second sensor signal is greater than a second threshold.

The method further includes outputting a third control signal when disruption arises in the second sensor signal, and when the at least one component is normal. The method further includes activating a protecting device for protecting the passenger when the first control signal is output, and when one of the second control signal and the third control signal is output.

Alternatively, a method for protecting a passenger of a vehicle includes detecting an impact applied to the vehicle to produce a first sensor signal corresponding to magnitude of an impact. The method further includes detecting the impact applied to the vehicle to produce a second sensor signal corresponding to the magnitude of the impact. The method further includes outputting a first control signal when the magnitude of the impact corresponding to the first sensor signal is equal to or greater than a first threshold, and when the second sensor signal is normal. The method further includes outputting a second control signal when the magnitude of the impact corresponding to the first sensor signal is equal to or greater than a second threshold, which is greater than the first threshold. The method further includes outputting a third control signal when at least one of the first control signal and the second control signal is output. The method further includes outputting a fourth control signal when the magnitude of the impact corresponding to the second sensor signal is equal to or greater than a third threshold. The method further includes outputting a fifth control signal when disruption arises in the second sensor signal. The method further includes activating a protecting device for protecting the passenger when the third control signal is output, and when one of the fourth control signal and the fifth control signal is output.

Alternatively, a method for protecting a passenger of a vehicle includes detecting an impact applied to the vehicle to produce a first sensor signal corresponding to the magnitude of the impact. The method further includes detecting the impact applied to the vehicle at a front portion in the vehicle to produce a second sensor signal corresponding to the magnitude of the impact. The method further includes detecting the impact applied to the vehicle at a front portion in the vehicle to produce a third sensor signal corresponding to the magnitude of the impact. The method further includes activating a protecting device for protecting the passenger when the first sensor signal is equal to or greater than a first threshold, and when at least one of the following conditions is satisfied. First, the method further includes the second sensor signal is equal to or greater than a second threshold. Second, the third sensor signal is equal to or greater than a third threshold. Third, disruption arises in either the second sensor signal or the third sensor signal.

BRIEF DESCRIPTION OF THE DRAWINGS

The above and other objects, features and advantages of the present invention will become more apparent from the following detailed description made with reference to the accompanying drawings. In the drawings:

FIG. 23 is a block diagram showing an air bag apparatus, according to a ninth embodiment;

DETAILED DESCRIPTION OF PREFERRED EMBODIMENTS

First Embodiment

Figure 1:
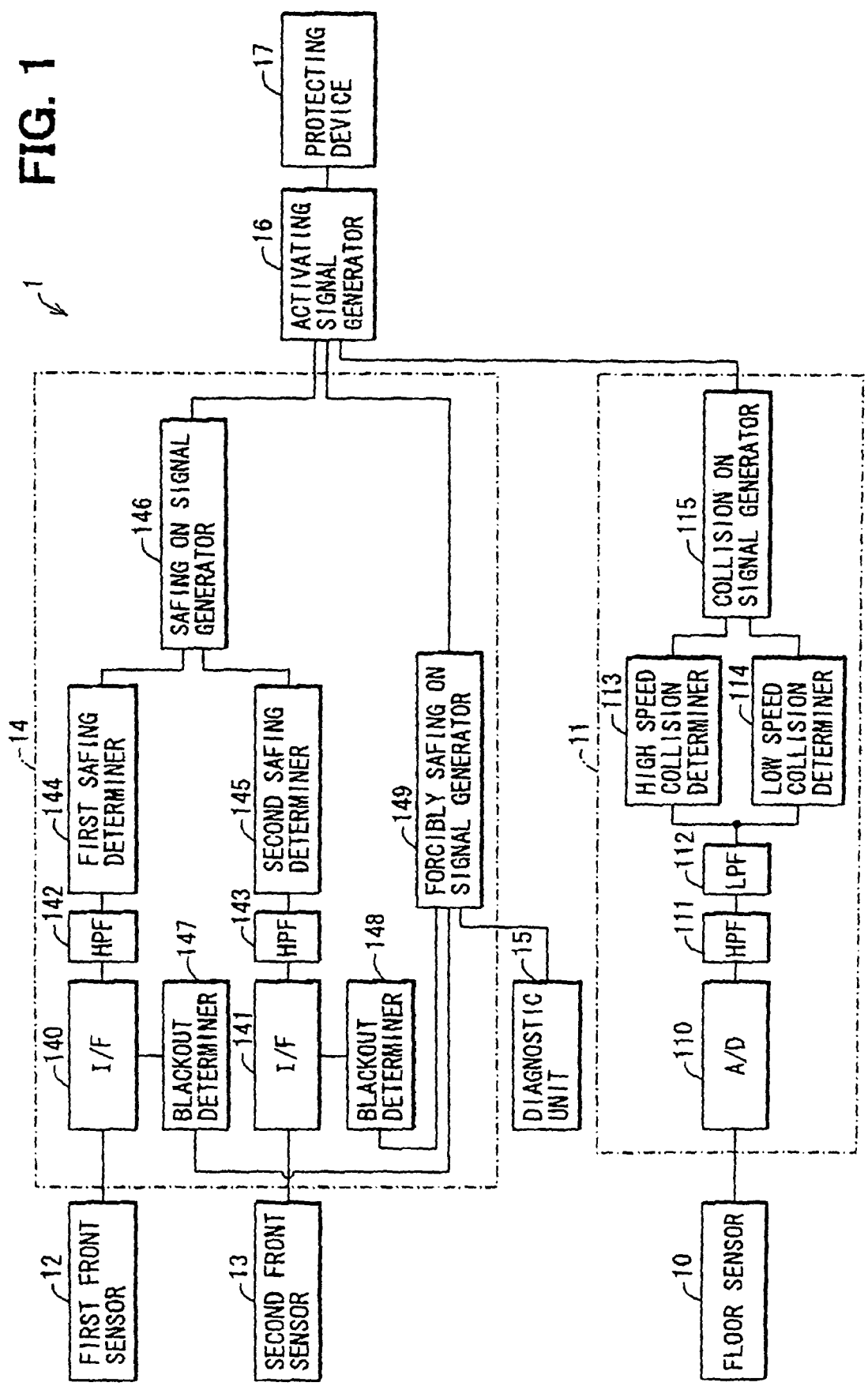
FIG. 1 is a block diagram showing an air bag apparatus, according to a first embodiment.

As shown in FIG. 1, an air bag apparatus 1 evaluates collision of a vehicle in accordance with acceleration of the vehicle. When the air bag apparatus 1 determines that the vehicle comes into collision, the air bag apparatus 1 activates an air bag to protect a passenger of the vehicle. The air bag apparatus 1 includes a floor sensor 10, a main determiner 11, a first front sensor 12, second front sensor 13, a safing determiner 14, a diagnosis unit 15, an activating signal generator 16, and a protecting device 17.

The floor sensor 10 is arranged in a substantially center of the vehicle for detecting acceleration of the vehicle with respect to backward and forward direction of the vehicle. Acceleration of the vehicle occurs when the vehicle comes into collision. The floor sensor 10 outputs an analog signal to the main determiner 11. The analog signal corresponds to the magnitude of the acceleration of the vehicle.

The main determiner 11 determines whether the vehicle comes into collision, in accordance with the acceleration detected using the floor sensor 10, thereby outputting a signal corresponding to the determination. The main determiner 11 is constructed of an A/D converter 110, a highpass filter (HPF) 111, a lowpass filter (LPF) 112, a high speed collision determiner 113, a low speed collision determiner 114, and a collision ON signal generator 115. The high speed collision determiner 113, the low speed collision determiner 114, and the collision ON signal generator 115 are constructed of a microcomputer and a program. The A/D converter 110 converts the analog signal output from the floor sensor 10 to a digital signal, and outputs the digital signal as an acceleration data to the HPF 111.

The HPF 111 performs a filtering operation to the acceleration data output from the A/D converter 110. The HPF 111 performs a zero-point adjustment to the acceleration data for eliminating a drift error of the acceleration data, and outputs the acceleration data to the LPF 112.

The LPF 112 performs a filtering operation to the acceleration data output from the HPF 111. The LPF 112 removes a high-frequency component from the acceleration data in order to extract a low-frequency component, which is equal to or less than 100 Hz, for example. The low-frequency component of the acceleration data is utilized for determining collision. The LPF 112 outputs the low-frequency component of the acceleration data to the high speed collision determiner 113 and the low speed collision determiner 114.

The high speed collision determiner 113 evaluates whether collision of the vehicle is high speed collision, in accordance with the acceleration data output from the LPF 112. The high speed collision determiner 113 integrates the acceleration data output from the LPF 112 in a specific period such as 8 ms. Furthermore, the high speed collision determiner 113 compares the integrated value of the acceleration data with a high speed collision threshold such as 196 m/s2. When the integrated value of the acceleration data is greater than the high speed collision threshold, the high speed collision determiner 113 determines that the collision of the vehicle is high speed collision, thereby outputting a high speed collision ON signal to the collision ON signal generator 115.

The low speed collision determiner 114 evaluates whether the collision of the vehicle is low speed collision, in accordance with the acceleration data output from the LPF 112. The low speed collision determiner 114 integrates the acceleration data output from the LPF 112 in a specific period such as 32 msec. Furthermore, the low speed collision determiner 114 compares the integrated value of the acceleration data with a low speed collision threshold such as 49 m/s2. When the integrated value of the acceleration data is greater than the low speed collision threshold, the low speed collision determiner 114 determines that the collision of the vehicle is low speed collision, thereby outputting a low speed collision ON signal to the collision ON signal generator 115.

The collision ON signal generator 115 evaluates whether the vehicle causes either high speed collision or low speed collision, in accordance with the signal output from the high and low speed collision determiners 113, 114, thereby outputting a collision ON signal to the activating signal generator 16. When the collision ON signal generator 115 inputs either the high speed collision ON signal or the low speed collision ON signal, the collision ON signal generator 115 outputs the collision ON signal to the activating signal generator 16 for a predetermined period.

The safing determiner 14 evaluates whether the vehicle comes into collision, in accordance with acceleration detected using the first and second front sensors 12, 13 and a diagnosis result of the air bug apparatus 1, thereby outputting a signal corresponding to a determination result thereof. The safing determiner 14 is constructed of a serial communication interfaces (serial I/Fs) 140, 141, high pass filters (HPFs) 142, 143, first and second safing determiners 144, 145, a safing ON signal generator 146, communication blackout determiners (blackout determiners) 147, 148, and a forcibly safing ON signal generator 149. The first and second safing determiners 144, 145, the safing ON signal generator 146, the blackout determiners 147, 148, and the forcibly safing ON signal generator 149 are constructed of a microcomputer and a program, for example.

The first and second front sensors 12, 13 are arranged in front of the right and left side of the vehicle for detecting acceleration of the vehicle with respect to backward and forward direction of the vehicle. Each of the first and second front sensors 12, 13 transmits a digital signal, which corresponds to the magnitude of the acceleration, to the corresponding one of the serial I/Fs 140, 141 via the serial communication.

Each of the serial I/Fs 140, 141 converts the digital signals, which are transmitted from the first and second front sensors 12, 13 via the serial communication, into acceleration data, thereby outputting the acceleration data to the HPFs 142, 143.

Each of the HPFs 142, 143 performs a filtering operation to the acceleration data transmitted from the corresponding one of the serial I/Fs 140, 141. Each of the HPFs 142, 143 performs a zero-point adjustment to the acceleration data for eliminating a drift error of the acceleration data, and transmits the acceleration data to the corresponding one of the first and second safing determiners 144, 145.

Each of the first and second safing determiners 144, 145 evaluates collision of the vehicle in accordance with the acceleration data transmitted from the corresponding one of the HPFs 142, 143.

Each of the first and second safing determiners 144, 145 integrates the acceleration data transmitted from the corresponding one of the HPFs 142, 143 in a specific period such as 10 msec. Furthermore, each of the first and second safing determiners 144, 145 compares the integrated value of the acceleration data with corresponding one of a first safing threshold and a second safing threshold such as 49 m/s2. When each of the integrated values of the acceleration data is greater than the corresponding one of the first and second safing thresholds, corresponding one of the first and second safing determiners 144, 145 determines that the vehicle comes into collision, thereby outputting corresponding one of first and second safing ON signals to the safing ON signal generator 146.

The safing ON signal generator 146 evaluates whether the vehicle comes into collision, in accordance with the signals output from the first and second safing determiners 144, 145, thereby outputting the safing ON signal to the activating signal generator 16. When either the first safing ON signal or the second safing ON signal is output, the safing ON signal generator 146 outputs the safing ON signal to the activating signal generator 16 for a predetermined period.

Each of the blackout determiners 147, 148 evaluates whether one of corresponding digital signals, which is transmitted from the corresponding one of the first and second front sensors 12, 13 to the corresponding one of the serial I/Fs 140, 141 via the serial communication, causes a black out. When each of the blackout determiners 147, 148 is continuously incapable of properly receiving the digital signal for more than a predetermined period such as 5 msec, the corresponding one of the blackout determiners 147, 148 determines that the serial communication causes blackout (disruption), thereby outputting corresponding one of first and second blackout signals to the forcibly safing ON signal generator 149.

Figure 2:
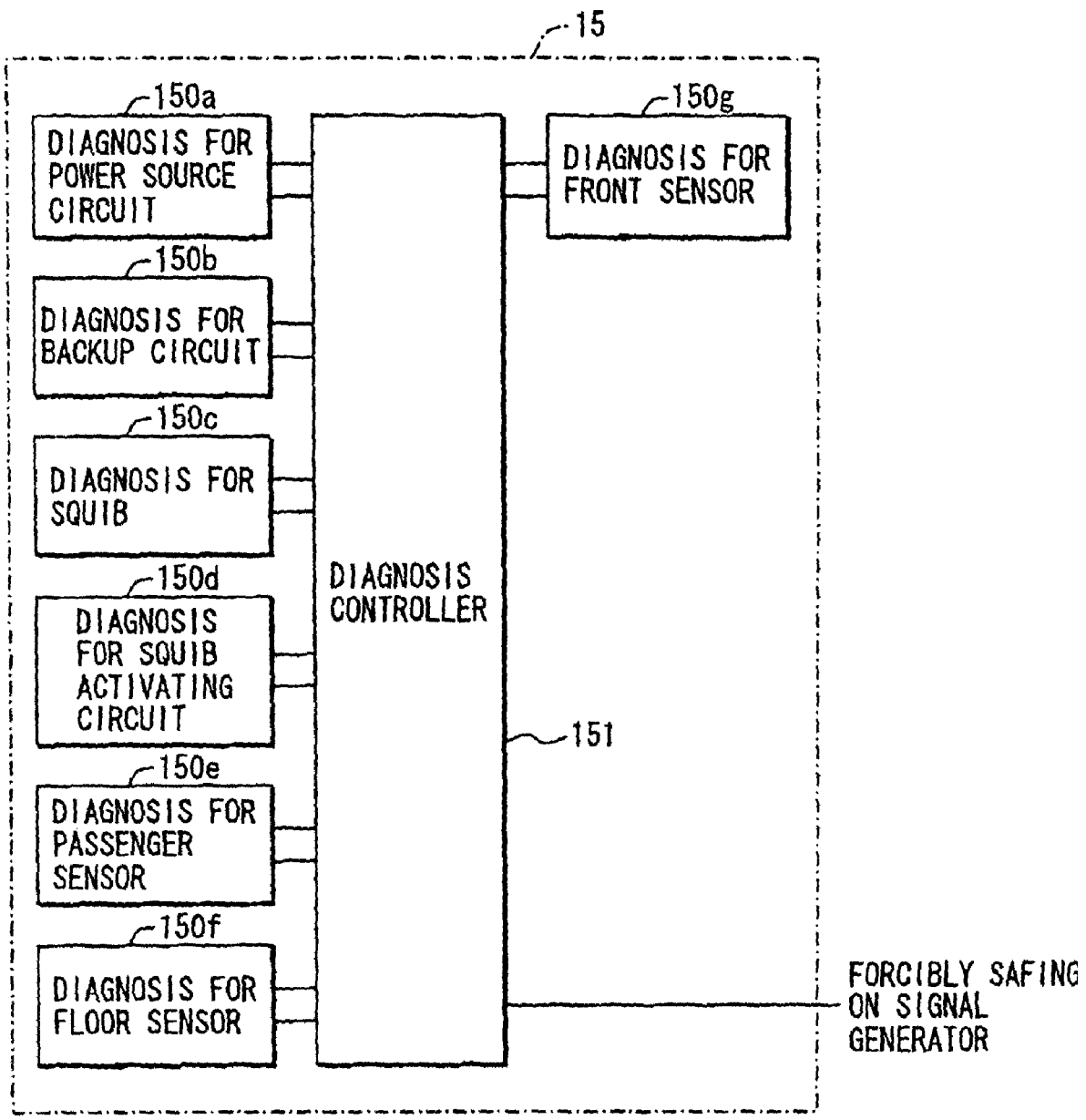
FIG. 2 is a block diagram showing a diagnosis unit of the air bag apparatus, according to the first embodiment.

The forcibly safing ON signal generator 149 evaluates blackout of the communication and abnormality of components of the air bag apparatus 1 in accordance with the signals output from the blackout determiners 147, 148, and the diagnosis unit 15, thereby outputting a forcibly safing ON signal to the activating signal generator 16. When either the first and second blackout signals is output, the forcibly safing ON signal generator 149 outputs the forcibly safing ON signal to the activating signal generator 16 for a predetermined period. However, when the diagnosis unit 15 outputs a forcibly safing ON nullifying signal, the forcibly safing ON signal is not output, regardless of the first and second blackout signals. The diagnosis unit 15 evaluates abnormality of components of the air bag apparatus 1, thereby outputting a signal corresponding to the diagnosis result thereof. As shown in FIG. 2, the diagnosis unit 15 is constructed of diagnosis circuits 150a to 150g and a diagnosis controller 151.

Each of the diagnosis circuits 150a to 150g outputs information, which is necessary for the diagnosis operation of the corresponding component of the airbag apparatus 1, in accordance with a command from the diagnosis controller 151. In this embodiment, components (diagnosed component), which are subjected to the diagnosis operation, are power source circuit, a backup circuit, a squib, a squib activating circuit, a passenger sensor, the floor sensor 10, the first and second front sensors 12, 13, for example. The power source circuit applies voltage for activating the air bag apparatus 1. The backup circuit applies voltage for a predetermined period instead of the power source circuit when the power source circuit is incapable of applying voltage. The squib ignites by being supplied with electricity, thereby expanding an air bag. The squib activating circuit supplies electricity to the squib. The passenger sensor detects existence of a passenger. Each of the diagnosis circuits 150*a* to 150*g* outputs the information, which is necessary for the diagnosis operation, as a diagnosis signal, in accordance with the command from the diagnosis controller 151.

The diagnosis controller 151 controls the diagnosis circuits 150*a* to 150*g*, and evaluates abnormality of the diagnosed components of the air bag apparatus 1 in accordance with the diagnosis signals output from the diagnosis circuits 150*a* to 150*g*. The diagnosis controller 151 is constructed of a microcomputer and a program, for example. The diagnosis controller 151 evaluates abnormality in accordance with the diagnosis signals output from the diagnosis circuits 150*a* to 150*g*. Each of the first and second front sensors 12, 13 evaluates abnormality excluding blackout of the communication. When the diagnosis controller 151 determines abnormality, the diagnosis controller 151 outputs a forcibly safing ON nullifying signal (nullifying signal) to the forcibly safing ON signal generator 149.

As referred to FIG. 1, the activating signal generator 16 outputs the activating signal for activating the protecting device 17 in accordance with the collision ON signal output from the collision ON signal generator 115, the safing ON signal output from the safing ON signal generator 146, and the forcibly safing ON signal output from the forcibly safing ON signal generator 149. The activating signal generator 16 outputs the activating signal to the protecting device 17 when the collision ON signal is output and when either the safing ON signal or the forcibly safing ON signal is output. That is, in this embodiment, the activating signal generator 16 outputs the activating signal to the protecting device 17 when the collision ON signal and the safing ON signal are output, or when the collision ON signal and the forcibly safing ON signal are output.

The protecting device 17 is activated in accordance with the activating signal output from the activating signal generator 16 for protecting a passenger. The protecting device 17 is constructed of the air bag, the squib, and the squib activating circuit.

Next, an operation of the air bag apparatus 1 is described. The operation of the air bag apparatus 1 includes an activating evaluation and a diagnosis operation. The activating evaluation is executed repeatedly at intervals such as 1 ms. The diagnosis operation is executed repeatedly at intervals such as 50 msec.

Figure 3:
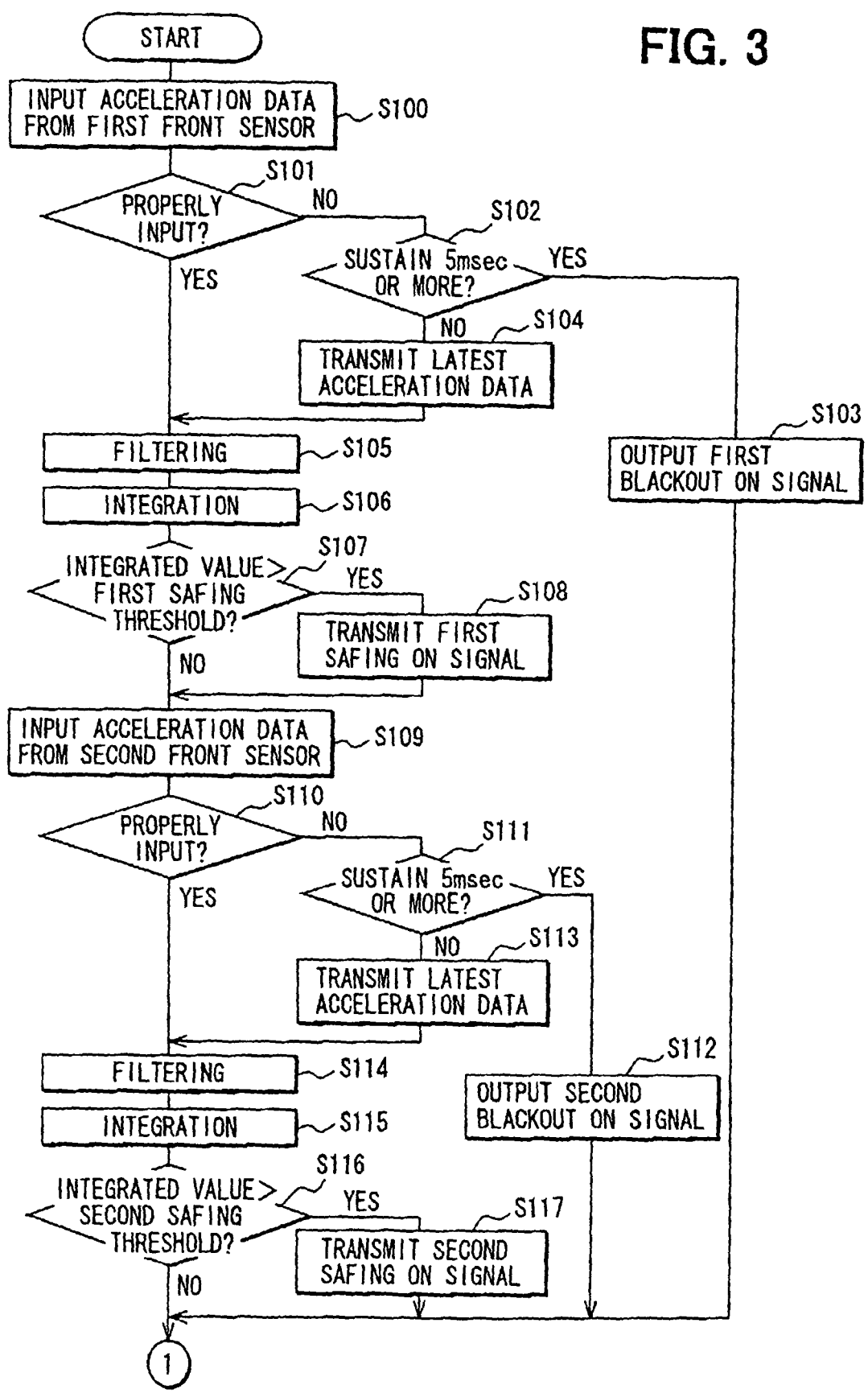
FIGS. 3 to 7 are flowcharts showing an activating operation for the air bag apparatus, according to the first embodiment.

First, the activating evaluation is described. As shown in FIG. 3, in step S100, the serial I/F 140 inputs the acceleration data transmitted form the first front sensor 12. In step S101, the blackout determiner 147 evaluates whether the acceleration data is properly transmitted. When the acceleration data is properly transmitted, the serial I/F 140 transmits the acceleration data to the HPF 142, in accordance with the command from the blackout determiner 147. By contrast, in step S101, when the acceleration data is not properly transmitted, the routine proceeds to step S102, in which the blackout determiner 147 evaluates whether this discommunication, in which the acceleration data is not properly transmitted, continues for a period equal to or greater than 5 msec, for example.

In step S102, when the discommunication continues for the period equal to or greater than 5 msec, the blackout determiner 147 determines that blackout arises, so that the routine proceeds to step S103. In step S103, the blackout determiner 147 outputs a first blackout ON signal. By contrast, in step S102, when the discommunication continues for a period less than 5 msec, the blackout determiner 147 determines that the blackout is a instantaneous abnormality, thereby not determining the communication to be causing blackout. In this case, the routine proceeds to step S104, in which the serial I/F 140 transmits the latest acceleration data to the HPF 142.

In step S105, the HPF 142 performs a filtering operation to the acceleration data transmitted from the serial I/F 140, and transmits the acceleration data to the first safing determiner 144. In step S106, the first safing determiner 144 integrates the filtered acceleration data, which is subjected to the filtering operation, in the specific period. In step S107, the first safing determiner 144 compares the integrated value of the acceleration data of the first front sensor 12 with the first safing threshold.

In step S107, when the integrated value of the acceleration data is greater than the first safing threshold, the routine proceeds to step S108, in which the first safing determiner 144 determines that the vehicle comes into collision, thereby transmitting the first safing ON signal. By contrast, in step S107, when the integrated value of the acceleration data is equal to or less than the first safing threshold, the first safing determiner 144 determines that the vehicle does not come into collision, thereby not transmitting the first safing ON signal.

Subsequently, in steps S109 to S117, similar processings are performed to the acceleration data transmitted from the second front sensor 13.

Figure 4:
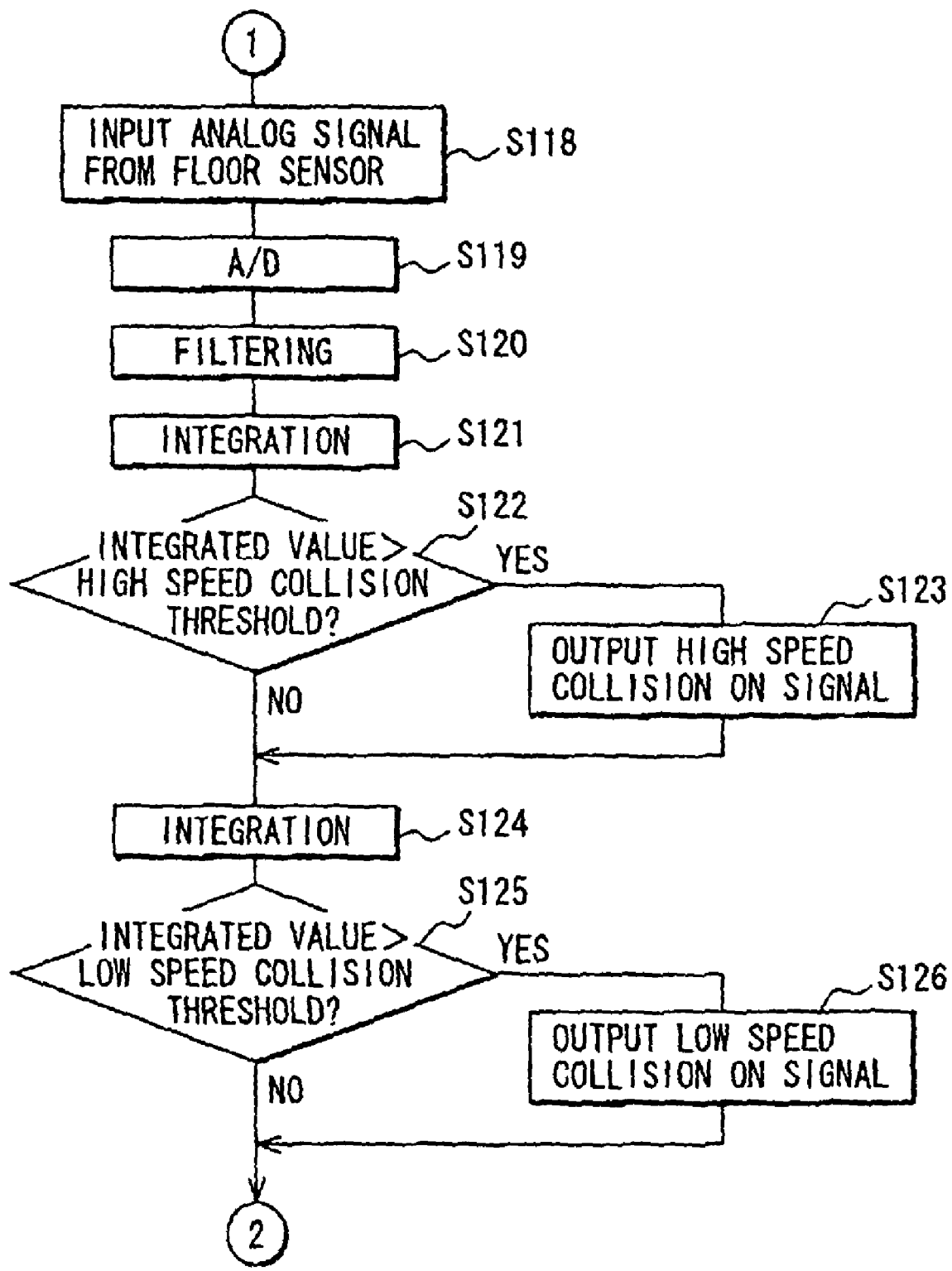

Next, processings are subjected to the analog signal output from the floor sensor 10. As shown in FIG. 4, in step S118, the A/D converter 110 inputs analog signal output from the floor sensor 10. In step S119, the A/D converter 110 converts the analog signal to the digital signal, and outputs the digital signal as the acceleration data to the HPF 111. In step S120, the HPF 111 performs the filtering operation to the acceleration data output from the A/D converter 110, and outputs the filtered acceleration data to the high and low speed collision determiners 113, 114. In step S121, the high speed collision determiner 113 integrates the filtered acceleration data. In step S122, the high speed collision determiner 113 compares the integrated acceleration data of the floor sensor 10 with the high speed collision threshold.

In step S122, when the integrated acceleration data is greater than the high speed collision threshold, the routine proceeds to step S123, in which the high speed collision determiner 113 determines the collision of the vehicle to be high speed collision, thereby outputting the high speed collision ON signal. By contrast, in step S122, when the integrated acceleration data is equal to or less than the high speed collision threshold, the high speed collision determiner 113 determines the collision of the vehicle not to be low speed collision. In this case, the high speed collision determiner 113 does not output the high speed collision ON signal.

In step S124, the low speed collision determiner 114 integrates the filtered acceleration data. In step S125, the low speed collision determiner 114 compares the integrated acceleration data of the floor sensor 10 with the low speed collision threshold.

In step S125, when the integrated acceleration data is greater than the low speed collision threshold, the routine proceeds to step S126, in which the low speed collision determiner 114 determines the collision of the vehicle to be low speed collision, thereby outputting the low speed collision ON signal. By contrast, in step S125, when the integrated acceleration data is equal to or less than the low speed collision threshold, the low speed collision determiner 114 determines the collision of the vehicle not to be low speed collision. In this case, the low speed collision determiner 114 does not output the low speed collision ON signal.

Figure 5:
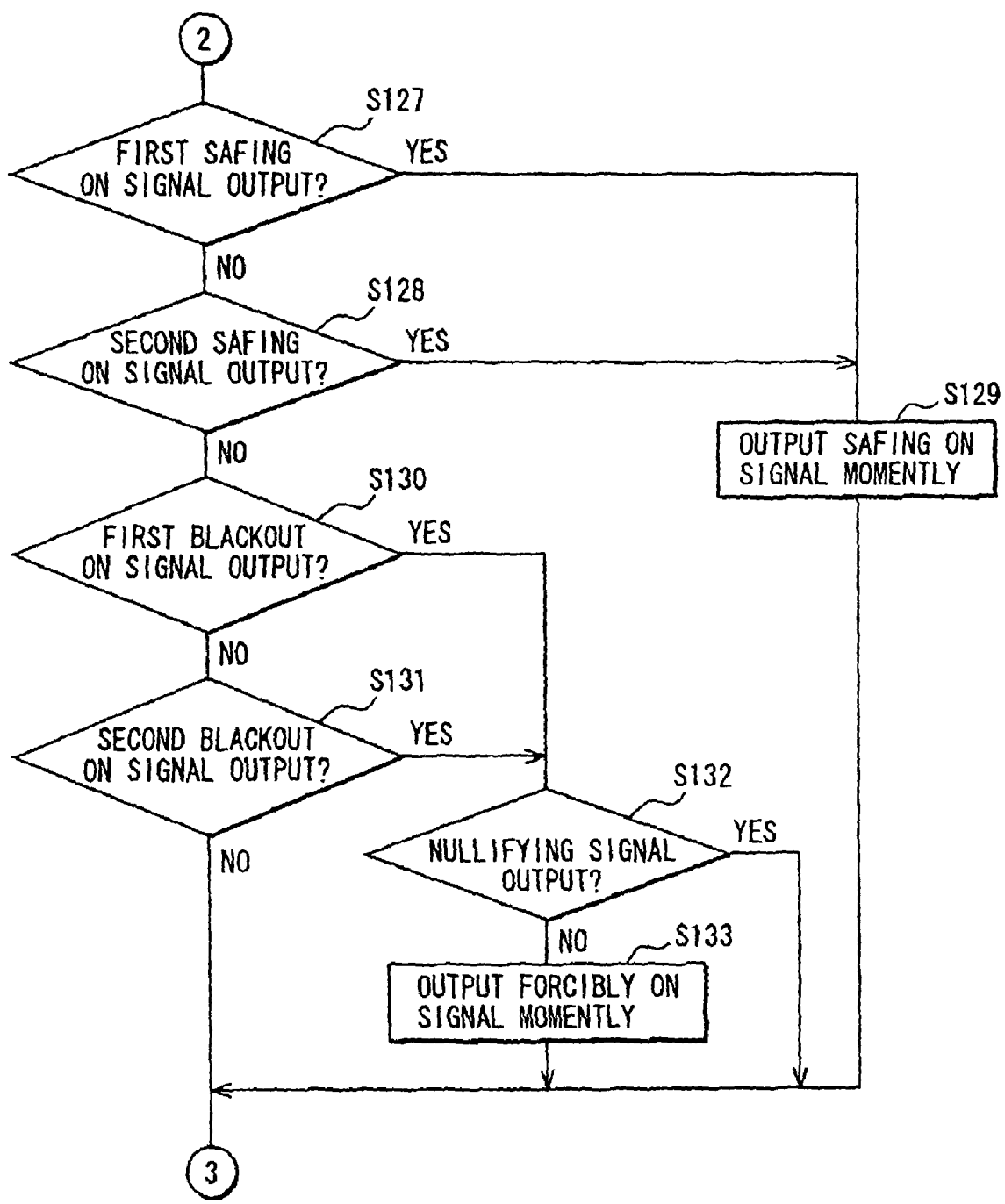

Next, processings are subjected to the analog signals output from the first and second safing determiners 144, 145, and the forcibly safing ON signal generator 149. As shown in FIG. 5, in step S127, the safing ON signal generator 146 evaluates whether the first safing ON signal is output. In step S128, the safing ON signal generator 146 evaluates whether the second safing ON signal is output.

When either the first or second safing ON signal is output in steps S127, S128, the routine proceeds to step S129, in which the safing ON signal generator 146 outputs the safing ON signal for a predetermined period. By contrast, when both the first and second safing ON signals are not output in steps S127, S128, the safing ON signal generator 146 does not output the safing ON signal. In this case, the routine proceeds to S130, in which the forcibly safing ON signal generator 149 evaluates whether the first blackout ON signal is output. In step S131, the forcibly safing ON signal generator 149 evaluates whether the second blackout ON signal is output.

When either the first or second blackout ON signal is output in steps S130, S131, the routine proceeds to step S132, in which the forcibly safing ON signal generator 149 evaluates whether the nullifying signal is output from the diagnosis unit 15. When the nullifying signal is not output, the routine proceeds to step S133, in which the forcibly safing ON signal generator 149 outputs the forcibly safing ON signal for the predetermined period. By contrast, when both the first and second blackout ON signals are not output in steps S130, S131, the forcibly safing ON signal generator 149 does not output the forcibly safing ON signal. In step S132, when the nullifying signal is output, the forcibly safing ON signal generator 149 does not output the forcibly safing ON signal.

Figure 6:
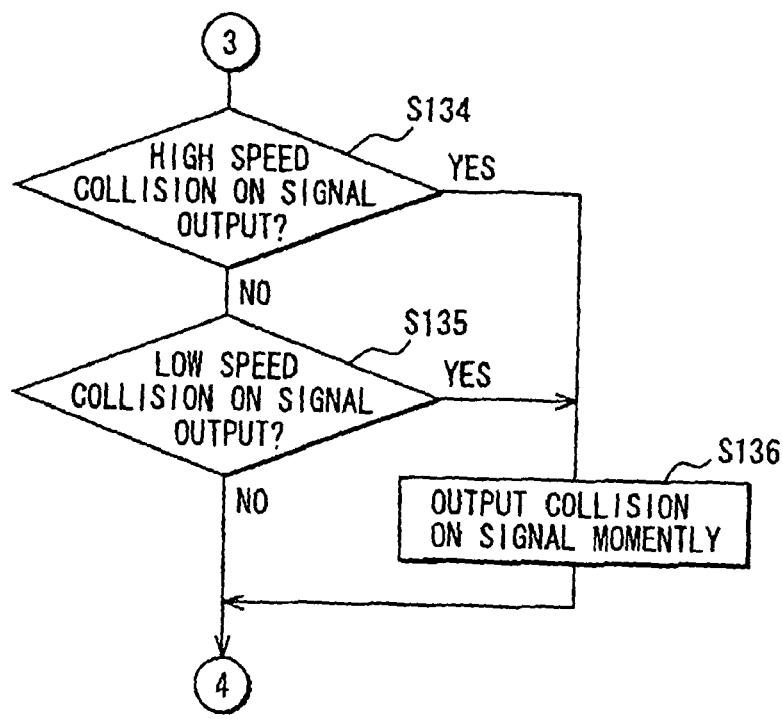

Next, processings are subjected to the signals output from the high and low speed collision determiners 113, 114. As shown in FIG. 6, in steps S134, S135, the collision ON signal generator 115 evaluates whether the high and low speed collision ON signals are output.

When either the high or low speed collision ON signal is output in steps S134, S135, the routine proceeds to step S136, in which the collision ON signal generator 115 outputs the collision ON signal. By contrast, when both the high and low speed collision ON signals are not output in steps S134, S135, the collision ON signal generator 115 does not output the collision ON signal.

Figure 7:
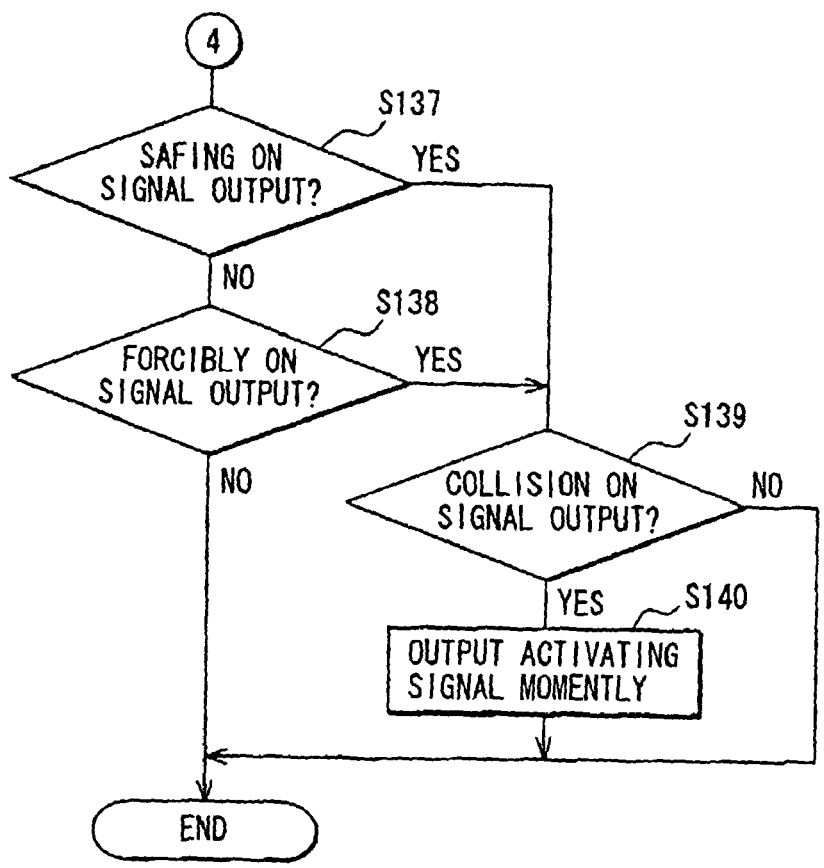

Next, processings are subjected to the signals output from the safing ON signal generator 146, the forcibly safing ON signal generator 149, and the collision ON signal generator 115. As shown in FIG. 7, in steps S137, S138, the activating signal generator 16 evaluates whether the safing ON signal and the forcibly safing ON signal are output.

When either the safing ON signal or the forcibly safing ON signal is output in steps S137, S138, the routine proceeds to step S139, in which the activating signal generator 16 evaluates whether the collision ON signal is output. When the collision ON signal is output in step S139, the routine proceeds to step S140, in which the activating signal generator 16 outputs the activating signal for a predetermined period. By contrast, when both the safing ON signal and the forcibly safing ON signal are not output in steps S137, S138, the activating signal generator 16 does not output the activating signal.

Figure 8:
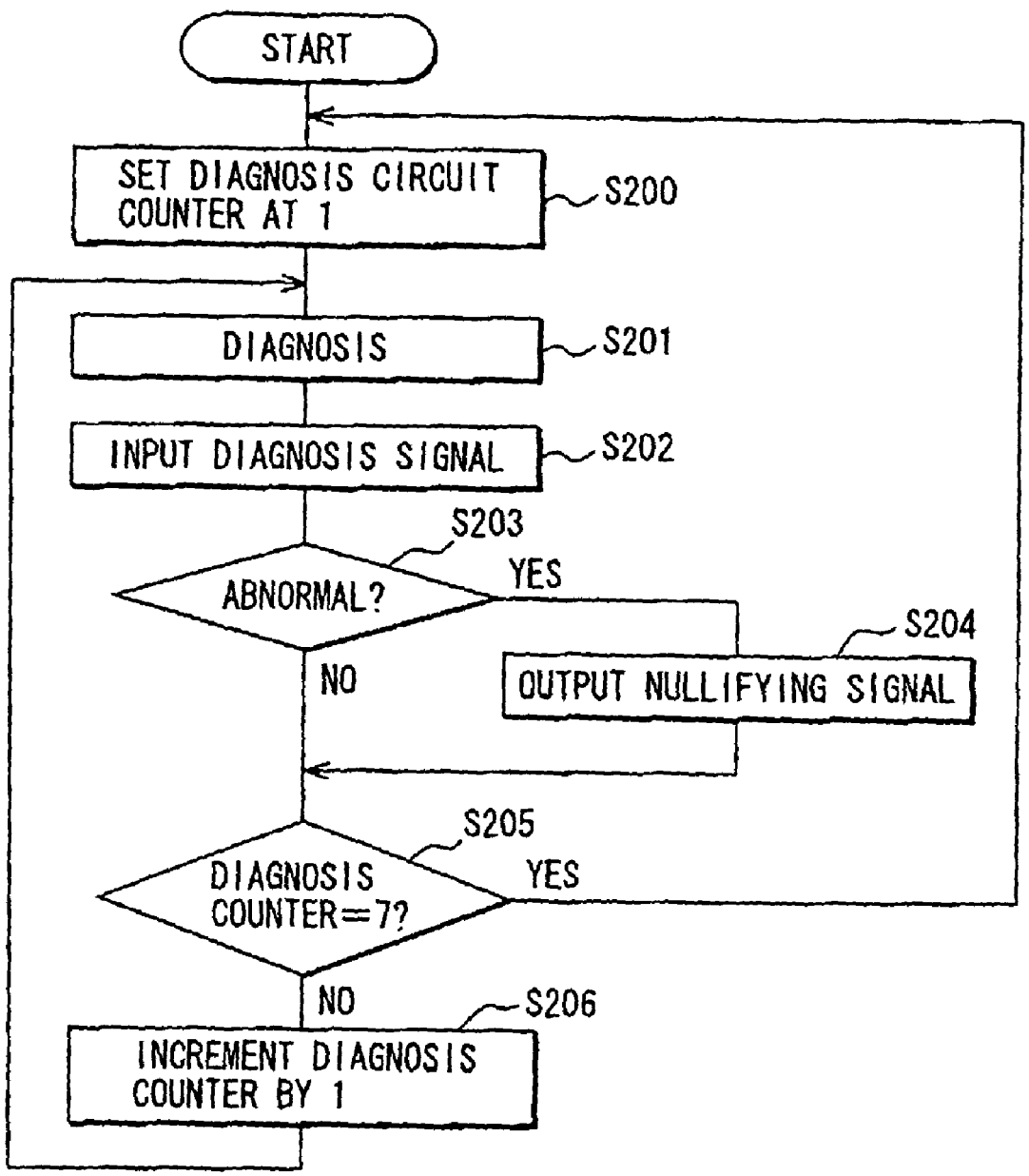
FIG. 8 is a flowchart showing a diagnosis operation for the air bag apparatus, according to the first embodiment.

Next, the diagnosis operation is described. As shown in FIG. 8, in step S200, the diagnosis controller 151 sets a diagnosis circuit counter at 1. The diagnosis circuit counter specifies one of the diagnosis circuits 150a to 150g. In step S201, the diagnosis controller 151 controls the one of the diagnosis circuits 150a to 150g specified by the diagnosis circuit counter. In step S202, the diagnosis controller 151 inputs the diagnosis signals output from the one of the diagnosis circuits 150a to 150g. In step S203, the diagnosis controller 151 evaluates abnormality of the diagnosed component, which is the one of the diagnosis circuits 150a to 150g, in accordance with the input diagnosis signal.

When the diagnosis controller 151 determines the diagnosed component to be abnormal, the routine proceeds to step S204, in which the diagnosis controller 151 outputs the nullifying signal. By contrast, when the diagnosis controller 151 determines the diagnosed component to be normal, the diagnosis controller 151 does not output the nullifying signal. Subsequently, in step S205, the diagnosis controller 151 evaluates whether a diagnosis counter is equal to 7. When the diagnosis counter is equal to 7 in step S205, it is determined that the diagnosis operation is completed in accordance with throughout the diagnosis circuits 150a to 150g, so that the routine returns to step S200, and similar processings are repeated. By contrast, when the diagnosis counter is not equal to 7 in step S205, the diagnosis operation is determined not to be completed in accordance with throughout the diagnosis circuits 150a to 150g, so that the routine proceeds to step S206. In step S206, the diagnosis controller 151 increments the diagnosis counter by 1, and the routine returns to step S201, and similar processings are repeated.

In this embodiment, the air bag apparatus 1 can be restricted from causing a misoperation even when the air bag apparatus 1 is excessively exposed to water and proper performance of the air bag apparatus 1 is impaired. Thus, reliability of the air bag apparatus 1 can be enhanced. When the air bag apparatus 1 is excessively exposed to water, the air bag apparatus 1 may cause an electric leak. Consequently, blackout may arise in the communication of the first and second front sensors 12, 13. In addition, components such as the power source circuit, the backup circuit, the squib, the squib activating circuit, the passenger sensor, and the floor sensor 10, may extensively cause abnormality.

Therefore, when abnormality arise in the components in addition to blackout of communication of the first and second front sensors 12, 13, it is determined that the blackout of the first and second front sensors 12, 13 are caused by excessive exposure to water, not due to collision of the vehicle. In this condition, communication of the first and second front sensors 12, 13 is disrupted. Therefore, the integrated value may not become greater than the first and second safing thresholds, so that the safing ON signal is not output. Outputting the forcibly safing ON signal can be restricted by outputting the nullifying signal when abnormality of the diagnosed component excluding blackout of communication is detected. Furthermore, outputting the activating signal can be stopped by restricting the outputting the safing ON signal even when the collision ON signal is output. Therefore, the air bag apparatus 1 can be restricted from causing a misoperation due to excessive exposure to water.

Second Embodiment

Figure 9:
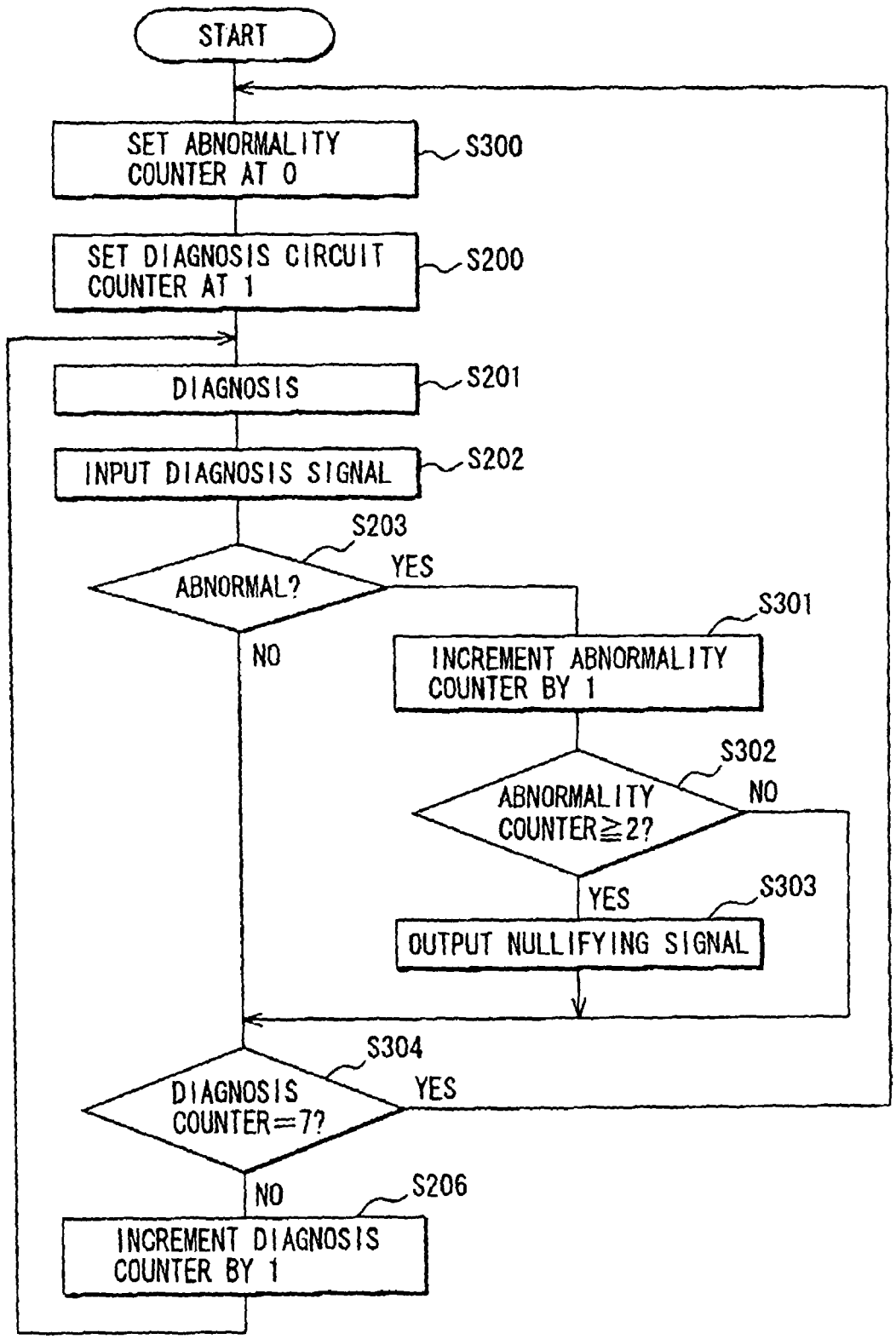
FIG. 9 is a flowchart showing a diagnosis operation for the air bag apparatus, according to a second embodiment.

A diagnosis operation of the diagnosis unit 15 in this embodiment is described in reference to FIG. 9. In step 300, the diagnosis controller 151 resets an abnormal component counter at 0. The abnormal component counter counts the number of abnormal portions, i.e., components, which cause abnormality. Subsequently, step S200 and subsequent steps are executed, similarly to the first embodiment.

In step S203, when the diagnosed component is abnormal, the routine proceeds to step S301, in which the diagnosis controller 151 increments the abnormal component counter by 1. In step S302, the diagnosis controller 151 evaluates whether the abnormal component counter is equal to or greater than 2. When the abnormal component counter is equal to or greater than 2, the diagnosis controller 151 determines that abnormality is caused in multiple diagnosed components. In this case, the routine proceeds to step S303, in which the diagnosis controller 151 outputs the nullifying signal. By contrast, in step S302, when the abnormal component counter is less than 2, the diagnosis controller 151 does not output the nullifying signal. Subsequently, in step S304, the diagnosis controller 151 evaluates whether the diagnosis counter is equal to 7. When the diagnosis counter is equal to 7, the routine returns to step S300, and similar processings are repeated. By contrast, when the diagnosis counter is not equal to 7 in step S304, the routine proceeds to step S206, in which the diagnosis controller 151 increments the diagnosis counter by 1, and the routine returns to step S201, and similar processings are repeated.

The abnormal component counter is set at 0 in step S300, so that the abnormal component counter does not increase due to abnormality caused in the same component.

In this embodiment, excessive exposure to water can be further steadily evaluated. When the air bag apparatus 1 is excessively exposed to water, the air bag apparatus 1 may simultaneously cause various abnormality due to an electric leak, in addition to blackout of communication of the first and second front sensors 12, 13. Therefore, abnormality of multiple diagnosed components are detected in addition to blackout of communication, so that excessive exposure to water can be further steadily evaluated.

Third Embodiment

Figure 10:
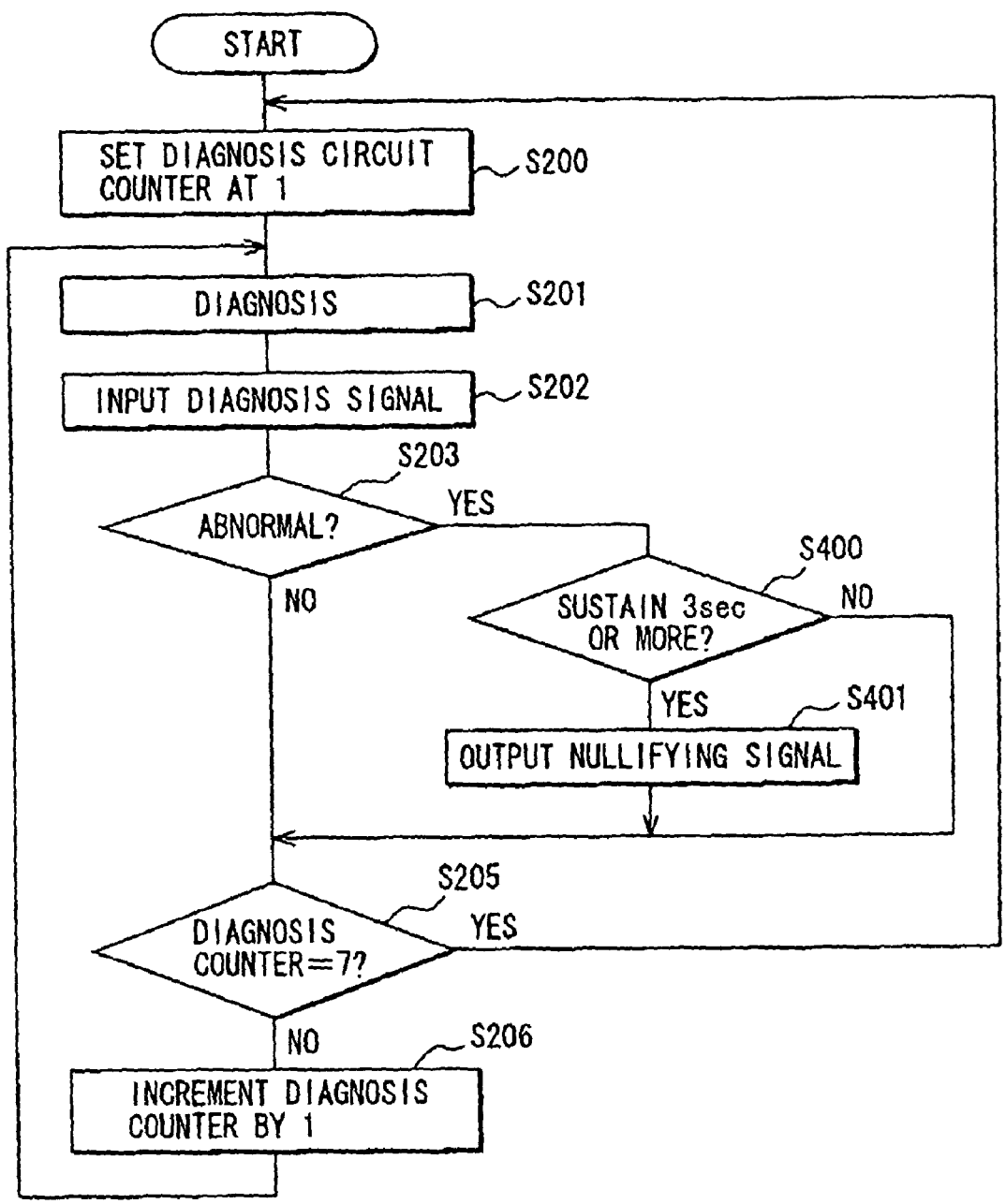
FIG. 10 is a flowchart showing a diagnosis operation for the air bag apparatus, according to a third embodiment.

A diagnosis operation of the diagnosis unit 15 in this embodiment is described in reference to FIG. 10. The routine of steps S200 to S203 are executed, similarly to the first embodiment. In step S203, when the diagnosed component is abnormal, the routine proceeds to step S400, in which the diagnosis controller 151 evaluates whether the abnormality is sustained for a period equal to or greater than 3 sec, for example. When the abnormality is sustained for 3 sec or greater, the diagnosis controller 151 determines that a malfunction occurs in the diagnosed component. In this case, the routine proceeds to step S401, in which the diagnosis controller 151 outputs the nullifying signal. By contrast, when the abnormality is sustained for a period less than 3 sec, the diagnosis controller 151 determines that a malfunction does not occur in the diagnosed component, so that the diagnosis controller 151 does not output the nullifying signal. Subsequently, step S205 and subsequent steps are executed. In this embodiment, when the abnormality is sustained for 3 sec or greater, it is determined that the diagnosed component causes a malfunction. The abnormality is not instantaneous failure in a case where the abnormality is sustained for 3 sec or greater. Therefore, in this case, it is determined that the diagnosed component causes a malfunction.

The diagnosis controller 151 may erroneously detect abnormality due to instantaneous noise, for example. Therefore, abnormality can be further steadily detected by evaluating whether the abnormal condition is sustained for 3 sec or greater. Thus, in this embodiment, abnormality can be further steadily detected.

In addition, the first and second blackout ON signals are output when the digital signal is not properly received for a period equal to or greater than 5 msec, for example. By contrast, the nullifying signal is output when the abnormality in the diagnosed component is sustained for 3 sec or greater, for example. The first and second blackout ON signals are output prior to the nullifying signal, so that a misoperation can be restricted by immediately detecting blackout of communication of the first and second front sensors 12, 13.

The threshold of the period for determining abnormality is not limited to 3 sec. This threshold of the period can be determined as appropriate.

Fourth Embodiment

Figure 11:
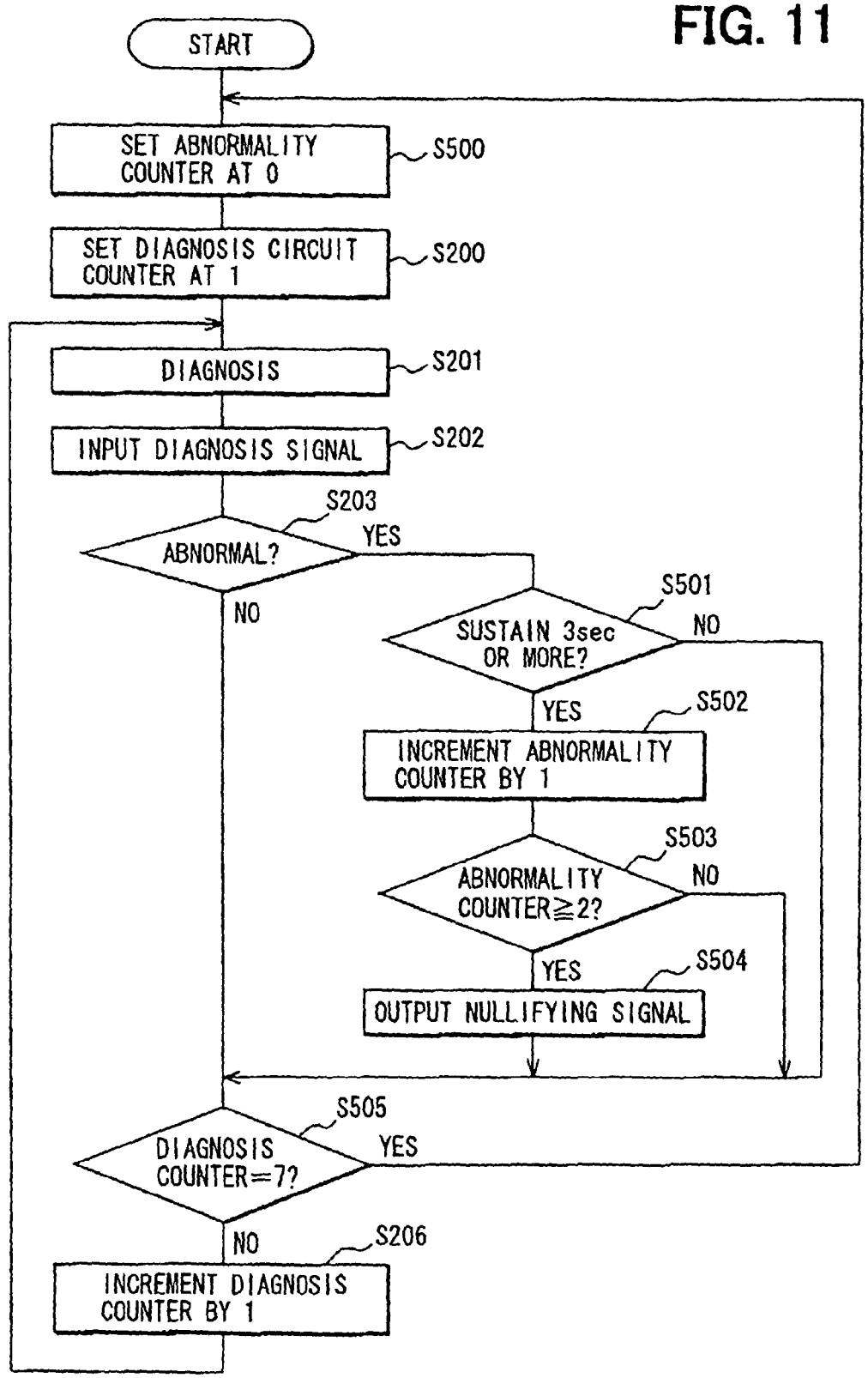
FIG. 11 is a flowchart showing a diagnosis operation for the air bag apparatus, according to a fourth embodiment.

A diagnosis operation of the diagnosis unit 15 in this embodiment is described in reference to FIG. 11. In step 500, the diagnosis controller 151 resets an abnormal component counter at 0. The abnormal component counter counts the number of abnormal portions, i.e., components each causing abnormality. Subsequently, step S200 and subsequent steps are executed, similarly to the first embodiment.

In step S203, when the diagnosed component is abnormal, the routine proceeds to S501, in which the diagnosis controller 151 evaluates whether the abnormality is sustained for 3 sec or greater. When the abnormality is sustained for 3 sec or greater, the diagnosis controller 151 determines that a malfunction occurs in the diagnosed component. In this case, the routine proceeds to step S502, in which the diagnosis controller 151 increments the abnormal component counter by 1. In step S503, the diagnosis controller 151 evaluates whether the abnormal component counter is equal to or greater than 2. When the abnormal component counter is equal to or greater than 2, the diagnosis controller 151 determines that abnormality is caused in multiple diagnosed components. In this case, the routine proceeds to step S504, in which the diagnosis controller 151 outputs the nullifying signal. By contrast, in step S503, when the abnormal component counter is less than 2, the diagnosis controller 151 does not output the nullifying signal. Subsequently, in step S505, the diagnosis controller 151 evaluates whether the diagnosis counter is equal to 7. When the diagnosis counter is equal to 7, the routine returns to step S500, and similar processings are repeated. By contrast, when the diagnosis counter is not equal to 7 in step S505, the routine proceeds to step S206, in which the diagnosis controller 151 increments the diagnosis counter by 1, and the routine returns to step S201, and similar processings are repeated.

The abnormal component counter is set at 0 in step S500, so that the abnormal component counter does not increase due to abnormality caused in the same component.

In this embodiment, excessive exposure to water can be further steadily evaluated by detecting abnormality of multiple diagnosed components in addition to blackout of communication.

The threshold of the abnormal component counter for determining abnormality is not limited to 2. This threshold of the period can be determined as appropriate.

Fifth Embodiment

Figure 12:
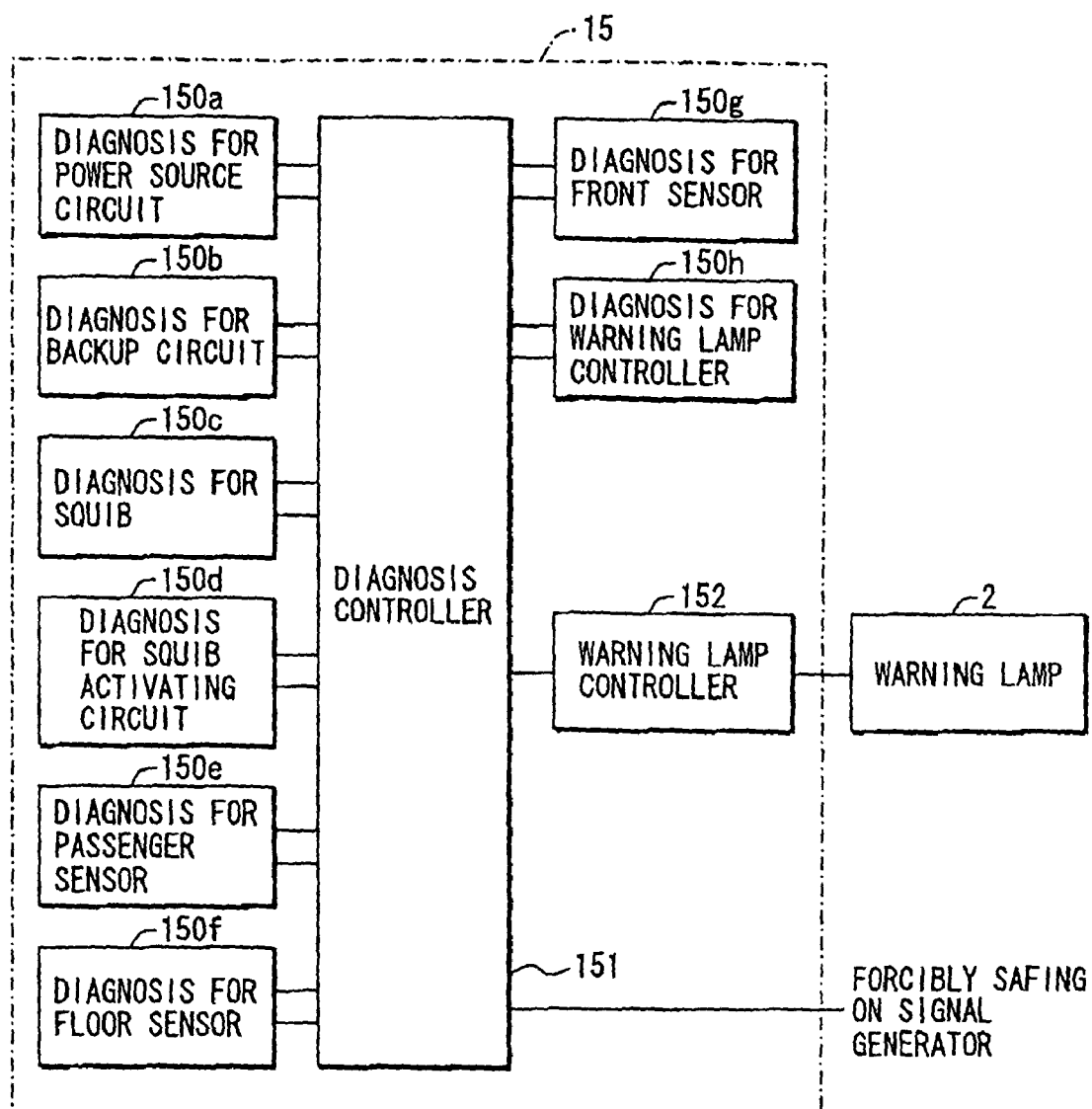
FIG. 12 is a block diagram showing a diagnosis unit of the air bag apparatus, according to a fifth embodiment.

As shown in FIG. 12, the diagnosis unit 15 is constructed of diagnosis circuits 150a to 150h, the diagnosis controller 151, and a warning lamp controller 152. That is, the diagnosis unit 15 in the first embodiment is provided additionally with the warning lamp controller 152 and a warning lamp controller diagnosis circuit 150h. The warning lamp controller 152 turns a warning lamp ON in accordance with a command of the diagnosis controller 151 when a diagnosed component causes abnormality in the air bag apparatus 1. The warning lamp controller 152 connects with a warning lamp 2. The warning lamp controller diagnosis circuit 150h outputs information, which is necessary for a diagnosis operation of the warning lamp controller 152, in accordance with a command of the diagnosis controller 151.

Figure 13:
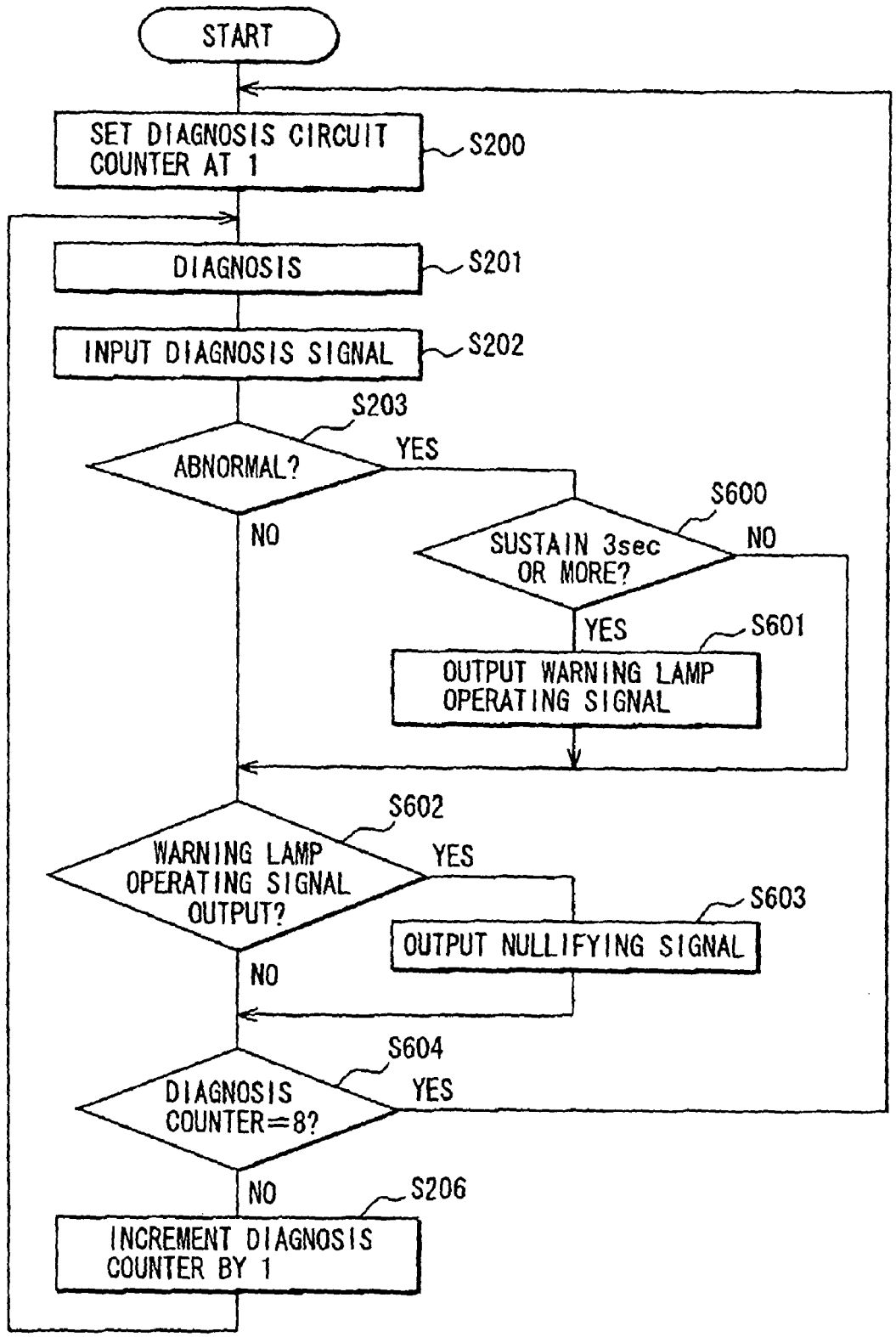
FIG. 13 is a flowchart showing a diagnosis operation for the air bag apparatus, according to the fifth embodiment.

Next, a diagnosis operation of this embodiment is described. As shown in FIG. 13, in step S200, the diagnosis controller 151 sets the diagnosis circuit counter at 1. The diagnosis circuit counter specifies one of the diagnosis circuits 150a to 150h. One of the diagnosis circuits 150a to 150h is specified corresponding to one of the diagnosis circuit counter 1 to 8. Subsequently, step S201 and subsequent steps are executed, similarly to the first embodiment.

In step S203, when the diagnosed component is abnormal, the routine proceeds to S600, in which the diagnosis controller 151 evaluates whether the abnormality is sustained for 3 sec or greater. When the abnormality is sustained for 3 sec or greater, the diagnosis controller 151 determines that a malfunction occurs in the diagnosed component. In this case, the routine proceeds to step S601, in which the diagnosis controller 151 outputs a warning lamp operating signal. By contrast, when the abnormality is sustained for 3 sec or less, the diagnosis controller 151 determines that a malfunction does not occur in the diagnosed component, so that the diagnosis controller 151 does not output the warning lamp operating signal. In step S602, the diagnosis controller 151 evaluates whether the warning lamp operating signal is output.

In step S602, when the warning lamp operating signal is output, the routine proceeds to step S603, in which the diagnosis controller 151 outputs the nullifying signal. By contrast, when the warning lamp operating signal is not output, the diagnosis controller 151 does not output the nullifying signal. Subsequently, in step S604, the diagnosis controller 151 evaluates whether the diagnosis counter is equal to 8. When the diagnosis counter is equal to 8, it is determined that the diagnosis operation is completed in accordance with throughout the diagnosis circuits 150a to 150h, so that the routine returns to step S200, and similar processings are repeated. By contrast, when the diagnosis counter is not equal to 8 in step S604, it is determined that the diagnosis operation is not completed in accordance with throughout the diagnosis circuits 150a to 150h. In this case, the routine proceeds to step S206, in which the diagnosis controller 151 increments the diagnosis counter by 1, and the routine returns to step S201, and similar processings are repeated.

In this embodiment, a warning operation can be performed when the air bag apparatus 1 causes abnormality.

Sixth Embodiment

Figure 14:
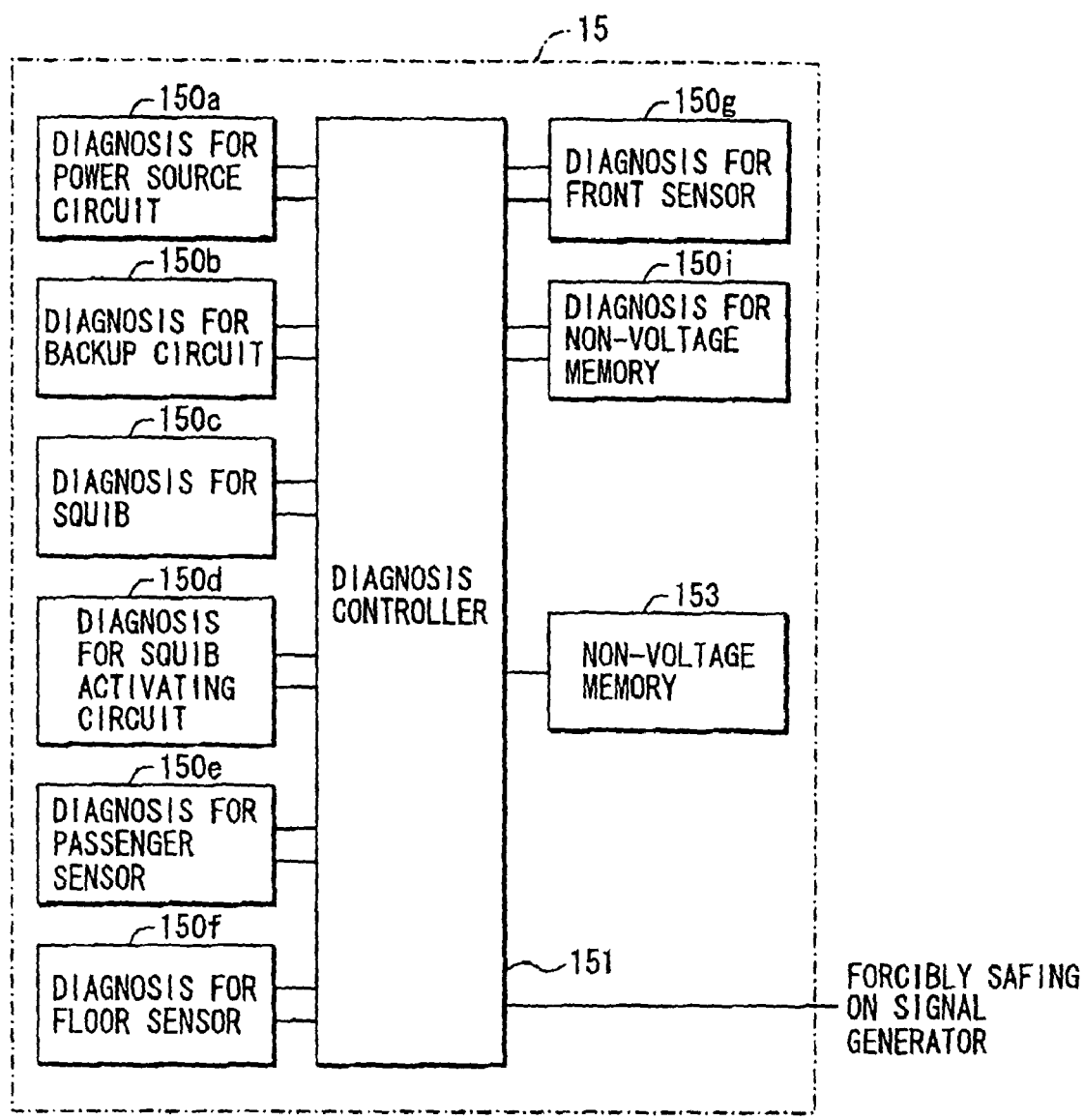
FIG. 14 is a block diagram showing a diagnosis unit of the air bag apparatus, according to a sixth embodiment.

As shown in FIG. 14, the diagnosis unit 15 is constructed of diagnosis circuits 150a to 150g, and 150i, the diagnosis controller 151, and a non-volatile memory 153. That is, the diagnosis unit 15 in the first embodiment is provided additionally with the non-volatile memory 153 and a non-volatile memory diagnosis circuit 150i.

The nonvolatile memory 153 stores an abnormality code in accordance with a command of the diagnosis controller 151 when a diagnosed component causes abnormality in the air bag apparatus 1. The non-volatile memory diagnosis circuit 150i outputs information, which is necessary for a diagnosis operation of the non-volatile memory 153, in accordance with a command of the diagnosis controller 151.

Figure 15:
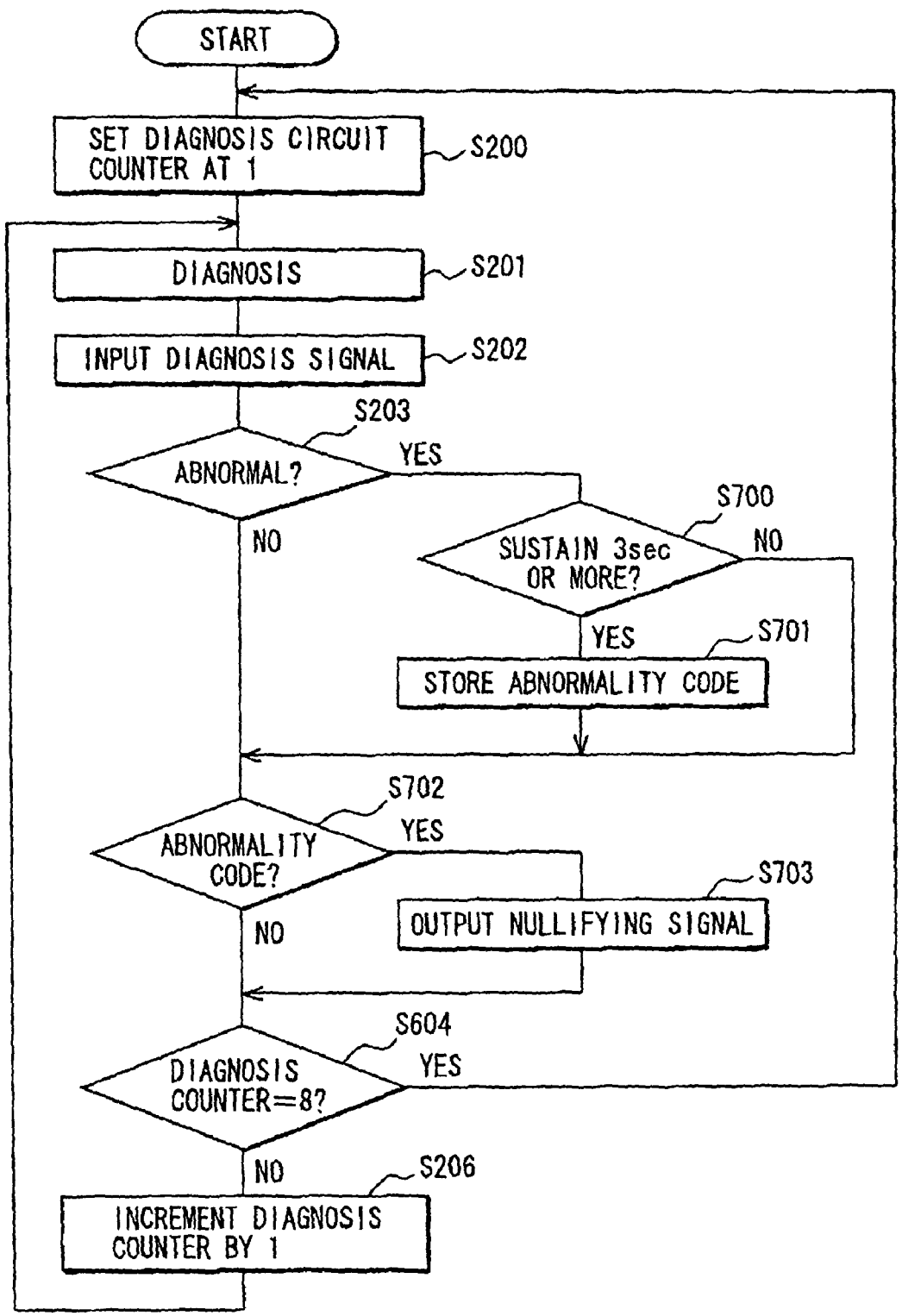
FIG. 15 is a flowchart showing a diagnosis operation for the air bag apparatus, according to the sixth embodiment.

Next, a diagnosis operation of this embodiment is described. As shown in FIG. 15, in step S200, the diagnosis controller 151 sets the diagnosis circuit counter at 1. The diagnosis circuit counter specifies one of the diagnosis circuits 150a to 150g, and 150i. One of the diagnosis circuits 150a to 150g, and 150i is specified corresponding to one of the diagnosis circuit counter 1 to 8. Subsequently, step S201 and subsequent steps are executed, similarly to the first embodiment.

In step S203, when the diagnosed component is abnormal, the routine proceeds to S700, in which the diagnosis controller 151 evaluates whether the abnormality is sustained for 3 sec or greater. When the abnormality is sustained for 3 sec or greater, the diagnosis controller 151 determines that a malfunction occurs in the diagnosed component. In this case, the routine proceeds to step S701, in which the non-volatile memory 153 stores the abnormality code. By contrast, where the abnormality is sustained for 3 sec or less, the diagnosis controller 151 determines that a malfunction does not occur in the diagnosed component, so that the non-volatile memory 153 does not store the abnormality code. In step S702, the diagnosis controller 151 evaluates whether the non-volatile memory 153 stores the abnormality code.

In step S702, when the non-volatile memory 153 stores the abnormality code, the routine proceeds to step S703, in which the diagnosis controller 151 outputs the nullifying signal. By contrast, when the non-volatile memory 153 does not store the abnormality code, the diagnosis controller 151 does not output the nullifying signal. Subsequently, in step S604, the diagnosis controller 151 evaluates whether the diagnosis counter is equal to 8. When the diagnosis counter is equal to 8, it is determined that the diagnosis operation is completed in accordance with throughout the diagnosis circuits 150a to 150g, and 150i, so that the routine returns to step S200, and similar processings are repeated. By contrast, when the diagnosis counter is not equal to 8 in step S604, it is determined that the diagnosis operation is not completed in accordance with throughout the diagnosis circuits 150a to 150g, and 150i. In this case, the routine proceeds to step S206, in which the diagnosis controller 151 increments the diagnosis counter by 1, and the routine returns to step S201, and similar processings are repeated.

In this embodiment, the abnormality code of the air bag apparatus 1 can be stored.

Seventh Embodiment

Figure 16:
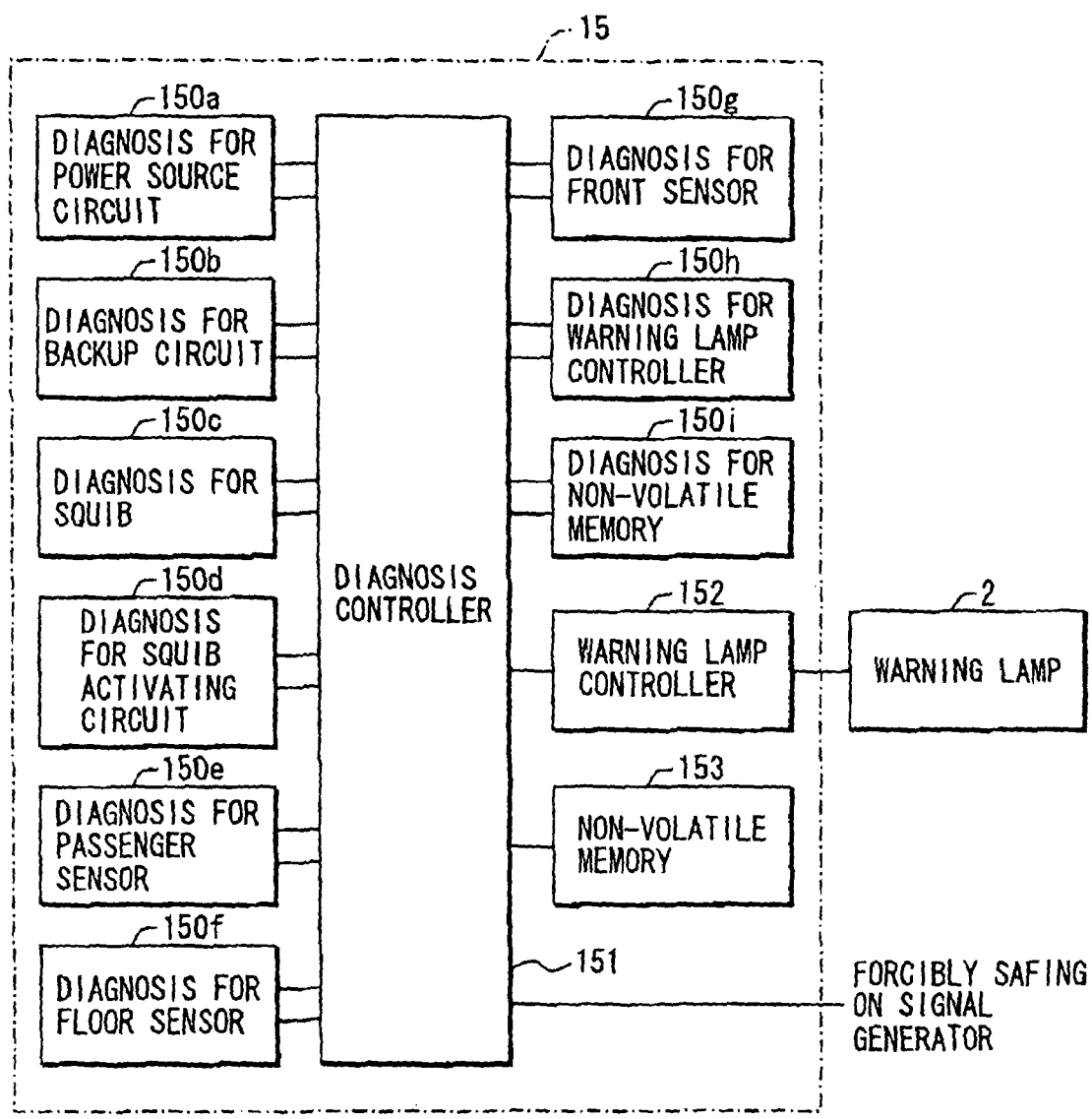
FIG. 16 is a block diagram showing a diagnosis unit of the air bag apparatus, according to a seventh embodiment.

As shown in FIG. 16, the diagnosis unit 15 is constructed of diagnosis circuits 150a to 150i, the diagnosis controller 151, the warning lamp controller 152, and the non-volatile memory 153. That is, the diagnosis unit 15 in the first embodiment is provided additionally with the warning lamp controller 152, the non-volatile memory 153, the warning lamp controller diagnosis circuit 150h, and the non-volatile memory diagnosis circuit 150i.

Figure 17:
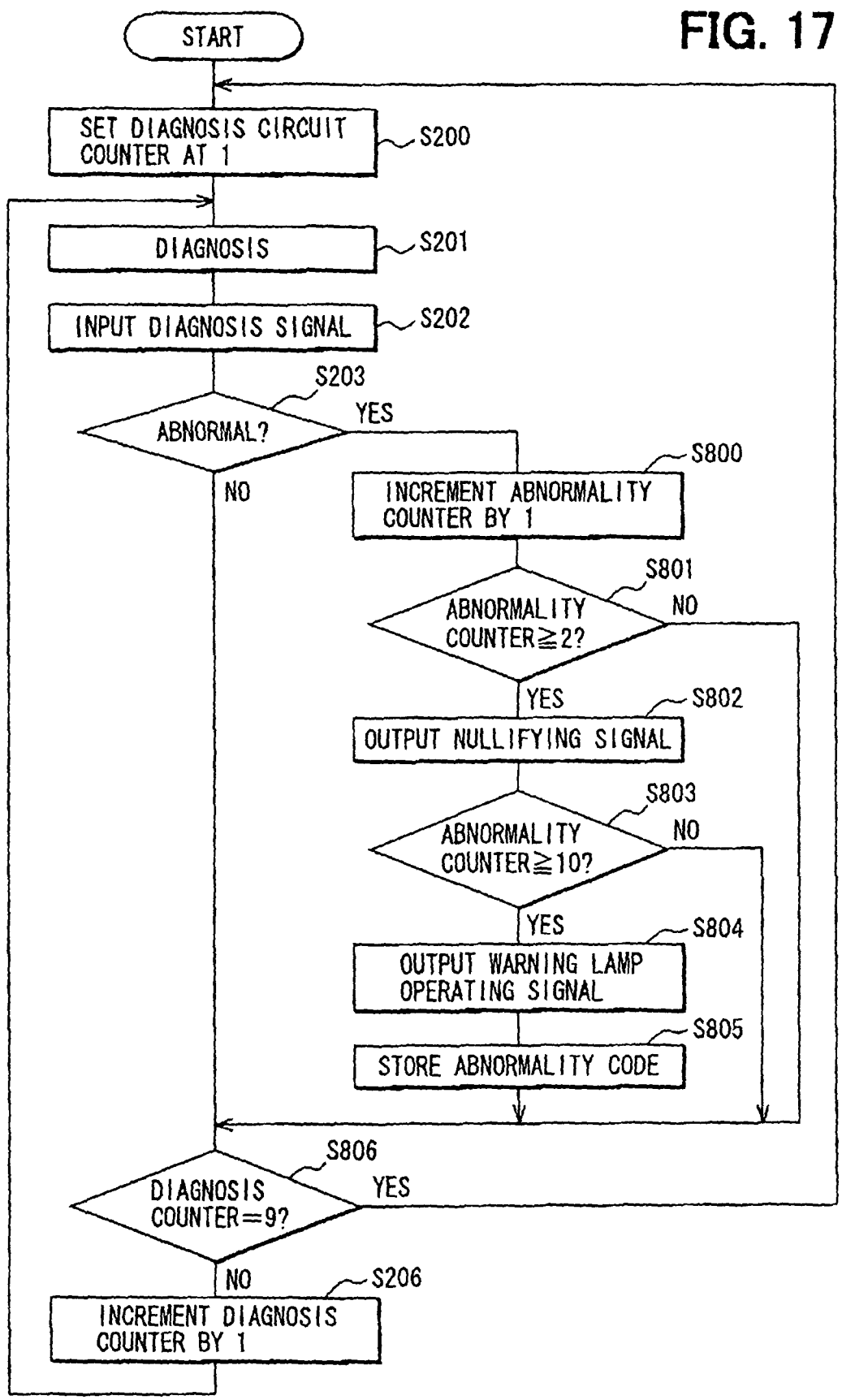
FIG. 17 is a flowchart showing a diagnosis operation for the air bag apparatus, according to the seventh embodiment.

Next, a diagnosis operation of this embodiment is described. As shown in FIG. 17, in step S200, the diagnosis controller 151 sets the diagnosis circuit counter at 1. The diagnosis circuit counter specifies one of the diagnosis circuits 150a to 150i. One of the diagnosis circuits 150a to 150i is specified corresponding to one of the diagnosis circuit counter 1 to 9. Subsequently, step S201 and subsequent steps are executed, similarly to the first embodiment.

In step S203, when the diagnosed component is abnormal, the routine proceeds to S800, in which the diagnosis controller 151 increments an abnormality counter by 1. The abnormality counter counts a number of diagnosed components causing abnormality. The diagnosis operation is repeated at predetermined intervals, so that a period, in which an abnormal condition sustains, can be detected in accordance with the abnormality counter. In step S801, in which the diagnosis controller 151 evaluates whether the abnormality counter is equal to or greater than 2.

When the abnormality counter is equal to or greater than 2, the routine proceeds to step S802, in which the diagnosis controller 151 outputs the nullifying signal. By contrast, when the abnormality counter is less than 2, the diagnosis controller 151 does not output the nullifying signal. Subsequently, in step S803, the diagnosis controller 151 evaluates whether the abnormality counter is equal to or greater than 10. When the abnormality counter is equal to or greater than 10, the diagnosis controller 151 determines that a malfunction occurs in the diagnosed component. In this case, the routine proceeds to step S804, in which the diagnosis controller 151 outputs a warning lamp operating signal, subsequently, in step S805, the diagnosis controller 151 stores the abnormality code.

By contrast, when the abnormality counter is less than 10, the diagnosis controller 151 determines that a malfunction does not occur in the diagnosed component, so that the diagnosis controller 151 does not output the warning lamp operating signal, and does not store the abnormality code. Subsequently, in step S806, the diagnosis controller 151 evaluates whether the diagnosis counter is equal to 9. When the diagnosis counter is equal to 9, it is determined that the diagnosis operation is completed in accordance with throughout the diagnosis circuits 150a to 150i, so that the routine returns to step S200, and similar processings are repeated. By contrast, when the diagnosis counter is not equal to 9 in step S806, it is determined that the diagnosis operation is not completed in accordance with throughout the diagnosis circuits 150a to 150i. In this case, the routine proceeds to step S206, in which the diagnosis controller 151 increments the diagnosis counter by 1, and the routine returns to step S201, and similar processings are repeated.

In this embodiment, the period, in which abnormality excluding blackout of communication is sustained, can be steadily detected in accordance with the abnormality counter. Specifically, the diagnosis operation is repeated at predetermined intervals, so that the period, in which abnormality of the diagnosed component is sustained, can be steadily obtained in accordance with the interval and the abnormality counter.

The threshold of the abnormality counter for determining a malfunction occurring in the diagnosed component is not limited to 10. This threshold of the period can be determined as appropriate.

In the above first to seventeenth embodiments, the floor sensor 10 may serve as a first sensor. The first front sensor 12 may serve as a second sensor. The second front sensor 13 may serve as a second sensor.

In the above first to seventeenth embodiments, the A/D converter 110, the HPF 111, the LPF 112, the high speed collision determiner 113, and the collision ON signal generator 115 may serve as a first control signal generating unit. The A/D converter 110, the HPF 111, the LPF 112, the low speed collision determiner 114, and the collision ON signal generator 115 also may serve as the first control signal generating unit. The serial I/F 140, the HPF 142, the first safing determiner 144, the safing ON signal generator 146 may serve as a second control signal generating unit. The serial I/F 141, the HPF 143, the second safing determiner 145, the safing ON signal generator 146 also may serve as the second control signal generating unit. The blackout determiner 147, the forcibly safing ON signal generator 149 may serve as a third control signal generating unit. The blackout determiner 148, the forcibly safing ON signal generator 149 also may serve as the third control signal generating unit. The diagnosis unit 15 may serve as a fourth control signal generating unit.

In the above first to seventeenth embodiments, the high speed collision threshold may correspond to a first threshold. The low speed collision threshold may correspond to a first threshold. The first safing threshold may correspond to a second threshold. The second safing threshold may correspond to a second threshold.

In the above first to seventeenth embodiments, the collision ON signal may correspond to a first control signal. The safing ON signal may correspond to a second control signal. The forcibly safing ON signal may correspond to a third control signal. The nullifying signal may correspond to a fourth control signal.

In the above first to seventh embodiments, the first control signal generator, the second sensor, the second control signal generator, and the third control signal generator are respectively provided by two. However, the numbers of the first to third control signal generators and the second sensor are not limited to those of the above embodiments. The numbers of the first to third control signal generators and the number of the second sensor may be at least one.

In the above first to seventh embodiments, the above blocks of the high and low speed collision determiners 113, 114, the collision ON signal generator 115, the first and second safing determiners 144, 145, the safing ON signal generator 146, the blackout determiners 147, 148, the forcibly safing ON signal generator 149, the diagnosis controller 151, and the activating signal generator 16 is not limited to programs of a micro computer. These blocks may be constructed of an electric circuit such as a discrete circuit.

Eighth Embodiment

Figure 18:
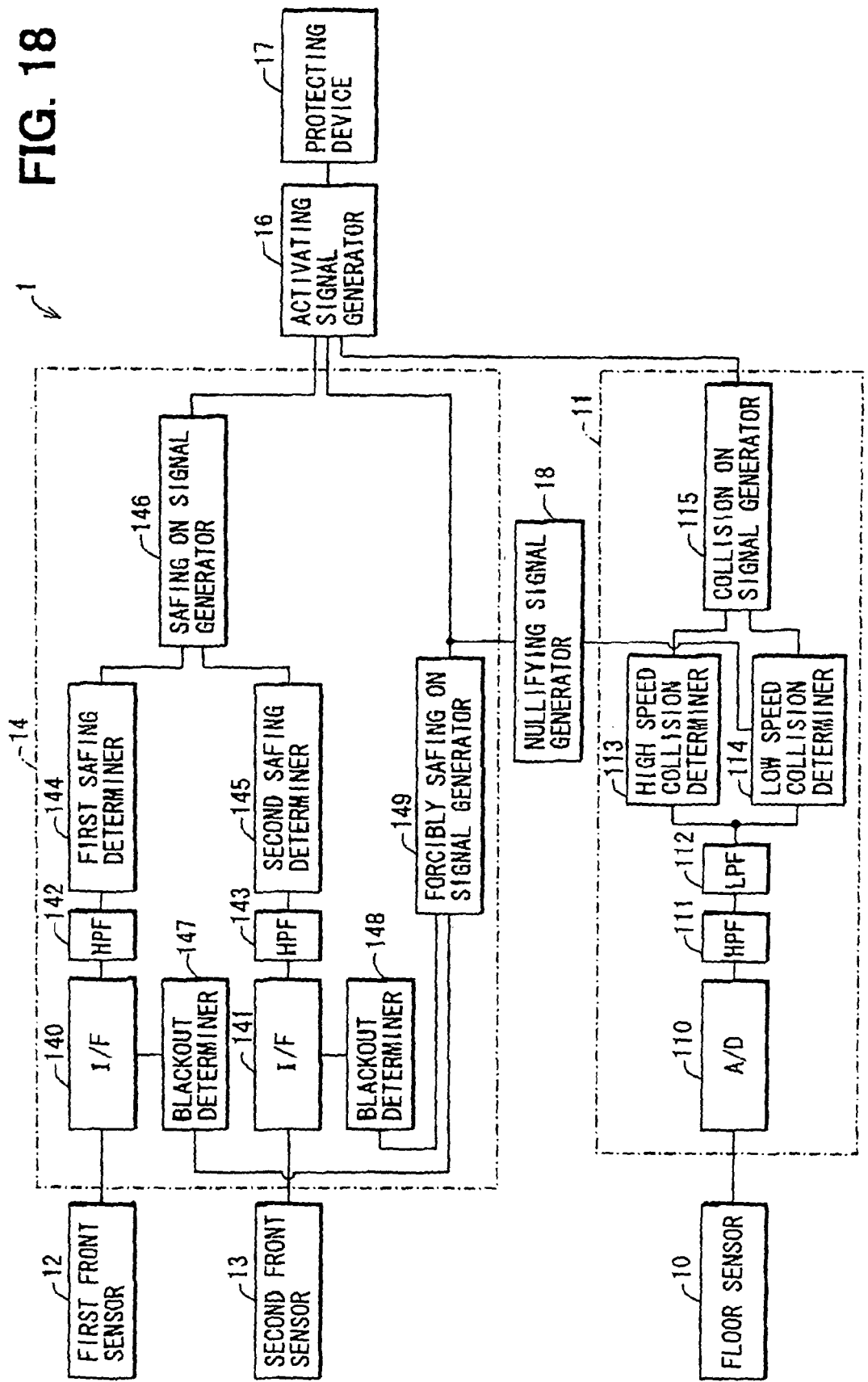
FIG. 18 is a block diagram showing an air bag apparatus, according to an eighth embodiment.

As shown in FIG. 18, in this embodiment, an air bag apparatus 1 is provided with a low speed collision nullifying signal generator (nullifying signal generator) 18 instead of the diagnosis unit 15 in the first embodiment.

The high speed collision determiner 113 evaluates whether collision of the vehicle is high speed collision, in accordance with the acceleration data output from the LPF 112. The high speed collision determiner 113 integrates the acceleration data output from the LPF 112 in a specific period such as 8 ms. Furthermore, the high speed collision determiner 113 compares the integrated value of the acceleration data with the high speed collision threshold such as 196 m/s2. The high speed collision threshold is used for evaluating collision (high speed collision) of the vehicle at high speed. Magnitude of acceleration generated at high speed collision is greater than magnitude of acceleration at low speed collision. Therefore, the high speed collision threshold is set to be greater than the low speed collision threshold. When the integrated value of the acceleration data is greater than the high speed collision threshold, the high speed collision determiner 113 determines that the collision of the vehicle is high speed collision, thereby outputting the high speed collision ON signal to the collision ON signal generator 115.

Figure 19:
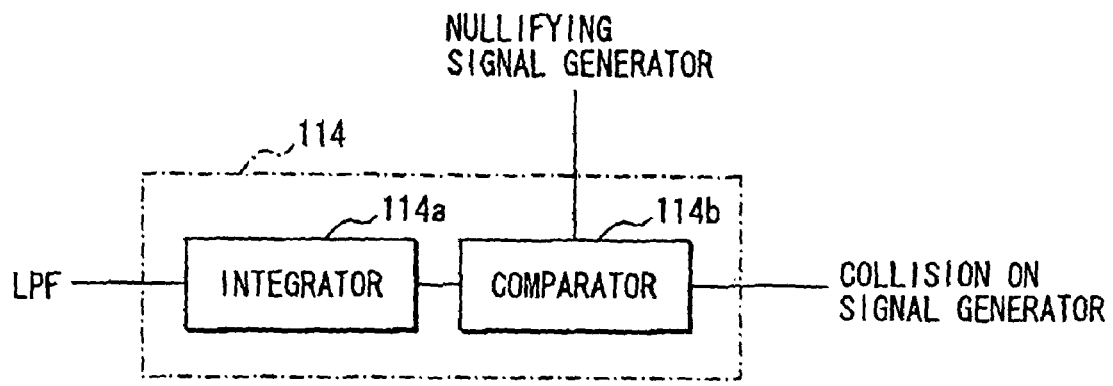
FIG. 19 is a block diagram showing a determiner of the air bag apparatus, according to the eighth embodiment.

The low speed collision determiner 114 evaluates whether the collision of the vehicle is low speed collision, in accordance with the acceleration data output from the LPF 112. In this embodiment, the low speed collision determiner 114 is constructed of an integrator 114a and a comparator 114b (FIG. 19). The integrator 114a integrates the acceleration data output from the LPF 112 in a specific period such as 32 msec.

The comparator 114b compares the integrated value of the acceleration data integrated by the integrator 114a with the low speed collision threshold. The low speed collision threshold may be a value equivalent to an integrated value corresponding to 49 m/s2, for example. The low speed collision threshold is used for evaluating collision (low speed collision) of the vehicle at low speed. An output signal of the comparator 14b is controlled in accordance with a low speed collision nullifying signal (nullifying signal) output from the nullifying signal generator 18. When the nullifying signal is not output, the comparator 114b outputs a result of the comparison. In this case, when the integrated value is greater than the low speed collision threshold, the comparator 114b determines that collision of the vehicle to be low speed collision, thereby outputting a low speed collision ON signal to the collision ON signal generator 115. By contrast, when the nullifying signal is output, the comparator 114b does not output the comparison result, so that the low speed collision ON signal is not output, regardless of magnitude of the integrated value of the acceleration data.

As referred to FIG. 18, the collision ON signal generator 115 evaluates whether the vehicle causes either high speed collision or low speed collision, in accordance with the signal output from the high and low speed collision determiners 113, 114. When the collision ON signal generator 115 inputs either the high speed collision ON signal or the low speed collision ON signal, the collision ON signal generator 115 outputs the collision ON signal to the activating signal generator 16 for the predetermined period.

The first and second front sensors 12, 13 are arranged in front of the right and left side of the vehicle for detecting acceleration of the vehicle with respect to backward and forward direction of the vehicle. In this embodiment, each of the first and second front sensors 12, 13 transmits the digital signal, which corresponds to the magnitude of the acceleration, to the safing determiner 14 via the serial communication.

In this embodiment, the safing determiner 14 evaluates whether the vehicle comes into collision, in accordance with acceleration detected using the first and second front sensors 12, 13, thereby outputting a signal corresponding to the determination result thereof.

In this embodiment, the safing ON signal generator 146 evaluates whether the vehicle comes into collision, in accordance with the signals output from the first and second safing determiners 144, 145. Specifically, when at least one of the first and second safing ON signals is output, the safing ON signal generator 146 outputs the safing ON signal to the activating signal generator 16 for a predetermined period.

In this embodiment, the forcibly safing ON signal generator 149 evaluates blackout of the communication in accordance with the signals output from the blackout determiners 147, 148. When at least one of the first and second blackout signals is output, the forcibly safing ON signal generator 149 outputs the forcibly safing ON signal to the nullifying signal generator 18 and the activating signal generator 16 for a predetermined period.

The nullifying signal generator 18 outputs the nullifying signal in accordance with the signal output from the forcibly safing ON signal generator 149. When the forcibly safing ON signal is output, the nullifying signal generator 18 outputs the nullifying signal to the low speed collision determiner 114 for a predetermined period.

In this embodiment, the activating signal generator 16 outputs the activating signal for activating the protecting device 17 in accordance with the signals output from the collision ON signal generator 115, the safing ON signal generator 146, and the forcibly safing ON signal generator 149. The activating signal generator 16 outputs the activating signal to the protecting device 17 for the predetermined period when the collision ON signal is output and when either the safing ON signal or the forcibly safing ON signal is output.

Next, an operation of the air bag apparatus 1 in this embodiment is described. First, the activating evaluation is described.

Figure 20:
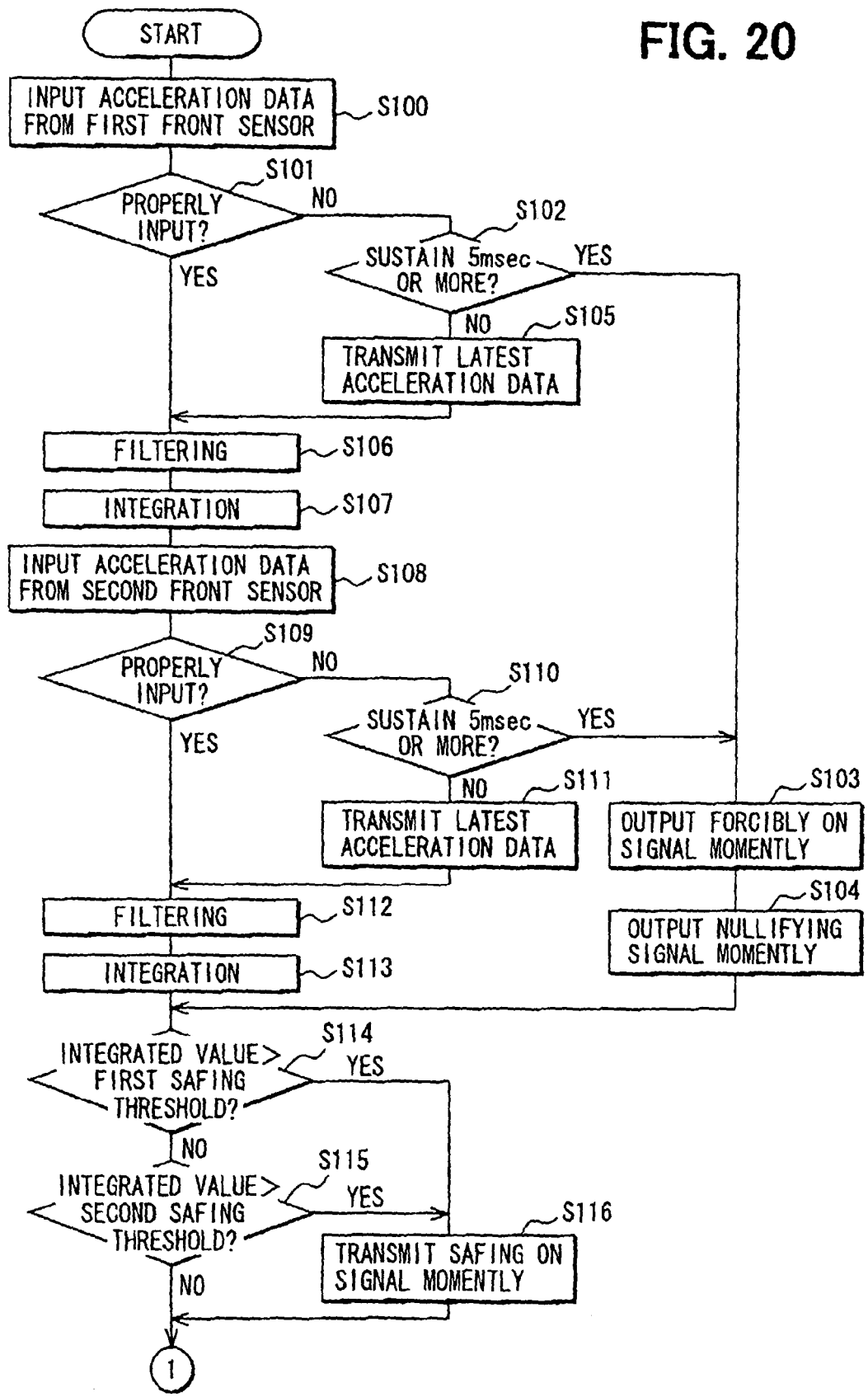

As shown in FIG. 20, in step S100, the serial I/F 140 inputs the acceleration data transmitted form the first front sensor 12. In step S101, the blackout determiner 147 evaluates whether the acceleration data is properly transmitted. When the acceleration data is properly transmitted, the serial I/F 140 transmits the acceleration data to the HPF 142, in accordance with the command from the blackout determiner 147. By contrast, in step S101, when the acceleration data is not properly transmitted, the routine proceeds to step S102, in which the blackout determiner 147 evaluates whether this discommunication, in which the acceleration data is not properly transmitted, continues for a period equal to or greater than 5 msec, for example.

In step S102, when the discommunication continues for the period equal to or greater than 5 msec, the blackout determiner 147 determines that blackout arises. In this case, the routine proceeds to step S103, thereby outputting the first blackout ON signal. In step S103, when the first blackout ON signal is output, the forcibly safing ON signal generator 149 outputs the forcibly safing ON signal for the predetermined period. In step S104, when the forcibly safing ON signal is output, the nullifying signal generator 18 outputs the nullifying signal for the predetermined period. By contrast, in step S102, when the discommunication continues for a period less than 5 msec, the blackout determiner 147 determines that the blackout is an instantaneous abnormality, thereby not determining the communication to be causing blackout. In this case, the routine proceeds to step S105, in which the serial I/F 140 transmits the latest acceleration data to the HPF 142.

In step S106, the HPF 142 performs a filtering operation to the acceleration data transmitted from the serial I/F 140, and transmits the filtered acceleration data to the first safing determiner 144. In step S107, the first safing determiner 144 integrates the filtered acceleration data in the specific period.

Subsequently, in steps S108 to S113, similar processings are performed to the acceleration data transmitted from the second front sensor 13.

In step S110, when the discommunication continues for 5 msec or more, the blackout determiner 148 determines that blackout arises, thereby outputting the second blackout ON signal. When the second blackout ON signal is output, the routine proceeds to step S103, similarly to step S102. In step S103, the forcibly safing ON signal generator 149 outputs the forcibly safing ON signal for the predetermined period. In step S104, the nullifying signal generator 18 outputs the nullifying signal for the predetermined period.

In step S114, the first safing determiner 144 compares the integrated value of the acceleration data of the first front sensor 12 with the first safing threshold. In step S115, the second safing determiner 145 compares the integrated value of the acceleration data of the second front sensor 13 with the second safing threshold.

In step S114, when the integrated value of the acceleration data is greater than the first safing threshold, the routine proceeds to step S116, in which the first safing determiner 144 determines that the vehicle comes into collision, thereby transmitting the first safing ON signal. In step S115, when the integrated value of the acceleration data is greater than the second safing threshold, the routine proceeds to step S116, in which the second safing determiner 145 determines that the vehicle comes into collision, thereby transmitting the second safing ON signal. In steps S114, 115, when at least one of the first and second safing ON signals is output, the safing ON signal generator 146 outputs the safing ON signal for the predetermined period. By contrast, in steps S114, 115, when both the first and second safing ON signals are not output, the safing ON signal generator 146 does not output the safing ON signal.

Figure 21:
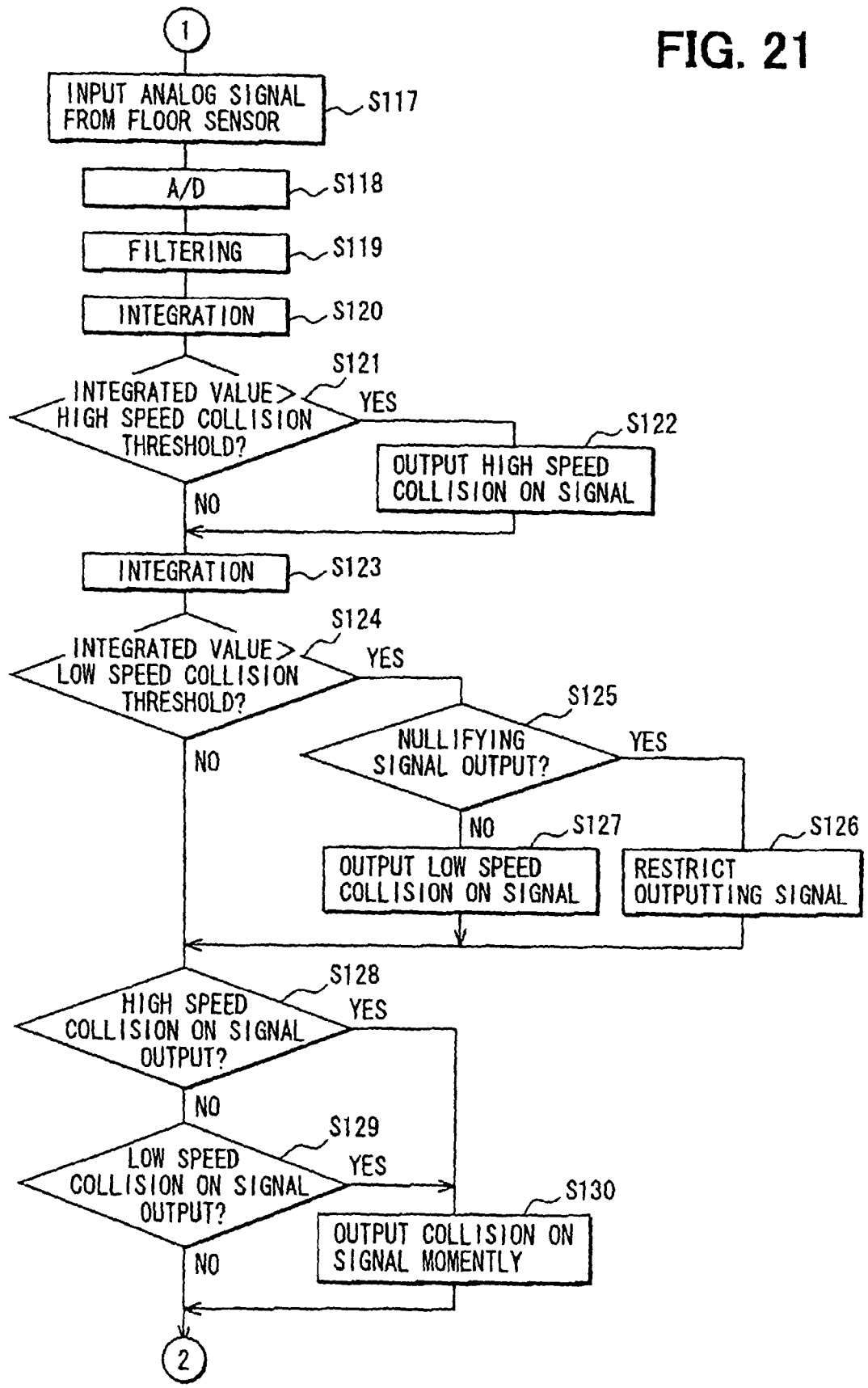

Next, processings are subjected to the analog signal output from the floor sensor 10. As shown in FIG. 21, in step S117, the A/D converter 110 inputs the analog signal output from the floor sensor 10. In step S118, the A/D converter 110 converts the analog signal to the digital signal, and outputs the digital signal as the acceleration data to the HPF 111. In step S119, the HPF 111 performs the filtering operation to the acceleration data output from the A/D converter 110, and outputs the filtered acceleration data to the high and low speed collision determiners 113, 114. In step S120, the high speed collision determiner 113 integrates the filtered acceleration data. In step S121, the high speed collision determiner 113 compares the integrated acceleration data of the floor sensor 10 with the high speed collision threshold.

In step S121, when the integrated acceleration data is greater than the high speed collision threshold, the routine proceeds to step S122, in which the high speed collision determiner 113 determines the collision of the vehicle to be high speed collision, thereby outputting the high speed collision ON signal. By contrast, in step S121, when the integrated acceleration data is equal to or less than the high speed collision threshold, the high speed collision determiner 113 determines the collision of the vehicle not to be low speed collision. In this case, the high speed collision determiner 113 does not output the high speed collision ON signal.

In step S123, the integrator 114a integrates the filtered acceleration data. In step S124, the comparator 114b compares the integrated acceleration data of the floor sensor 10 with the low speed collision threshold.

In step S124, when the integrated acceleration data is greater than the low speed collision threshold, the routine proceeds to step S125, in which the comparator 114b evaluates whether the nullifying signal is output. When the nullifying signal is output, the routine proceeds to step S126, in which the comparator 114b does not output the comparison result, so that low speed collision ON signal is not output. By contrast, when the nullifying signal not is output, the routine proceeds to step S127, in which the comparator 114b determines the collision of the vehicle to be low speed collision, thereby outputting the low speed collision ON signal.

In step S124, when the integrated acceleration data is equal to or less than the low speed collision threshold, the comparator 114b determines the collision of the vehicle not to be low speed collision. In this case, the low speed collision determiner 114 does not output the low speed collision ON signal.

Subsequently, in step S128, the collision ON signal generator 115 evaluates whether the high speed collision ON signal is output. In step S129, the collision ON signal generator 115 evaluates whether the low speed collision ON signal is output.

In steps 128, 129, when either the high speed collision ON signal or the low speed collision ON signal is output, the routine proceeds to step S130, in which the collision ON signal generator 115 outputs the collision ON signal. By contrast, when both the high speed collision ON signal and the low speed collision ON signal are not output, the collision ON signal generator 115 does not output the collision ON signal.

Figure 22:
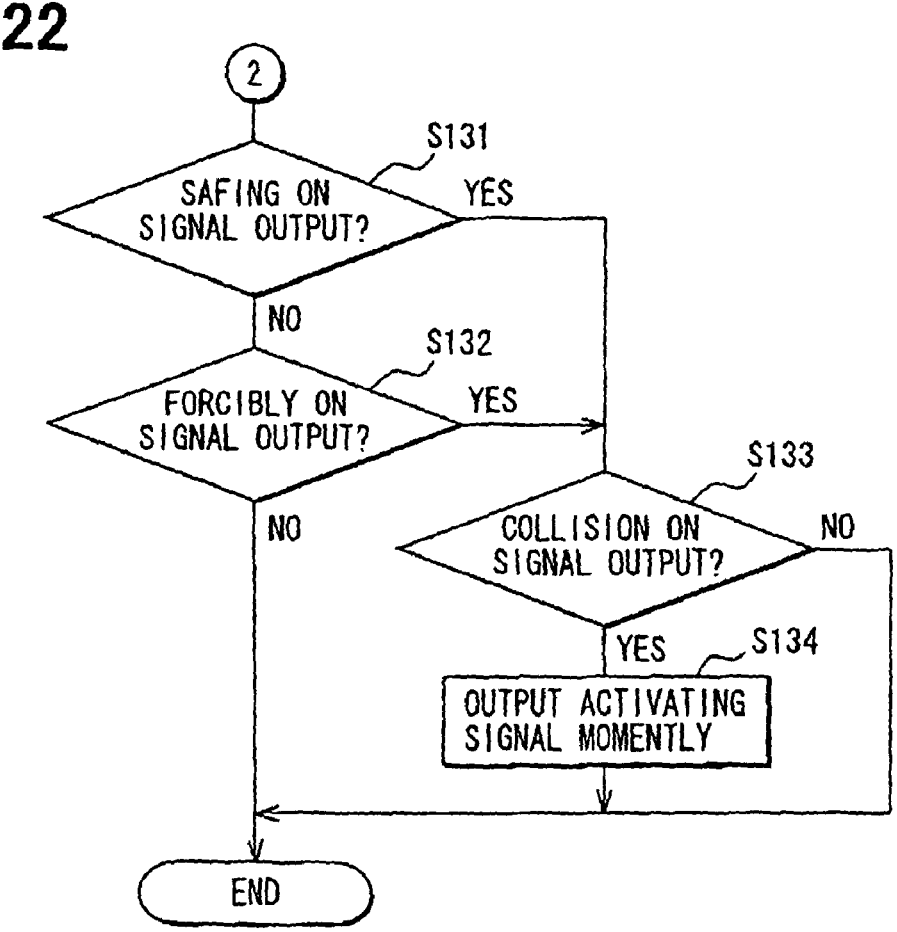
FIGS. 20 to 22 are flowcharts showing an activating operation for the air bag apparatus, according to the eighth embodiment.

Next, processings are subjected to the signals output from the safing ON signal generator 146, the forcibly safing ON signal generator 149, and the collision ON signal generator 115. As shown in FIG. 22, in steps S131, S132, the activating signal generator 16 evaluates whether the safing ON signal and the forcibly safing ON signal are output.

When at least one of the safing ON signal and the forcibly safing ON signal is output in steps S131, S132, the routine proceeds to step S133, in which the activating signal generator 16 evaluates whether the collision ON signal is output. When the collision ON signal is output in step S133, the routine proceeds to step S134, in which the activating signal generator 16 outputs the activating signal for the predetermined period. By contrast, when both the safing ON signal and the forcibly safing ON signal are not output in steps S131, S132, the activating signal generator 16 does not output the activating signal. In step S133, when the collision ON signal is not output, the activating signal generator 16 does not output the activating signal.

In this embodiment, the air bag apparatus 1 can be restricted from causing a misoperation even when the air bag apparatus 1 is excessively exposed to water and proper performance of the air bag apparatus 1 is impaired. Thus, reliability of the air bag apparatus 1 can be enhanced. When the air bag apparatus 1 is excessively exposed to water, the air bag apparatus 1 may cause an electric leak. Consequently, analog signal of the floor sensor 10 may cause a drift, and blackout may arise in the communication of the first and second front sensors 12, 13. When blackout arises in the communication of the first and second front sensors 12, 13, the low speed collision ON signal is not output, regardless of the analog signal of the floor sensor 10. When the analog signal of the floor sensor 10 causes a drift, the analog signal of the floor sensor 10 gradually varies. Accordingly, magnitude of impact based on the analog signal of the floor sensor 10 does not become greater than the high speed collision threshold, which is greater than the low speed collision threshold. As a result, the high speed collision threshold is not output. Thus, both the low and high collision ON signals are not output, so that the collision ON signal is not output. Therefore, the activating signal can be restricted from being output by restricting the collision ON signal from being output, so that the air bag apparatus 1 can be restricted from causing a misoperation due to being excessively exposed to water. The first and second sensors 12, 13 may cause blackout of communication due to collision of the vehicle only when a large impact is applied to the vehicle. The high speed collision determiner 113 compares magnitude of impact, which is based on the analog signal of the floor sensor 10, with the high speed collision threshold, so that the large impact can be evaluated. Therefore, even when blackout of communication arises in the first and second sensors 12, 13 due to collision, and the low speed collision ON signal is terminated, the protecting device 17 can be steadily activated by outputting the high speed collision ON signal.

Furthermore, in this embodiment, the low speed collision determiner 114 is constructed of the integrator 114a and the comparator 114b. Therefore, the acceleration data can be steadily integrated, and the integrated value can be steadily compared with the low speed collision threshold.

Ninth Embodiment

In this embodiment, the air bag apparatus of the eighth embodiment is provided with an additional diagnosis unit.

Furthermore, a condition for outputting the signal of the nullifying signal generator is modified.

As shown in FIG. 23, an air bag apparatus 1 includes the floor sensor 10, the main determiner 11, the first front sensor 12, the first and second front sensors 12, 13, the safing determiner 14, a diagnosis unit 15, a low speed collision nullifying signal generator 18 (nullifying signal generator), the activating signal generator 16, and the protecting device 17.

Figure 24:
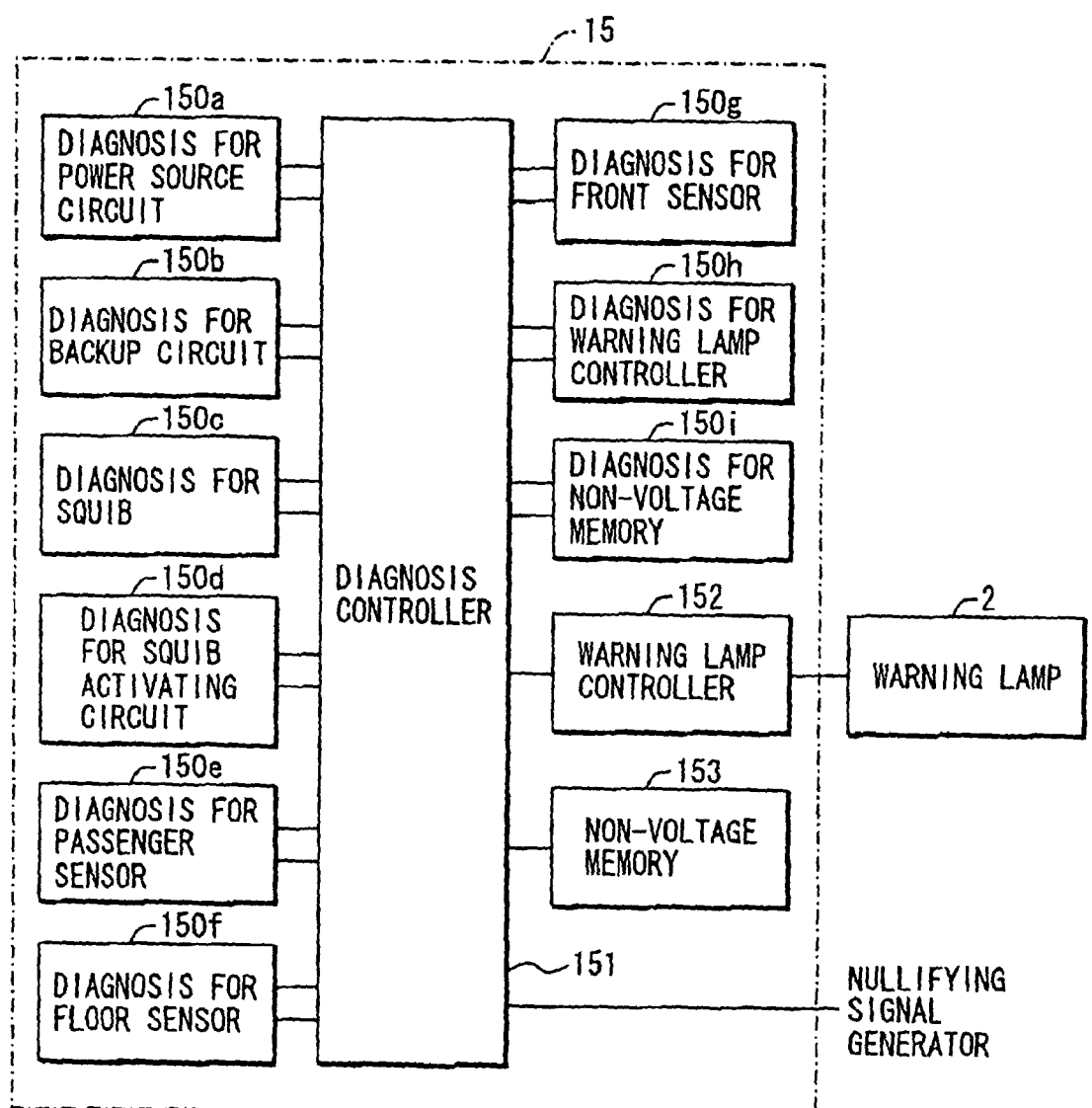
FIG. 24 is a block diagram showing a diagnosis unit of the air bag apparatus, according to the ninth embodiment.

As shown in FIG. 24, the diagnosis unit 15 evaluates abnormality of components of the air bag apparatus 1, and outputs a signal corresponding to the diagnosis result. As shown in FIG. 24, the diagnosis unit 15 is constructed of diagnosis circuits 150a to 150i, a diagnosis controller 151, the warning lamp controller 152, the non-volatile memory 153. The diagnosis controller 151 is constructed of a microcomputer and a program, for example.

Each of the diagnosis circuits 150a to 150i outputs information, which is necessary for the diagnosis operation of the corresponding component of the airbag apparatus 1, in accordance with a command from the diagnosis controller 151. In this embodiment, the diagnosed component are power source circuit, the backup circuit, the squib, the squib activating circuit, the passenger sensor, the floor sensor 10, the first and second front sensors 12, 13, the warning lamp controller 152, and the non-volatile memory 153, for example. The power source circuit applies voltage for activating the air bag apparatus 1. The backup circuit applies voltage for the predetermined period instead of the power source circuit when the power source circuit is incapable of applying voltage. The squib ignites by being supplied with electricity, thereby expanding an air bag. The squib activating circuit supplies electricity to the squib. The passenger sensor detects existence of a passenger. Each of the diagnosis circuits 150a to 150i outputs the information, which is necessary for the diagnosis operation, as the diagnosis signal, in accordance with the command from the diagnosis controller 151.

The diagnosis controller 151 controls the diagnosis circuits 150a to 150i, and evaluates abnormality of the diagnosed components of the air bag apparatus 1 in accordance with the diagnosis signals output from the diagnosis circuits 150a to 150i. The diagnosis controller 151 is constructed of a microcomputer and a program, for example. The diagnosis controller 151 evaluates abnormality in accordance with the diagnosis signals output from the diagnosis circuits 150a to 150i. Each of the first and second front sensors 12, 13 evaluates abnormality excluding blackout of the communication. When the diagnosis controller 151 determines abnormality, the diagnosis controller 151 outputs a forcibly safing ON nullifying signal (nullifying signal) to the forcibly safing ON signal generator 149. When the abnormality is sustained for 3 sec or greater, for example, the diagnosis controller 151 determines that a malfunction occurs in the diagnosed component.

The warning lamp controller 152 turns the warning lamp 2 ON in accordance with the command of the diagnosis controller 151 when a diagnosed component causes abnormality in the air bag apparatus 1. The warning lamp controller 152 connects with the warning lamp 2.

The non-volatile memory 153 stores the abnormality code in accordance with the command of the diagnosis controller 151 when a diagnosed component causes abnormality in the air bag apparatus 1.

As referred to FIG. 23, the nullifying signal generator 18 outputs the nullifying signal in accordance with the output signal of the forcibly safing ON signal generator 149 and the diagnosis unit 15. When both the forcibly safing ON signal and the abnormality detection signal are output, the nullifying signal generator 18 outputs the nullifying signal to the low speed collision determiner 114 for the predetermined period.

Next, an activating evaluation of this embodiment is described.

Figure 25:
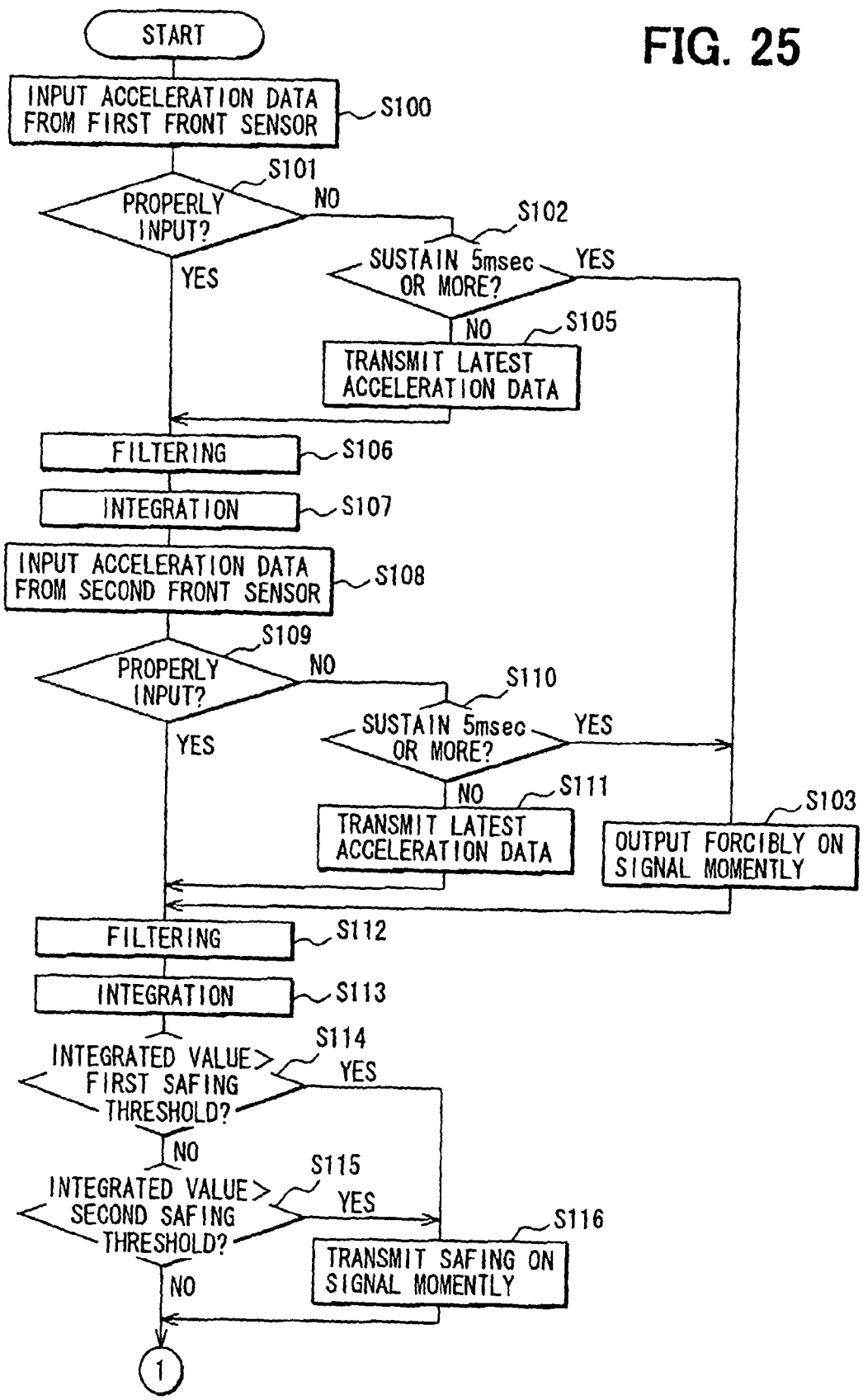
FIG. 25 is a flowchart showing an activating operation for the air bag apparatus, according to the ninth embodiment.

As shown in FIG. 25, the activating evaluation of this embodiment is defined by omitting step S104 from the activating evaluation of the eighth embodiment. In the eighth embodiment, the nullifying signal is output in the activating evaluation. By contrast, in this embodiment, the nullifying signal is output in the diagnosis operation instead of being output in the activating evaluation.

Figure 26:
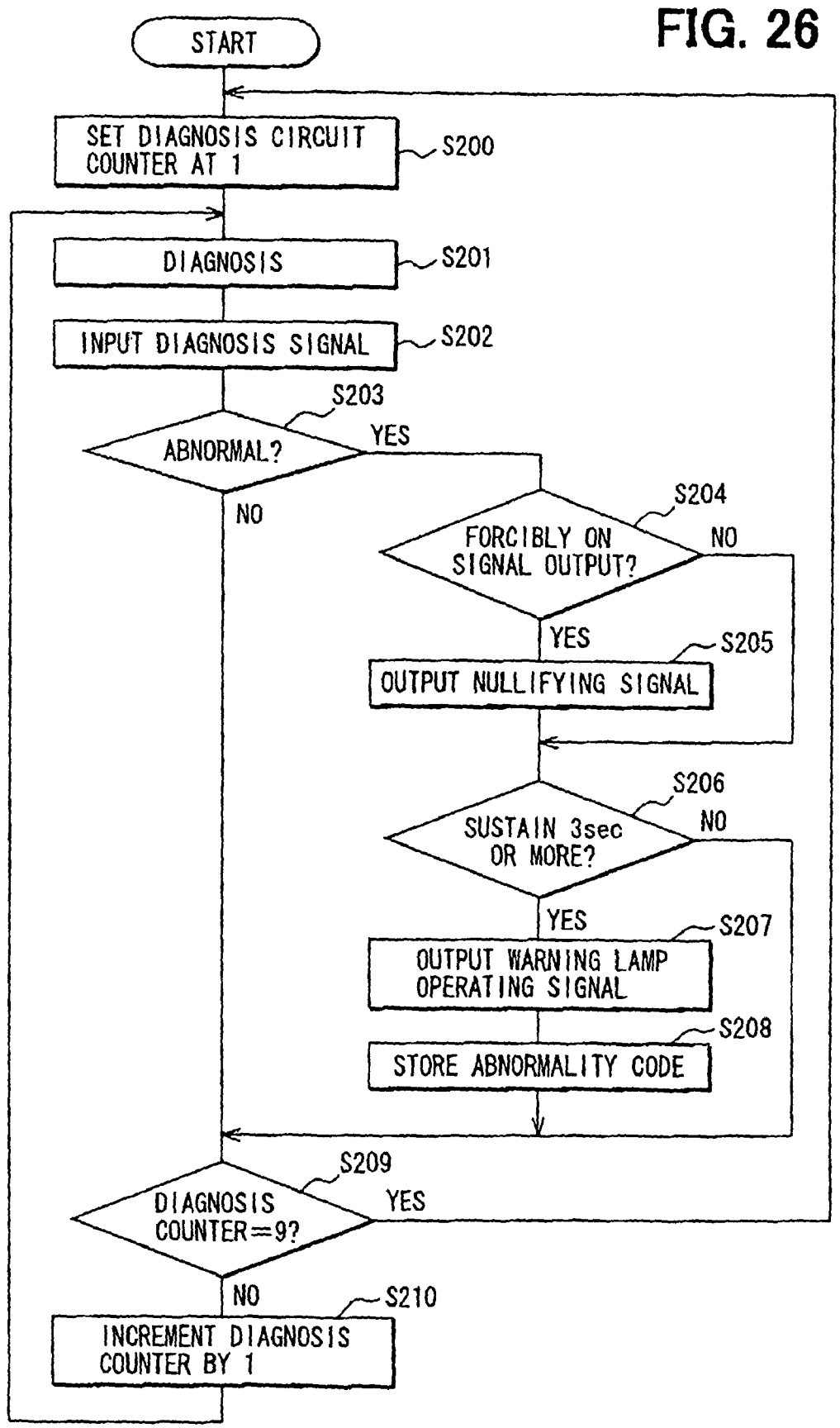
FIG. 26 is a flowchart showing a diagnosis operation for the air bag apparatus, according to the ninth embodiment.

Next, a diagnosis operation of this embodiment is described. As shown in FIG. 26, in step S200, the diagnosis controller 151 sets the diagnosis circuit counter at 1. The diagnosis circuit counter specifies one of the diagnosis circuits 150a to 150i. One of the diagnosis circuits 150a to 150i is specified corresponding to one of the diagnosis circuit counter 1 to 9. Subsequently, in step S201, the diagnosis controller 151 controls the one of the diagnosis circuits 150a to 150i specified by the diagnosis circuit counter. In step S202, the diagnosis controller 151 inputs the diagnosis signals output from the one of the diagnosis circuits 150a to 150i. In step S203, the diagnosis controller 151 evaluates abnormality of the diagnosed component in accordance with the input diagnosis signal.

In step S203, when the diagnosed component is abnormal, the diagnosis controller 151 outputs the abnormality detection signal. In step S204, the diagnosis controller 151 evaluates whether the forcibly safing ON signal is output.

When the forcibly safing ON signal is output in step S204, the routine proceeds to step S205, in which the diagnosis controller 151 outputs the nullifying signal. By contrast, when the forcibly safing ON signal is not output in step S204, the diagnosis controller 151 does not output the nullifying signal. In step S206, the diagnosis controller 151 evaluates whether the abnormality is sustained for 3 sec or greater. When the abnormality is sustained for 3 sec or greater, the diagnosis controller 151 determines that a malfunction occurs in the diagnosed component. In this case, the routine proceeds to step S207, in which the diagnosis controller 151 outputs the warning lamp operating signal. subsequently, in step S208, the non-volatile memory 153 stores the abnormality code. By contrast, when the abnormality is sustained for 3 sec or less in step S206, the diagnosis controller 151 determines that a malfunction does not occur in the diagnosed component, so that the diagnosis controller 151 does not output the warning lamp operating signal, and the non-volatile memory 153 does not store the abnormality code. Subsequently, in step S209, the diagnosis controller 151 evaluates whether the diagnosis counter is equal to 9. When the diagnosis counter is equal to 9, it is determined that the diagnosis operation is completed in accordance with throughout the diagnosis circuits 150a to 150i, so that the routine returns to step S201, and similar processings are repeated. By contrast, when the diagnosis counter is not equal to 9 in step S209, it is determined that the diagnosis operation is not completed in accordance with throughout the diagnosis circuits 150a to 150i. In this case, the routine proceeds to step S210, in which the diagnosis controller 151 increments the diagnosis counter by 1, and the routine returns to step S201, and similar processings are repeated.

In this embodiment, excessive exposure to water can be further steadily evaluated. When the air bag apparatus 1 is excessively exposed to water, the air bag apparatus 1 may simultaneously cause various abnormality due to an electric leak, in addition to blackout of communication of the first and second front sensors 12, 13. Therefore, when abnormality of a diagnosed component is detected in addition to blackout of communication, it is evaluated that blackout of communication of the first and second front sensors 12, 13 is caused due to excessive exposure to water, not due to collision of the vehicle.

The threshold of the abnormality counter for determining a malfunction occurring in the diagnosed component is not limited to 10. This threshold of the period can be determined as appropriate.

Tenth Embodiment

The air bag apparatus of this embodiment has an operation, which is defined by modifying conditions for outputting signals from the diagnosis unit in the ninth embodiment.

Figure 27:
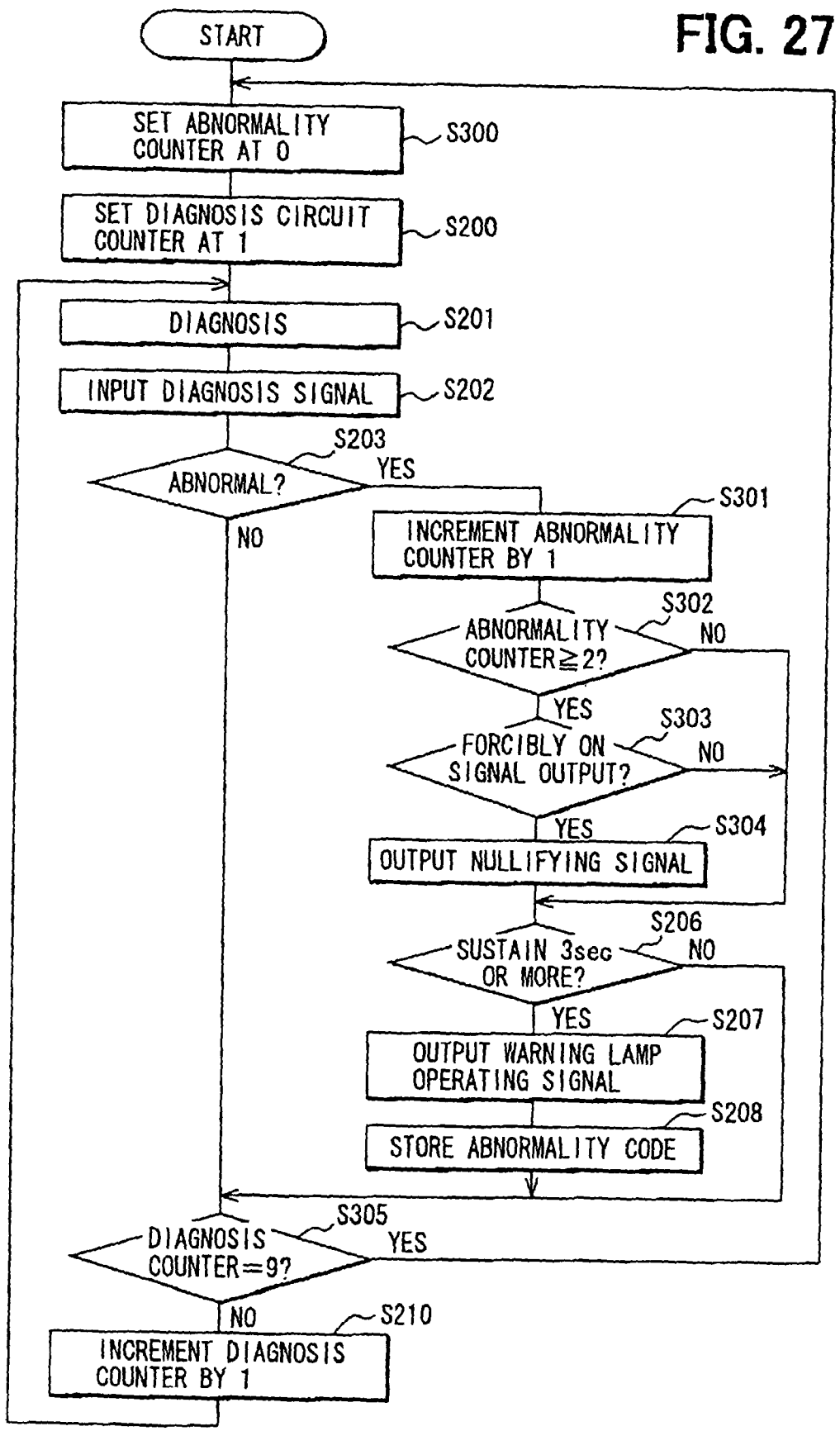
FIG. 27 is a flowchart showing a diagnosis operation for the air bag apparatus, according to a tenth embodiment.

As shown in FIG. 27, in step S300, the diagnosis controller 151 sets the abnormality counter at 0. The abnormality counter counts a number of diagnosed components, which causes abnormality. Subsequently, steps S200 to S203 are executed, similarly to the ninth embodiment.

In step S203, when the diagnosed component is abnormal, the routine proceeds to step S301, in which the diagnosis controller 151 increments the abnormality counter by 1. Subsequently, in step S302, the diagnosis controller 151 evaluates whether the abnormality counter is equal to or greater than 2. When the abnormality counter is equal to or greater than 2, the diagnosis controller 151 outputs the abnormality detection signal. When the abnormality detection signal is output, the routine proceeds to step S303, in which the diagnosis controller 151 evaluates whether the forcibly safing ON signal is output.

When the forcibly safing ON signal is output in step S303, the routine proceeds to step S304, in which the diagnosis controller 151 outputs the nullifying signal. By contrast, when the forcibly safing ON signal is not output in step S303, the diagnosis controller 151 does not output the nullifying signal. When the abnormality counter is less than 2 in step S302, the diagnosis controller 151 does not output the nullifying signal. Subsequently, steps S206 to S208 are executed, similarly to the ninth embodiment. In step S305, the diagnosis controller 151 evaluates whether the diagnosis counter is equal to 9.

When the diagnosis counter is equal to 9 in step S305, the routine returns to step S300, and similar processings are repeated. By contrast, when the diagnosis counter is not equal to 9 in step S305, the routine proceeds to step S210, in which the diagnosis controller 151 increments the diagnosis counter by 1, and the routine returns to step S201, and similar processings are repeated.

The abnormal component counter is set at 0 in step S300, so that the abnormal component counter does not increase due to abnormality caused in the same component.

In this embodiment, excessive exposure to water can be further steadily evaluated. When the air bag apparatus 1 is excessively exposed to water, the air bag apparatus 1 may simultaneously cause various abnormality due to an electric leak, in addition to blackout of communication of the first and second front sensors 12, 13. Therefore, excessive exposure to water can be further steadily evaluated by detecting abnormality of multiple diagnosed components in addition to blackout of communication.

Eleventh Embodiment

The air bag apparatus of this embodiment has an operation, which is defined by modifying conditions for outputting signals from the diagnosis unit in the ninth embodiment.

Figure 28:
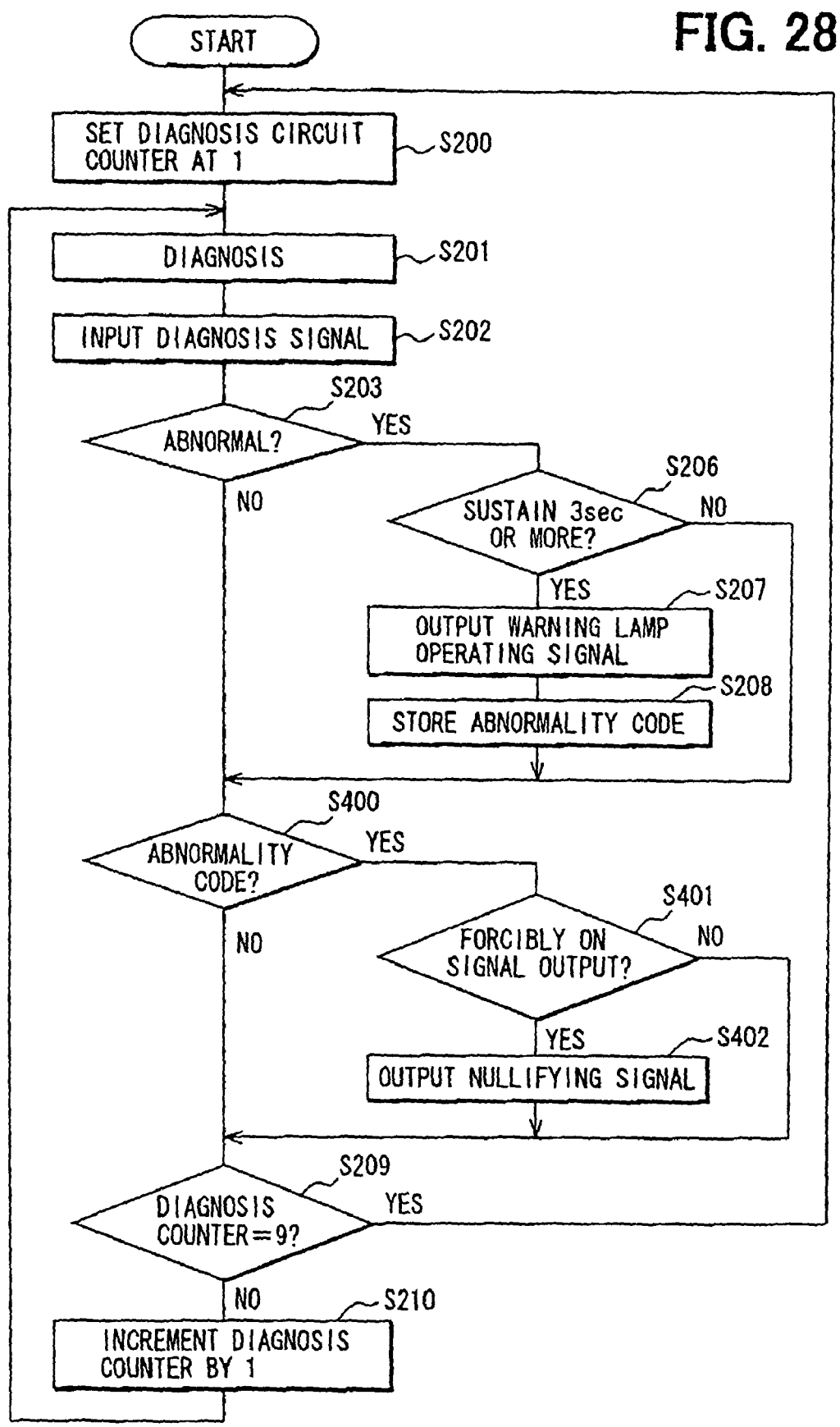
FIG. 28 is a flowchart showing a diagnosis operation for the air bag apparatus, according to an eleventh embodiment.

As shown in FIG. 28, the diagnosis controller 151 executes steps S200 to S203 and steps S206 to S208, similarly to the ninth embodiment. In step S400, the diagnosis controller 151 evaluates whether the abnormality code is stored. In step S400, when the abnormality code is stored, the diagnosis controller 151 outputs the abnormality detection signal. Subsequently, in step S401, the diagnosis controller 151 evaluates whether the safing ON signal is output.

In step S401, when the safing ON signal is output, the routine proceeds to step S401, in which the diagnosis controller 151 outputs the nullifying signal. By contrast, when the safing ON signal is not output, the diagnosis controller 151 does not output the nullifying signal. In step S400, when the abnormality code is not stored, the diagnosis controller 151 does not output the nullifying signal. Subsequently, the diagnosis controller 151 executes'steps S209, S210, similarly to the ninth embodiment.

In this embodiment, excessive exposure to water can be further steadily evaluated. The diagnosis controller 151 may erroneously detect abnormality due to instantaneous noise, for example. Therefore, abnormality can be further steadily detected by evaluating whether the abnormal condition is sustained for 3 sec or greater. Thus, in this embodiment, abnormality can be further steadily detected.

Twelfth Embodiment

The air bag apparatus of this embodiment has an operation, which is defined by modifying conditions for outputting signals from the diagnosis unit in the ninth embodiment.

Figure 29:
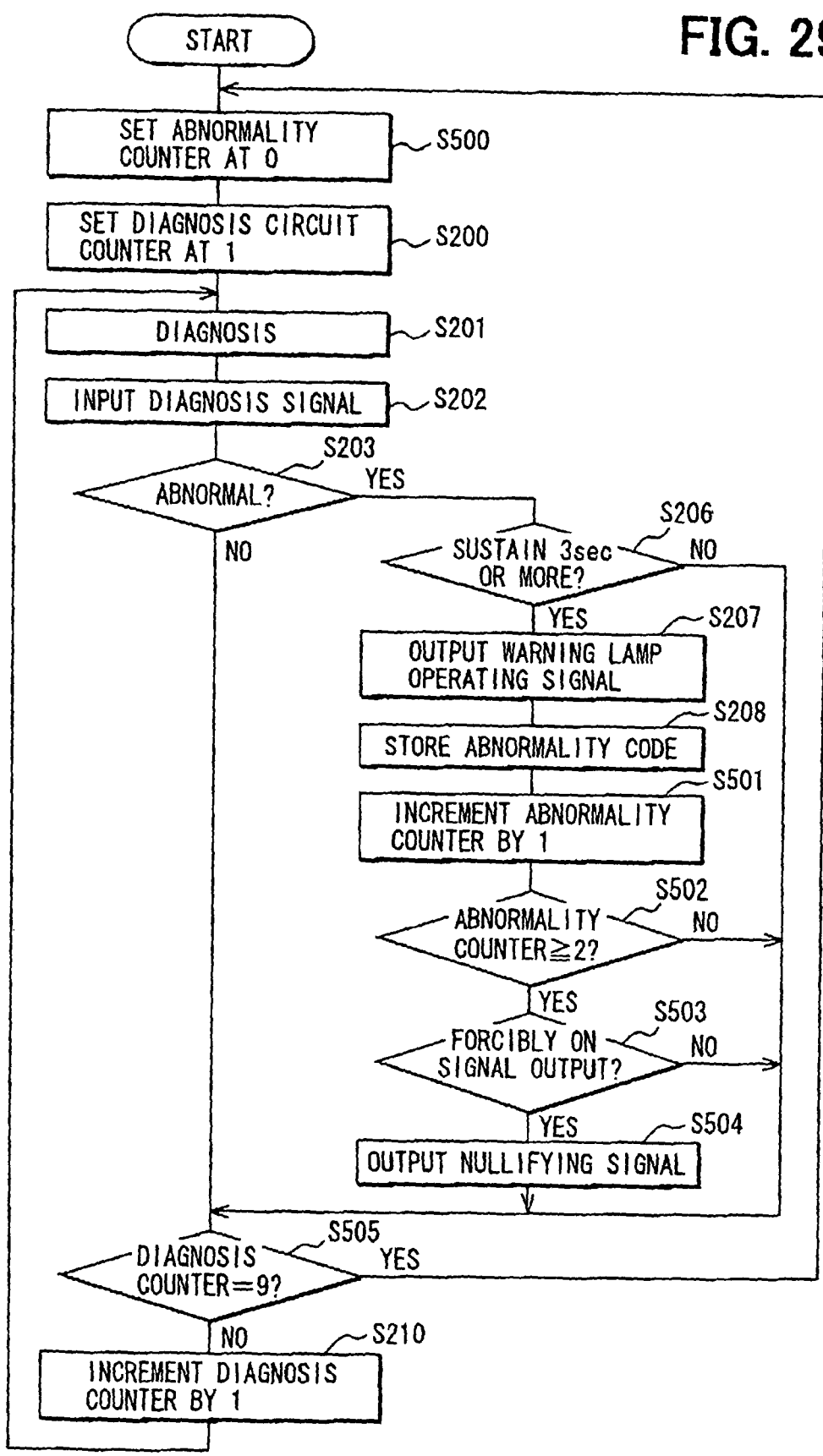
FIG. 29 is a flowchart showing a diagnosis operation for the air bag apparatus, according to a twelfth embodiment.

As shown in FIG. 29, in step S500, the diagnosis controller 151 sets the abnormality counter at 0. The abnormality counter counts a number of diagnosed components causing abnormality. Subsequently, steps S200 to S208 are executed, similarly to the ninth embodiment.

In step S501, the diagnosis controller 151 increments the abnormality counter by 1. Subsequently, in step S502, the diagnosis controller 151 evaluates whether the abnormality counter is equal to or greater than 2. When the abnormality counter is equal to or greater than 2, the diagnosis controller 151 outputs the abnormality detection signal. In step S503, the diagnosis controller 151 evaluates whether the forcibly safing ON signal is output.

In step S503, when the safing ON signal is output, the routine proceeds to step S504, in which the diagnosis controller 151 outputs the nullifying signal. By contrast, when the safing ON signal is not output, the diagnosis controller 151 does not output the nullifying signal. When the abnormality is sustained for 3 sec or less in step S206, or when the abnormality counter is less than 2 in step S502, the diagnosis controller 151 does not output the nullifying signal. Subsequently, in step S505, the diagnosis controller 151 evaluates whether the diagnosis counter is 9.

When the diagnosis counter is equal to 9, the routine returns to step S500, and similar processings are repeated. By contrast, when the diagnosis counter is not equal to 9 in step S505, the routine proceeds to step S210, in which the diagnosis controller 151 increments the diagnosis counter by 1, and the routine returns to step S201, and similar processings are repeated.

The abnormal component counter is set at 0 in step S500, so that the abnormal component counter does not increase due to abnormality caused in the same component.

In this embodiment, excessive exposure to water can be further steadily evaluated by detecting abnormality of multiple diagnosed components in addition to blackout of communication. Thus, excessive exposure to water can be further steadily evaluated.

Thirteenth Embodiment

The air bag apparatus of this embodiment has a structure, in which the low speed collision determiner 114 of the eighth embodiment is modified.

Figure 30:
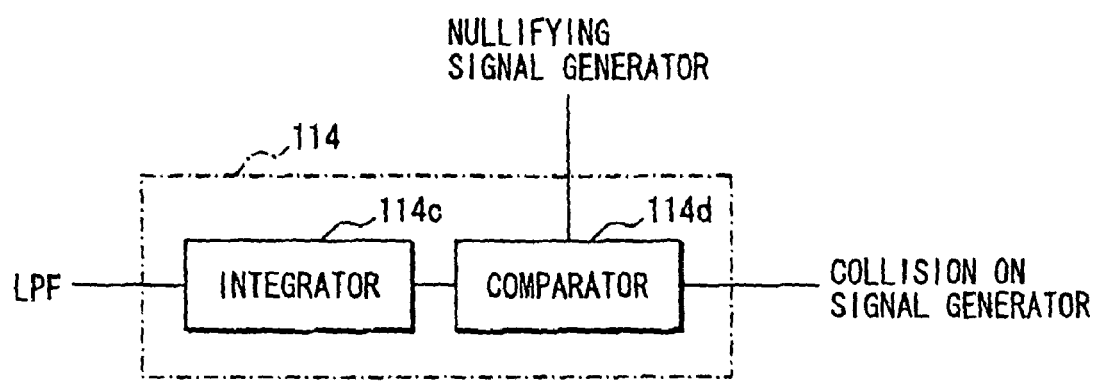
FIG. 30 is a block diagram showing a determiner of the air bag apparatus, according to a thirteenth embodiment.

As shown in FIG. 30, in this embodiment, the low speed collision determiner 114 is constructed of an integrator 114c and a comparator 114d.

The integrator 114c integrates the acceleration data output from the LPF 112 in a specific period such as 32 msec.

The comparator 114d stores a predetermined value such as 49 m/s2 as the low speed collision threshold for evaluating collision of the vehicle. The low speed collision threshold is adjusted in accordance with the nullifying signal. When the nullifying signal is not output, the comparator 114d uses the predetermined value as the low speed collision threshold. In this case, when the integrated value of the acceleration data becomes equal to or greater than the low speed collision threshold, the comparator 114d determines collision of the vehicle to be low speed collision, so that the comparator 114d outputs the low speed collision ON signal to the collision ON signal generator 115. By contrast, when the nullifying signal is output, the comparator 114d sets the low speed collision threshold at a large value, which is sufficiently large such that the integrated acceleration data cannot be equal to or greater than the large value. Therefore, the low speed collision ON signal is not output regardless of the integrated value of the acceleration data.

Next, an activating evaluation of this embodiment is described. The activating evaluation of this embodiment is defined by modifying the evaluation for low speed collision in the activating evaluation of the eighth embodiment. Steps S100 to S116 and steps S131 to S134 are executed similarly to the eighth embodiment.

Figure 31:
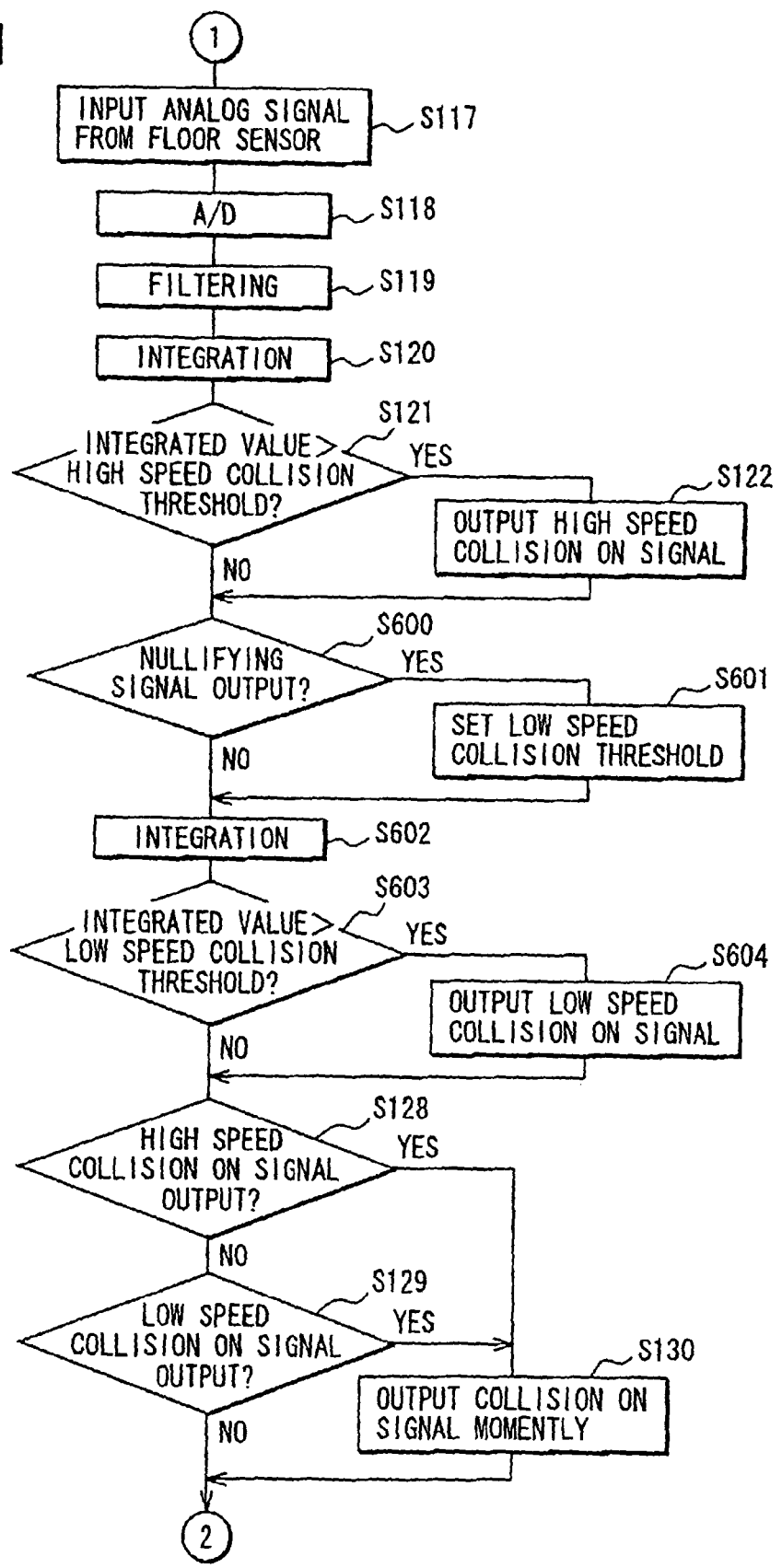
FIG. 31 is a flowchart showing an activating operation for the air bag apparatus, according to the thirteenth embodiment.

As shown in FIG. 31, the air bag apparatus 1 executes step S117 and subsequent steps. In step S600, the comparator 114d evaluates whether the nullifying signal is output. When the nullifying signal is output, the routine proceeds to step S601, in which the comparator 114d sets the low speed collision threshold at the large value, which is sufficiently large such that the integrated acceleration data cannot be equal to or greater than the large value.

In step S602, the integrator 114c integrates the filtered acceleration data. Subsequently, in step S603, the comparator 114d compares the integrated value of the acceleration data of the floor sensor 10 with the low speed collision threshold.

In step S603, when the integrated value of the acceleration data is greater than the low speed collision threshold, the routine proceeds to step S604, in which the comparator 114d outputs the low speed collision ON signal. By contrast, when the integrated value of the acceleration data is equal to or less than the low speed collision threshold, the comparator 114d does not output the low speed collision ON signal. Subsequently, steps S128 to S130 are executed similarly to the eighth embodiment.

In this embodiment, the low speed collision threshold is set at the large value, which is sufficiently large such that the integrated acceleration data cannot be equal to or greater than the large value. Therefore, the low speed collision ON signal can be steadily restricted.

Fourteenth Embodiment

The air bag apparatus of this embodiment has a structure, in which the low speed collision determiner 114 of the eighth embodiment is modified.

Figure 32:
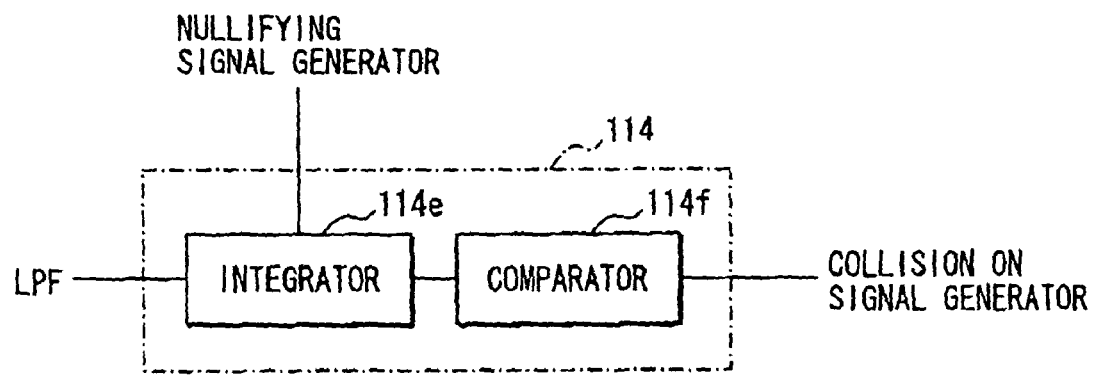
FIG. 32 is a block diagram showing a determiner of the air bag apparatus, according to a fourteenth embodiment.

In this embodiment, as shown in FIG. 32, the low speed collision determiner 114 is constructed of an integrator 114e and a comparator 114f.

The integrator 114e integrates the acceleration data output from the LPF 112 in a specific period such as 32 msec. The acceleration data is adjusted in accordance with the nullifying signal. When the nullifying signal is not output, the integrator 114e integrates the acceleration data output from the LPF 112, thereby outputting the integrated acceleration data to the comparator 114f. By contrast, when the nullifying signal is output, the integrator 114e adjusts the acceleration data such that the integrated value of the acceleration data becomes less than the low speed collision threshold, regardless of the acceleration data output from the LPF 112. Furthermore, the integrator 114e integrates the adjusted acceleration data, thereby outputting the integrated acceleration data to the comparator 114f.

The comparator 114f compares the integrated value of the acceleration data output from the integrator 114e with the low speed collision threshold such as 49 m/s2. When the integrated value of the acceleration data is greater than the low speed collision threshold, the comparator 114f determines that the collision of the vehicle to be low speed collision, thereby outputting the low speed collision ON signal to the collision ON signal generator 115. By contrast, when the integrated value of the acceleration data is equal to or less than the low speed collision threshold, the comparator 114f does not output the low speed collision ON signal.

Figure 33:
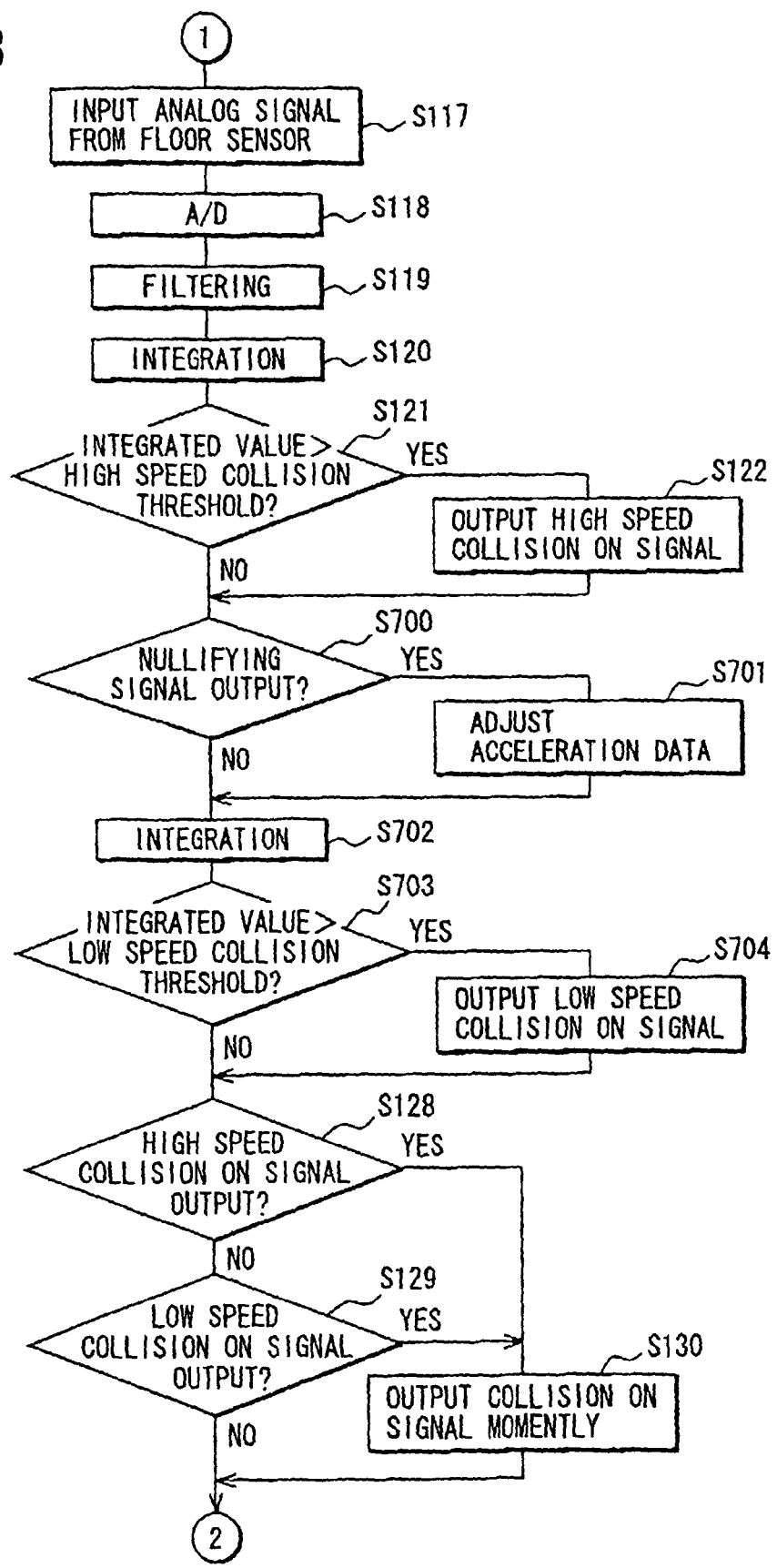
FIG. 33 is a flowchart showing an activating operation for the air bag apparatus, according to the fourteenth embodiment.

Next, an activating evaluation of this embodiment is described. As shown in FIG. 33, the activating evaluation of this embodiment is defined by modifying the evaluation for low speed collision in the activating evaluation of the eighth embodiment. Steps S100 to S116 and steps S131 to S134 are executed similarly to the eighth embodiment. The air bag apparatus 1 executes step S117 and subsequent steps. In step S700, the integrator 114e evaluates whether the nullifying signal is output.

When the nullifying signal is output, the routine proceeds to step S701, in which the integrator 114e adjusts the acceleration data such that the integrated value of the acceleration data becomes less than the low speed collision threshold. By contrast, when the nullifying signal is not output, the integrator 114e uses the acceleration data output from the LPF 112.

In step S702, the integrator 114e integrates the acceleration data. In step S703, the comparator 114f compares the integrated value of the acceleration data with the low speed collision threshold. When the integrated value of the acceleration data is greater than the low speed collision threshold, the routine proceeds to step S704, in which the comparator 114f outputs the low speed collision ON signal. By contrast, in step S703, when the integrated value of the acceleration data is equal to or less than the low speed collision threshold, the comparator 114f does not output the low speed collision ON signal. Subsequently, steps S128 to S130 are executed similarly to the eighth embodiment.

In this embodiment, the acceleration data is adjusted such that the integrated value of the acceleration data becomes less than the low speed collision threshold, so that the low speed collision ON signal can be steadily restricted.

In the above eighth to fourteenth embodiments, the above blocks of the high and low speed collision determiners 113, 114, the collision ON signal generator 115, the first and second safing determiners 144, 145, the safing ON signal generator 146, the blackout determiners 147, 148, the forcibly safing ON signal generator 149, the activating signal generator 16, the diagnosis controller 151 are not limited to programs of a micro computer. These blocks may be constructed of an electric circuit such as a discrete circuit.

In the above eighth to fourteenth embodiments, when the integrated value of the acceleration data becomes greater than the corresponding thresholds, corresponding routines are executed in the high and low speed collision determiners 113, 114, and the first and second safing determiners 144, 145. However, in the above components, corresponding routines may be executed when the integrated value of the acceleration data becomes equal to or greater than the corresponding thresholds.

The low speed collision determiner 114 in the thirteenth embodiment and fourteenth embodiment may be additionally provided to the air bag apparatus in the ninth to twelfth embodiments.

In the above eighth to fourteenth embodiments, the A/D converter 110, the HPF 111, the LPF 112, the low speed collision determiner 114 may serve as a first control signal generating unit. The A/D converter 110, the HPF 111, the LPF 112, and the high speed collision determiner 113 may serve as a second control signal generating unit. The collision ON signal generator 115 may serves as a third control signal generating unit. The serial I/F 140, the HPF 142, the first safing determiner 144, the safing ON signal generator 146 may serve as a fourth control signal generating unit. The serial I/F 141, the HPF 143, the second safing determiner 145, the safing ON signal generator 146 also may serve as the fourth control signal generating unit. The blackout determiner 147, the forcibly safing ON signal generator 149 may serve as a fifth control signal generating unit. The blackout determiner 148, the forcibly safing ON signal generator 149 also may serve as the fifth control signal generating unit. The nullifying signal generator may serves as a sixth signal generating unit. The diagnosis unit 15 may serves as a seventh signal generating unit.

In the above eighth to fourteenth embodiments, the low speed collision ON signal may correspond to a first control signal. The high speed collision ON signal may correspond to a second control signal. The collision ON signal may correspond to a third control signal. The safing ON signal may correspond to a fourth control signal. The forcibly safing ON signal may correspond to a fifth control signal. The nullifying signal output from the nullifying signal generator 18 may correspond to a sixth control signal. The nullifying signal output from the diagnosis unit 15 may correspond to a seventh control signal.

In the above eighth to fourteenth embodiments, the low speed collision threshold may correspond to a first threshold. The high speed collision threshold such as 196 m/s2 may correspond to a second threshold. The first safing threshold such as 49 m/s2 may correspond to a third threshold. The second safing threshold such as 49 m/s2 may correspond to a third threshold.

In the above eighth to fourteenth embodiments, the second sensor, the fourth control signal generator, and the fifth control signal generator are respectively provided by two. However, the numbers of the second sensor, the fourth control signal generator, and the fifth control signal generator are not limited to those of the above embodiments. The numbers of the second sensor, the fourth control signal generator, and the fifth control signal generator may be at least one.

Fifteenth Embodiment

Figure 34:
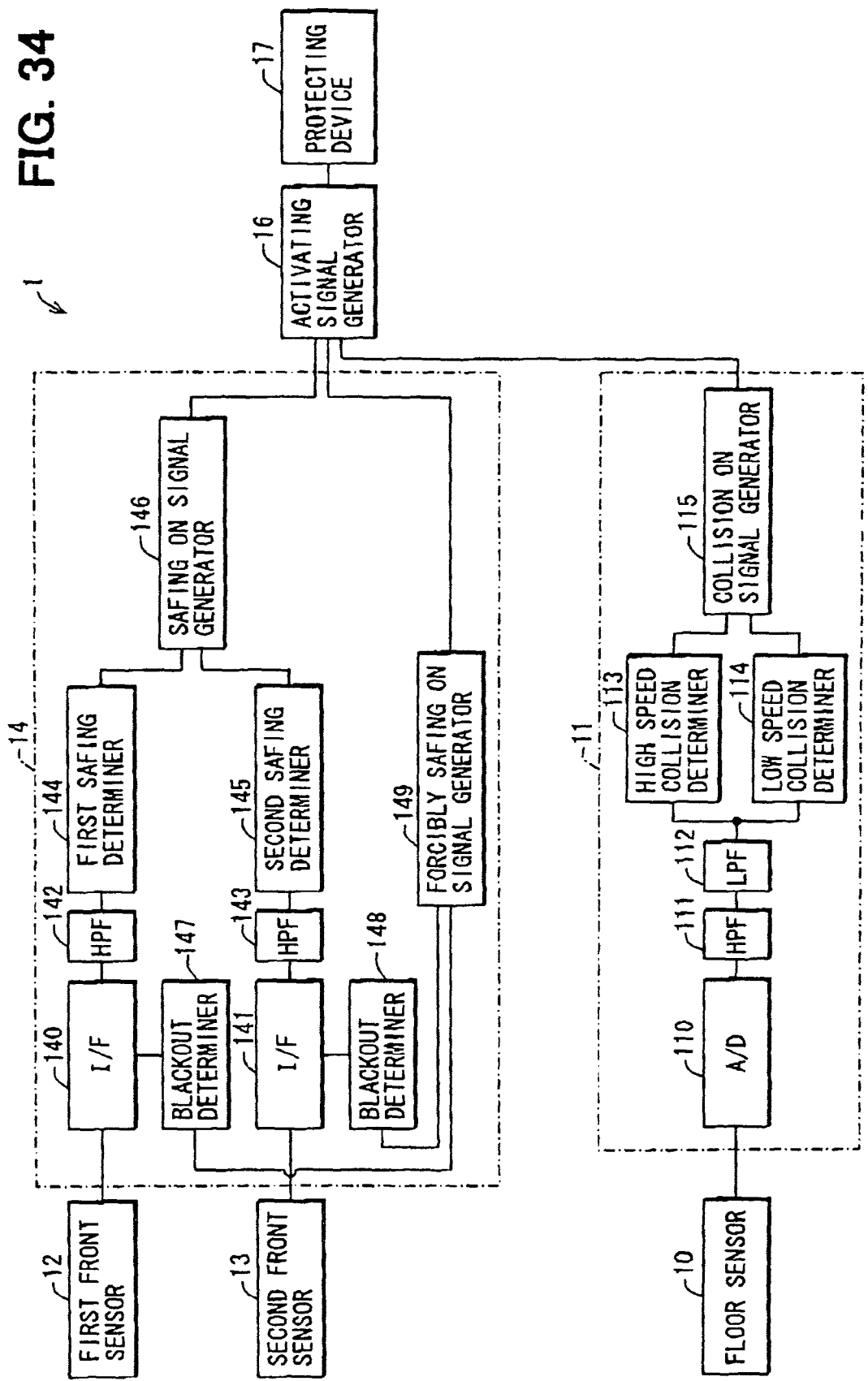
FIG. 34 is a block diagram showing an air bag apparatus, according to a fifteenth embodiment.

As shown in FIG. 34, the air bag apparatus of this embodiment is configured by omitting the diagnosis unit 15 from the structure of the first embodiment.

In this embodiment, the A/D converter 110 may be provided to a micro computer 20. The HPF 111, the LPF 112, the high speed collision determiner 113, the low speed collision evaluator 114, and the collision ON signal generator 115 are constructed of the microcomputer 20 and a program.

In this embodiment, the safing determiner 14 evaluates whether the vehicle comes into collision, in accordance with acceleration detected using the first and second front sensors 12, 13, thereby outputting the signal corresponding to the determination result thereof.

Figure 35:
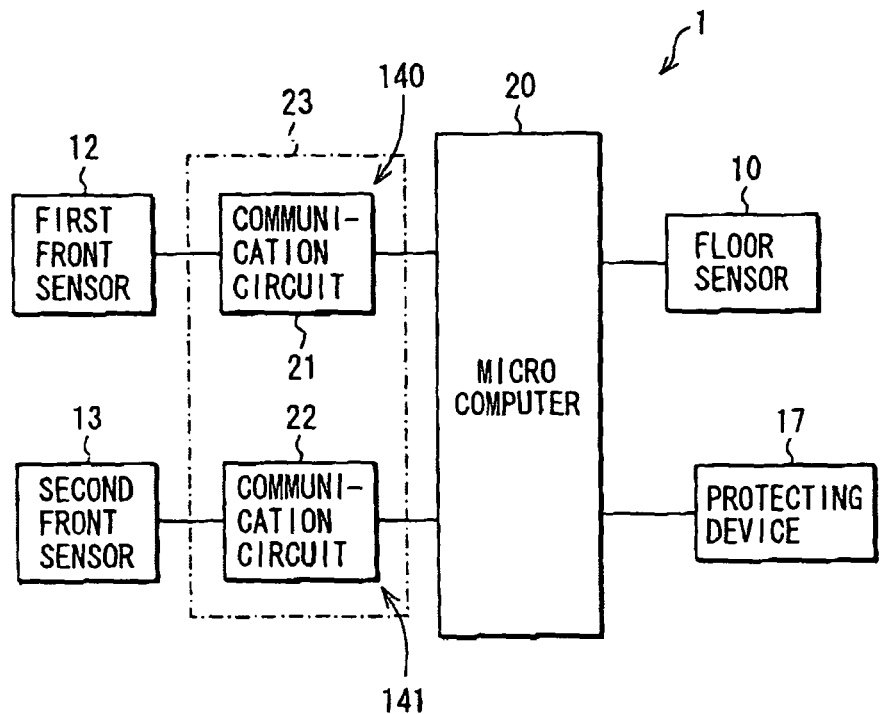
FIG. 35 is a block diagram showing a processing device of the air bag apparatus, according to the fifteenth embodiment.

As shown in FIG. 35, the serial I/F 140 is constructed of a communication circuit 21. The serial I/F 141 is constructed of a communication circuit 22. The communication circuits 21, 22 are integrated to one package as an IC 23.

Each of the blackout determiners 147, 148 evaluates whether one of corresponding digital signals, which is transmitted from the corresponding one of the first and second front sensors 12, 13 to the corresponding one of the serial I/Fs 140, 141 via the serial communication, causes a black out. When each of the blackout determiners 147, 148 is continuously incapable of properly receiving the digital signal for more than a predetermined period such as 5 msec, the corresponding one of the blackout determiners 147, 148 determines that the serial communication causes blackout, thereby outputting corresponding one of first and second blackout signals to the forcibly safing ON signal generator 149.

When each of the blackout determiners 147, 148 is incapable of properly receiving the digital signal, each of the blackout determiners 147, 148 cannot receive a response even though requesting a transmittance of the digital signal, or each of the blackout determiners 147, 148 receives an irregular digital signal. Alternatively, discrepancy arises in check sum and/or a CRC error arises in a structure having an error detecting function such as a check sum and a CRC (cyclic redundancy check).

The forcibly safing ON signal generator 149 evaluates blackout of the communication in accordance with the signals output from the blackout determiners 147, 148, thereby outputting the forcibly safing ON signal to the activating signal generator 16. When both the first and second blackout signals are not output, the forcibly safing ON signal generator 149 does not output the forcibly safing ON signal. When either the first or second blackout signals is output, the forcibly safing ON signal generator 149 outputs the forcibly safing ON signal for a predetermined period. When both the first and second blackout signals are output, the forcibly safing ON signal generator 149 restricts outputting the forcibly safing ON signal for a predetermined period.

The activating signal generator 16 outputs the activating signal for activating the protecting device 17 in accordance with the collision ON signal output from the collision ON signal generator 115, the safing ON signal output from the safing ON signal generator 146, and the forcibly safing ON signal output from the forcibly safing ON signal generator 149. The activating signal generator 16 outputs the activating signal to the protecting device 17 when the collision ON signal is output and when either the safing ON signal or the forcibly safing ON signal is output. That is, in this embodiment, the activating signal generator 16 outputs the activating signal to the protecting device 17 when the collision ON signal and the safing ON signal are output, or when the collision ON signal and the forcibly safing ON signal are output.

Next, an operation of the air bag apparatus 1 in this embodiment is described.

Figure 36:
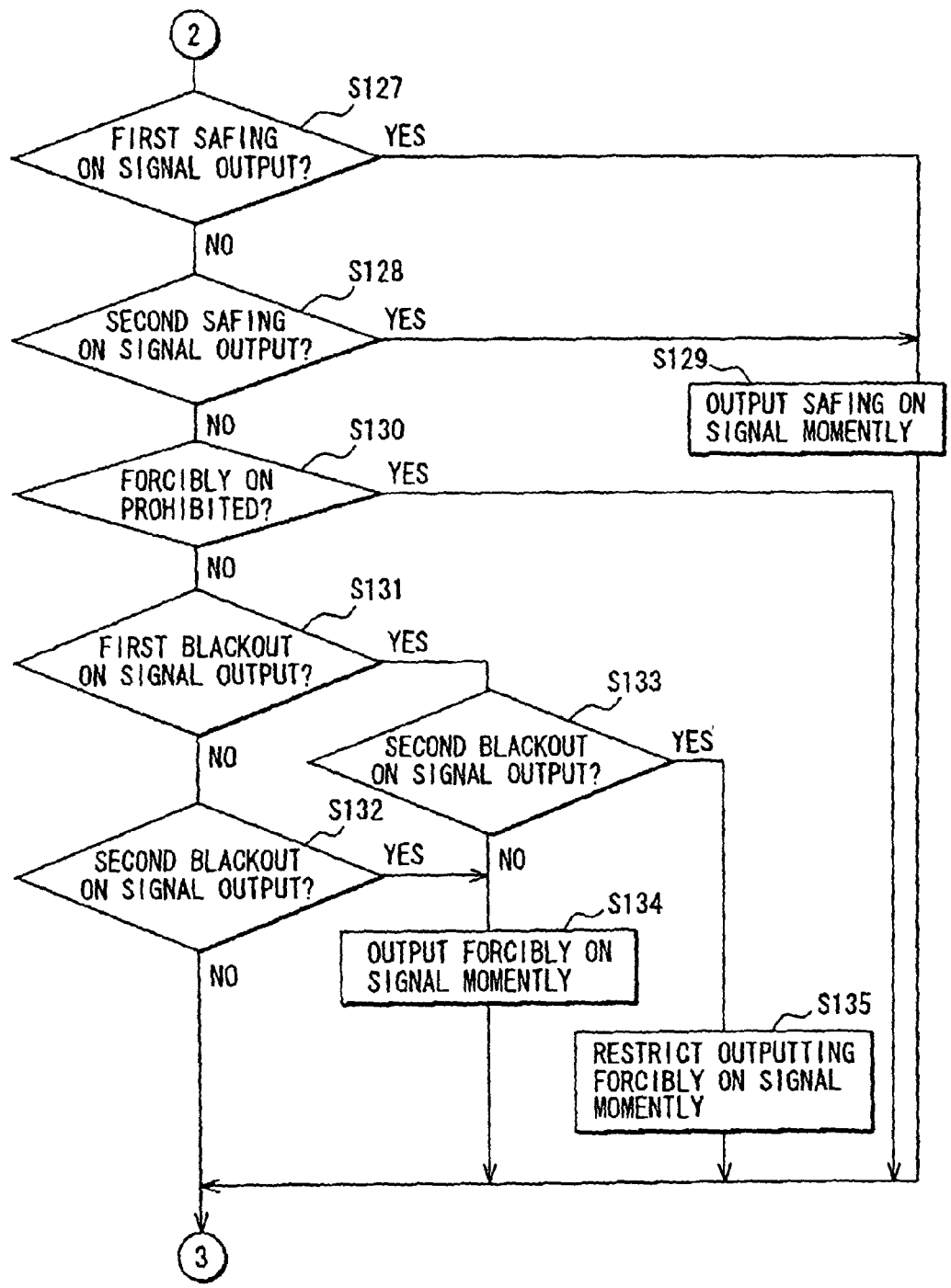
FIGS. 36 to 38 are flowcharts showing an operation for the air bag apparatus, according to the fifteenth embodiment.

Steps S100 to S126 are executed similarly to the first embodiment as referred to FIGS. 3, 4. As shown in FIG. 36, in step S127, the safing ON signal generator 146 evaluates whether the first safing ON signal is output. In step S128, the safing ON signal generator 146 evaluates whether the second safing ON signal is output. When either the first or second safing ON signal is output in steps S127, S128, the routine proceeds to step S129, in which the safing ON signal generator 146 outputs the safing ON signal for a predetermined period. By contrast, when both the first and second safing ON signals are not output in steps S127, S128, the safing ON signal generator 146 does not output the safing ON signal. In this case, the routine proceeds to S130, in which the forcibly safing ON signal generator 149 evaluates whether the forcibly safing ON operation is prohibited.

In step S130, when the forcibly safing ON operation is prohibited, the forcibly safing ON signal generator 149 does not output the forcibly safing ON signal. By contrast, when the forcibly safing ON operation is not prohibited, the routine proceeds to step S131, in which the forcibly safing ON signal generator 149 evaluates whether the first blackout ON signal is output. In steps S132, S133, the forcibly safing ON signal generator 149 evaluates whether the second blackout ON signal is output.

When both the first and second blackout ON signal are not output in steps S131 to S133, the forcibly safing ON signal generator 149 does not output the forcibly safing ON signal. By contrast, when either the first or second blackout ON signal is output in steps S131 to S133, the routine proceeds to step S134, in which the forcibly safing ON signal generator 149 outputs the forcibly safing ON signal for a predetermined period. When both the first and second blackout ON signal are output, the routine proceeds to step S135, in which the forcibly safing ON signal generator 149 restricts outputting the forcibly safing ON signal for a predetermined period.

Figure 37:
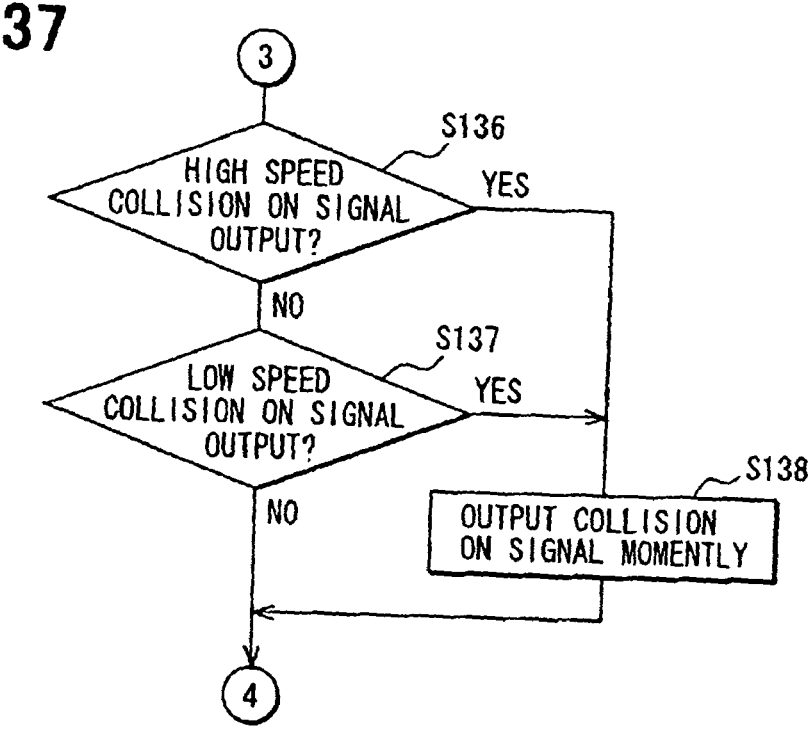

Next, processings are subjected to the signals output from the high and low speed collision determiners 113, 114. As shown in FIG. 37, in steps S136, 137, the collision ON signal generator 115 evaluates whether the high and low speed collision ON signals are output. When either the high or low speed collision ON signal is output in steps S136, S137, the routine proceeds to step S138, in which the collision ON signal generator 115 outputs the collision ON signal. By contrast, when both the high and low speed collision ON signals are not output in steps S136, S137, the collision ON signal generator 115 does not output the collision ON signal.

Figure 38:
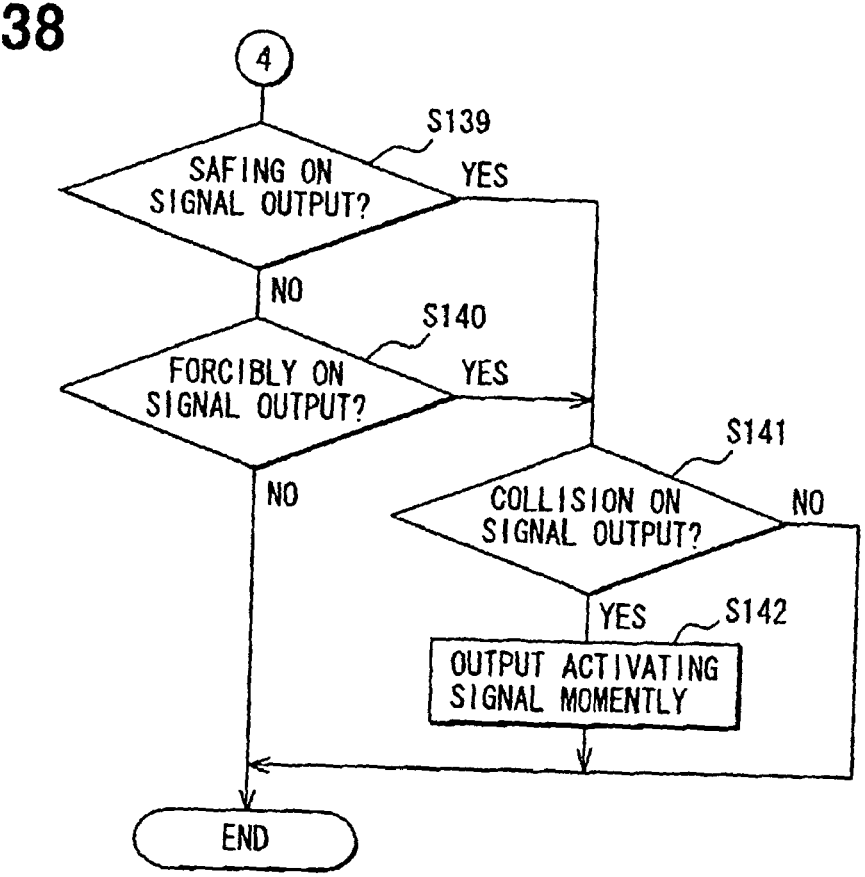

Next, processings are subjected to the signals output from the safing ON signal generator 146, the forcibly safing ON signal generator 149, and the collision ON signal generator 115. As shown in FIG. 38, in steps S139, S140, the activating signal generator 16 evaluates whether the safing ON signal and the forcibly safing ON signal are output.

When either the safing ON signal or the forcibly safing ON signal is output in steps S139, S140, the routine proceeds to step S141, in which the activating signal generator 16 evaluates whether the collision ON signal is output. When the collision ON signal is output in step S141, the routine proceeds to step S142, in which the activating signal generator 16 outputs the activating signal for a predetermined period. By contrast, when both the safing ON signal and the forcibly sating ON signal are not output in steps S139, S140, the activating signal generator 16 does not output the activating signal. When the collision ON signal is not output in step S141, the activating signal generator 16 does not output the activating signal.

In this embodiment, the air bag apparatus 1 can be restricted from causing a misoperation even when the air bag apparatus 1 is excessively exposed to water and proper performance of the air bag apparatus 1 is impaired. Thus, reliability of the air bag apparatus 1 can be enhanced.

When the air bag apparatus 1 is excessively exposed to water, the air bag apparatus 1 may cause an electric leak. Consequently, blackout may arise in the communication of the second front sensor 13 in addition to the first front sensor 12. Accordingly, when both blackout of the first front sensor 12 and second front sensor 13 are detected, it is determined that this blackout is caused not by collision of the vehicle, but by excessive exposure to water. In this condition, output signals from the first and second front sensors 12, 13 are terminated, so that the first and second safing ON signals are not output. The forcibly safing ON signal is also not output.

Outputting the activating signal can be restricted by restricting outputting all the first and second safing ON signals, and the forcibly safing ON signal. Therefore, misoperation of the air bag apparatus 1 due to excessive exposure to water can restricted.

In this embodiment, a misoperation can be steadily restricted by terminating outputting the forcibly safing ON signal for the predetermined period when both the first and second communication blackout signals are output.

When the air bag apparatus 1 is excessively exposed to water, the air bag apparatus 1 may cause an electric leak. Consequently, blackout may arise in the communication of both the second front sensor 13 and the first front sensor 12. It is conceivable that the air bag apparatus 1 may become in an unstable condition, in which blackout of the communication may temporarily recovers even the air bag apparatus 1 is exposed to water. Therefore, when both the first and second blackout ON signals are output, outputting the forcibly safing ON signal is restricted for the predetermined period, regardless of the subsequent condition of the output signal, so that a misoperation can be steadily restricted.

Furthermore, in this embodiment, a misoperation can be restricted and the apparatus can be downsized. The serial I/Fs 140, 141 are integrated to be the communication circuits 21, 22 within the one package of the IC 23, so that the air bag apparatus 1 can be downsized. When the air bag apparatus 1 is excessively exposed to water, both the communication circuits 21, 22 may cause abnormality due to electricity leakage, because the serial I/Fs 140, 141 are constructed in the same package of the IC 23. Therefore, outputting the signals from both the first and second front sensors 12, 13 may be restricted. Thus, excessive exposure to water can be steadily detected, so that the apparatus can be restricted from causing a misoperation and the apparatus can be downsized.

Sixteenth Embodiment

The air bag apparatus 1 of this embodiment has a structure different from the structure of the fifteenth embodiment.

Figure 39:
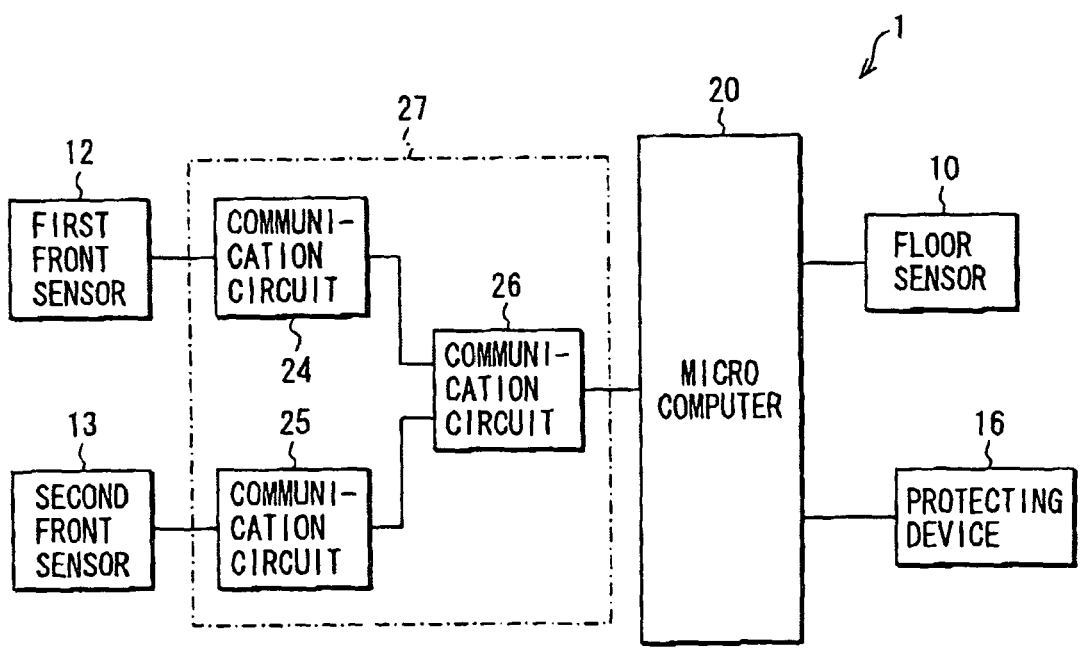
FIG. 39 is a block diagram showing a processing device of the air bag apparatus, according to a sixteenth embodiment.

As shown in FIG. 39, the serial I/F 140 is constructed of communication circuits 24, 26. The serial I/F 141 is constructed of communication circuits 25, 26. The communication circuit 24 transmits the signal output from the first front sensor 12 to the communication circuit 26. The communication circuit 25 transmits the signal output from the second front sensor 13 to the communication circuit 26. The communication circuit 26 transmits signals, which are transmitted from the communication circuits 24, 25, to HPFs 142, 143 (FIG. 34), selectively in accordance with a predetermined procedure. The HPFs 142, 143 are constructed in the microcomputer 20. The communication circuits 24 to 26 are integrated to one package to be an IC 27.

In this embodiment, a misoperation can be restricted, and transmission paths of the first and second front sensors 12, 13 can be simplified. For example, signals output from the first and second front sensors 12, 13 are transmitted to the microcomputer 20 via the communication circuit 26, so that transmission paths of the signals can be simplified. Furthermore, the circuits are integrated to the same package in the IC 27. Therefore, when the air bag apparatus 1 is excessively exposed to water, the communication circuits 24, 25 cause abnormality. Consequently, the communication signals of both the and second first front sensors 12, 13 may be terminated due to electricity leakage. When the communication circuit 26 causes abnormality, signals output from the first and second front sensors 12, 13 may be simultaneously terminated, so that excessive exposure to water can be steadily detected. Thus, misoperation can be restricted, and the transmission path of the signals output from the first and second front sensors 12, 13 can be simplified.

In the above fifteenth to sixteenth embodiments, the A/D converter 110, the HPF 111, the LPF 112, the high speed collision determiner 113, and the collision ON signal generator 115 may serve as a first control signal generating unit. The A/D converter 110, the HPF 111, the LPF 112, the low speed collision determiner 114, and the collision ON signal generator 115 also may serve as the first control signal generating unit.

the first and second safing determiners 144, 145 may serve as a second and third control signal generating unit. The blackout determiners 147, 148, and the forcibly safing ON signal generator 149 may serve as a fourth control signal generating unit. The safing ON signal generator 146 and the activating signal generator 16 may serve as the activating signal generating unit.

In the above fifteenth to sixteenth embodiments, the collision ON signal may correspond to a first control signal. The first and second safing ON signals may correspond to second and third control signals. The forcibly safing ON signal correspond to a fourth control signal.

In the above first to sixteenth embodiments, when parameters are equal to or greater than corresponding thresholds, corresponding signals are output in the above evaluations. Alternatively, when parameters are greater than corresponding thresholds, corresponding signals are output in the above evaluations. The above operations are examples. When parameters are greater than corresponding thresholds, corresponding signals may be output in the above evaluations. Alternatively, when parameters are equal to or greater than corresponding thresholds, corresponding signals may be output in the above evaluations.

In the above first to sixteenth embodiments, the operations may be combined as appropriate. The thresholds are not limited to fixed values. The thresholds may be variables, which are changed in accordance with a vehicular condition such as change in speed of the vehicle.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A protection apparatus for a vehicle, the protection apparatus comprising:
    a protecting device that protects a passenger of the vehicle;
    a first sensor that outputs a first sensor signal corresponding to magnitude of an impact applied to the vehicle;
    a first control signal generating unit that outputs a first control signal when the magnitude of the impact corresponding to the first sensor signal is greater than a first threshold;
    a second sensor that outputs a second sensor signal corresponding to the magnitude of the impact applied to the vehicle;
    a second control signal generating unit that outputs a second control signal when the magnitude of the impact corresponding to the second sensor signal is greater than a second threshold;
    a disruption determining unit that detects disruption of the second sensor signal;
    a third control signal generating unit that outputs a third control signal when the disruption determining unit detects disruption of the second sensor signal;
    an activating signal generating unit that outputs an activating signal for activating the protecting device when:
        the first control signal is output; and
        one of the second control signal and the third control signal is output; and
    a fourth control signal generating unit including a diagnosis unit that detects an abnormality of at least one component of the protection apparatus, the component being connected with the diagnosis unit, the abnormality being other than disruption of the second sensor signal,
    wherein the fourth control signal generating unit outputs a fourth control signal to restrict the third control signal generating unit from outputting the third control signal and not to activate the protecting device when the diagnosis unit detects the abnormality.

2. The protection apparatus according to claim 1, wherein the fourth control signal generating unit outputs the fourth control signal when the diagnosis unit detects that the abnormality is sustained for a first period.

3. The protection apparatus according to claim 2, wherein the fourth control signal generating unit determines that a malfunction arises when the diagnosis unit detects that the abnormality is sustained for the first period.

4. The protection apparatus according to claim 3,
    wherein the fourth control signal generating unit outputs a warning signal when the malfunction arises, and
    the fourth control signal generating unit outputs the fourth control signal when the warning signal is output.

5. The protection apparatus according to claim 3,
    wherein the fourth control signal generating unit stores malfunction information corresponding to the malfunction, and
    the fourth control signal generating unit outputs the fourth control signal when the fourth control signal generating unit stores the malfunction information.

6. The protection apparatus according to claim 2, wherein the fourth control signal generating unit determines that a malfunction arises when the diagnosis unit detects that the abnormality is sustained for a second period, which is greater than the first period.

7. The protection apparatus according to claim 2,
    wherein the diagnosis unit performs evaluation of the abnormality repeatedly at predetermined intervals, and
    the diagnosis unit obtains a period, for which the abnormality is sustained, in accordance with a number of the evaluation.

8. The protection apparatus according to claim 2, wherein the third control signal generating unit determines that communication of the signal output from the second sensor causes an abnormality when disruption of the second sensor signal is sustained for a third period, which is greater than the first period.

9. The protection apparatus according to claim 1, wherein the abnormality being electric leakage caused in the component.

10. A method for protecting a passenger of a vehicle, the method comprising:
- detecting an impact applied to the vehicle to produce a first sensor signal corresponding to the magnitude of the impact;
- detecting the impact applied to the vehicle to produce a second sensor signal corresponding to the magnitude of the impact;
- detecting an abnormality of at least one component of the protection apparatus, the abnormality being other than disruption of the second sensor signal,
- outputting a first control signal when the first sensor signal is greater than a first threshold;
- outputting a second control signal when the second sensor signal is greater than a second threshold;
- detecting disruption of the second sensor signal;
- outputting a third control signal when disruption of the second sensor signal is detected; and
- outputting a fourth control signal when the abnormality is detected;
- activating a protecting device for protecting the passenger when the following i) is satisfied and when the following ii) or iii) is satisfied:
  - i) the first control signal is output;
  - ii) the second control signal is output; and
  - iii) the third control signal is output and the fourth control signal is not output.

11. A protection apparatus for a vehicle, the protection apparatus comprising:
- a protecting device that protects a passenger of the vehicle;
- a first sensor that outputs a first sensor signal corresponding to magnitude of an impact applied to the vehicle;
- a first control signal generating unit that outputs a first control signal when the magnitude of the impact corresponding to the first sensor signal is greater than a first threshold;
- a second sensor that outputs a second sensor signal corresponding to the magnitude of the impact applied to the vehicle;
- a second control signal generating unit that outputs a second control signal when the magnitude of the impact corresponding to the second sensor signal is greater than a second threshold;
- a disruption determining unit that detects disruption of the second sensor signal;
- a third control signal generating unit that outputs a third control signal when the disruption determining unit detects disruption of the second sensor signal;
- an activating signal generating unit that outputs an activating signal for activating the protecting device when:
  - the first control signal is output; and
  - one of the second control signal and the third control signal is output; and
- a fourth control signal generating unit including a diagnosis unit that detects an abnormality of at least one component of the protection apparatus, the component being connected with the diagnosis unit, the abnormality being other than disruption of the second sensor signal,
- wherein the fourth control signal generating unit outputs a fourth control signal to restrict the third control signal generating unit from outputting the third control signal and not to activate the protecting device when the diagnosis unit detects the abnormality; and
- wherein the abnormality being electric linkage caused in the component.

* * * * *